US010943417B2

(12) United States Patent
Stitt et al.

(10) Patent No.: US 10,943,417 B2
(45) Date of Patent: Mar. 9, 2021

(54) PASSIVE ENTRY/PASSIVE START ACCESS SYSTEMS INCLUDING ROUND TRIP TIME SNIFFING

(71) Applicants: DENSO International America, Inc., Southfield, MI (US); DENSO CORPORATION, Kariya (JP)

(72) Inventors: Raymond Michael Stitt, Ada, MI (US); Yuki Tokunaga, Kariya (JP)

(73) Assignees: DENSO International America, Inc., Southfield, MI (US); DENSO CORPORATION, Aichi-pref. (JP)

( * ) Notice: Subject to any disclaimer, the term of this patent is extended or adjusted under 35 U.S.C. 154(b) by 0 days.

(21) Appl. No.: 16/598,279

(22) Filed: Oct. 10, 2019

(65) Prior Publication Data

US 2020/0114875 A1 Apr. 16, 2020

Related U.S. Application Data

(60) Provisional application No. 62/826,212, filed on Mar. 29, 2019, provisional application No. 62/801,392, (Continued)

(51) Int. Cl.
*H04B 17/318* (2015.01)
*H04W 4/40* (2018.01)
(Continued)

(52) U.S. Cl.
CPC ...... *G07C 9/00309* (2013.01); *B60R 25/2072* (2013.01); *B60R 25/241* (2013.01); (Continued)

(58) Field of Classification Search
CPC .................................................. B60R 25/245
See application file for complete search history.

(56) References Cited

U.S. PATENT DOCUMENTS 6,424,254 B1 7/2002 Rydel
8,644,768 B2 2/2014 Kluge et al.
(Continued)

FOREIGN PATENT DOCUMENTS

BR 102014017465 A2 2/2016
CN 104574593 A 4/2015
(Continued)

OTHER PUBLICATIONS

International Search Report regarding International Application No. PCT/US2019/055845, dated Jan. 20, 2020.
(Continued)

*Primary Examiner* — Joseph H Feild
*Assistant Examiner* — Pameshanand Mahase
(74) *Attorney, Agent, or Firm* — Harness, Dickey & Pierce, P.L.C.

(57) ABSTRACT

A system for includes master and sniffer devices. The master device includes: first antennas with different polarized axes; a transmitter transmitting a challenge signal via the first antennas from the vehicle to a slave device, where the slave device is a portable access device; and a receiver receiving a response signal in response to the challenge signal from the slave device. The sniffer device includes: second antennas with different polarized axes; and a receiver receiving, via the second antennas, the challenge signal from the transmitter and the response signal from the slave device. The sniffer device measures when the challenge signal and the response signal arrive at the sniffer device to provide arrival times. The master or sniffer device estimates at least one of a distance from the vehicle to the slave device or a location of the slave device relative to the vehicle based on the arrival times.

17 Claims, 58 Drawing Sheets

Related U.S. Application Data filed on Feb. 5, 2019, provisional application No. 62/744,814, filed on Oct. 12, 2018.

(51) Int. Cl.

| | | |
|---|---|---|
| *G07C 9/28* | (2020.01) | |
| *G01S 13/84* | (2006.01) | |
| *G07C 9/00* | (2020.01) | |
| *B60R 25/24* | (2013.01) | |
| *H04B 1/7073* | (2011.01) | |
| *H04W 12/12* | (2021.01) | |
| *B60R 25/20* | (2013.01) | |
| *H01Q 1/32* | (2006.01) | |
| *H01Q 25/04* | (2006.01) | |
| *H04B 7/06* | (2006.01) | |
| *H01Q 25/00* | (2006.01) | |
| *H04B 7/15* | (2006.01) | |
| *G01S 7/02* | (2006.01) | |
| *G01S 13/76* | (2006.01) | |

(52) U.S. Cl.
CPC ......... *B60R 25/245* (2013.01); *B60R 25/246* (2013.01); *G01S 13/84* (2013.01); *G07C 9/28* (2020.01); *H01Q 1/3241* (2013.01); *H01Q 25/00* (2013.01); *H01Q 25/04* (2013.01); *H04B 1/7073* (2013.01); *H04B 7/0669* (2013.01); *H04B 7/15* (2013.01); *H04B 17/318* (2015.01); *H04W 4/40* (2018.02); *H04W 12/1204* (2019.01); *H04W 12/1208* (2019.01); *B60R 2325/108* (2013.01); *B60R 2325/205* (2013.01); *G01S 7/021* (2013.01); *G01S 13/767* (2013.01); *G07C 2009/00555* (2013.01); *G07C 2209/61* (2013.01)

(56) References Cited

U.S. PATENT DOCUMENTS

| | | | |
|---|---|---|---|
| 9,688,247 B1 | 6/2017 | Jayaraman et al. | |
| 9,794,753 B1 | 10/2017 | Stitt et al. | |
| 9,807,570 B1 | 10/2017 | Lazarini et al. | |
| 9,825,373 B1 | 11/2017 | Smith | |
| 9,894,492 B1 | 2/2018 | Elangovan et al. | |
| 10,002,479 B2 | 6/2018 | Oz et al. | |
| 10,328,898 B2 | 6/2019 | Golsch et al. | |
| 10,328,899 B2 | 6/2019 | Golsch | |
| 2004/0054471 A1 | 3/2004 | Bartlett et al. | |
| 2009/0243932 A1 | 10/2009 | Moshfeghi | |
| 2010/0305779 A1* | 12/2010 | Hassan | H01Q 1/325 701/2 |
| 2010/0321154 A1* | 12/2010 | Ghabra | G07C 9/00309 340/5.61 |
| 2011/0215921 A1 | 9/2011 | Ben Ayed et al. | |
| 2012/0045058 A1 | 2/2012 | Weghaus | |
| 2013/0063247 A1 | 3/2013 | Blatz | |
| 2013/0310074 A1 | 11/2013 | Porzio Giusto | |
| 2014/0274013 A1 | 9/2014 | Santavicca | |
| 2015/0015367 A1* | 1/2015 | Lin | B60R 25/20 340/5.63 |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0027226 A1 | 1/2016 | Gigl et al. | |
| 2016/0150407 A1 | 5/2016 | Michaud et al. | |
| 2016/0275734 A1 | 9/2016 | Blatz | |
| 2016/0323246 A1 | 11/2016 | Zivkovic et al. | |
| 2016/0332597 A1 | 11/2016 | Tokunaga et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0303080 A1 | 10/2017 | Stitt et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0118163 A1* | 5/2018 | Murakami | B60R 25/209 |
| 2018/0126952 A1 | 5/2018 | Niemiec | |
| 2018/0154865 A1 | 6/2018 | Bianchi, III et al. | |
| 2018/0156889 A1 | 6/2018 | Charvat et al. | |
| 2018/0213355 A1 | 7/2018 | Smith et al. | |
| 2018/0234797 A1 | 8/2018 | Ledvina et al. | |
| 2018/0254925 A1 | 9/2018 | Dutz et al. | |
| 2018/0267154 A1* | 9/2018 | Ootaka | G01S 17/32 |
| 2018/0269565 A1 | 9/2018 | Guthrie et al. | |
| 2019/0227539 A1* | 7/2019 | Golgiri | H04W 4/80 |

FOREIGN PATENT DOCUMENTS

| | | |
|---|---|---|
| EP | 3370365 A1 | 9/2018 |
| JP | H8166443 A | 6/1996 |
| WO | WO-03060835 A2 | 7/2003 |
| WO | WO-2015084852 A1 | 6/2015 |
| WO | WO-16156682 A1 | 10/2016 |
| WO | WO-2017067892 A1 | 4/2017 |
| WO | WO-2017181050 A1 | 10/2017 |
| WO | WO-18040641 A1 | 3/2018 |

OTHER PUBLICATIONS

Written Opinion Of The International Searching Authority regarding International Application No. PCT/US2019/055845, dated Jan. 20, 2020.

International Search Report regarding International Application No. PCT/US2019/055854, dated Jan. 31, 2020.

Written Opinion Of The International Searching Authority regarding International Application No. PCT/US2019/055854, dated Jan. 31, 2020.

International Search Report regarding International Application No. PCT/US2019/055857, dated Dec. 12, 2019.

Written Opinion Of The International Searching Authority regarding International Application No. PCT/2019/055857, dated Dec. 19, 2019.

International Search Report regarding International Application No. PCT/US2019/055868, dated Dec. 16, 2019.

Written Opinion Of The International Searching Authority regarding International Application No. PCT/US2019/055868, dated Dec. 16, 2019.

International Search Report regarding International Application No. PCT/US2019/055882, dated Jan. 28, 2020.

Written Opinion Of The International Searching Authority regarding International Application No. PCT/US2019/055882, dated Jan. 28, 2020.

International Search Report regarding International Application No. PCT/US2019/055889, dated Jan. 28, 2020.

Written Opinion Of The International Searching Authority regarding International Application No. PCT/US2019/055889, dated Jan. 28, 2020.

International Search Report regarding International Application No. PCT/US2019/055898, dated Dec. 17, 2019.

Written Opinion Of The International Searching Authority regarding International Application No. PCT/US2019/055898, dated Dec. 17, 2019.

Written Opinion Of The International Searching Authority regarding International Application No. PCT/US2019/055909, dated Jan. 31, 2020.

International Search Report regarding International Application No. PCT/US2019/055909, dated Jan. 31, 2020.

W.Kluge, D.Eggert, "Ranging with IEEE 802.15.4 Narrow-Band PHY," 802.15-09-0613-00-004f, Date submitted Sep. 14, 2009. [Online]. Available: https://mentor.ieee.org/802.15/dcn/09/15/09/0613-00-004f-ranging-with-ieee-802-15-4-narrow-band-phy.ppt. [Accessed Oct. 8. 2019].

Hildur Ólafsdóttir, Aanjhan Ranganathan, Srdjan Capkun. "On the Security of Carrier Phase-based Ranging," IACR Cryptology ePrint

(56) References Cited

OTHER PUBLICATIONS

Archive2016, [Online]. Available: https://eprint.iacr.org/2017/591.pdf [Accessed Oct. 8, 2019], 14 pages.
Stefan Brands and David Chaum. 1994. Distance-bounding protocols. In Workshop on the theory and application of cryptographic techniques on Advances in cryptology (EUROCRYPT '93), Tor Helleseth (Ed.). Springer-Verlag, Berlin, Heidelberg, 344-359.
Gerhard P. Hancke and Markus G. Kuhn. 2008. Attacks on time-of-flight distance bounding channels. In Proceedings of the first ACM conference on Wireless network security (WiSec '08). ACM, New York, NY, USA, 194-202. DOI: https://doi.org/10.1145/1352533.1352566.

\* cited by examiner

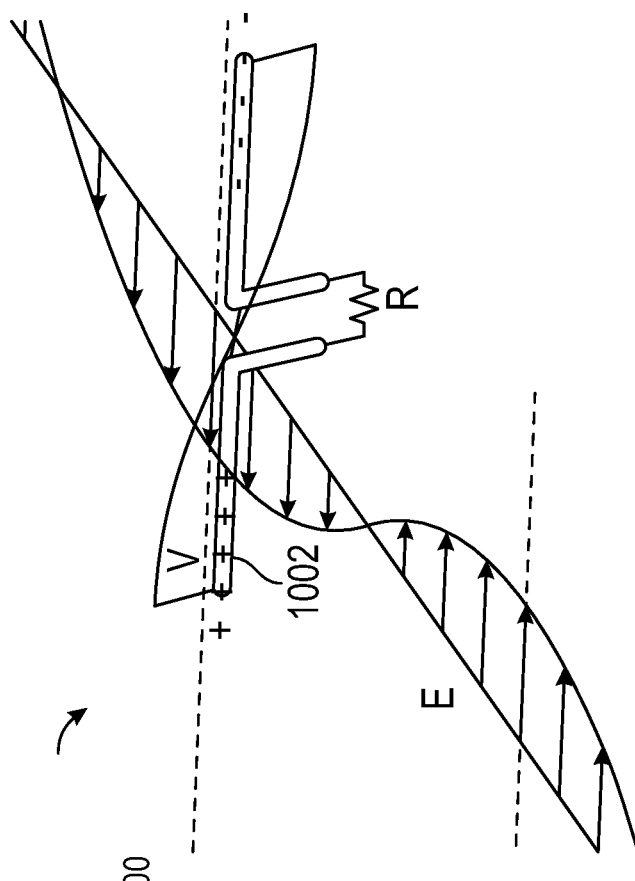
FIG. 10
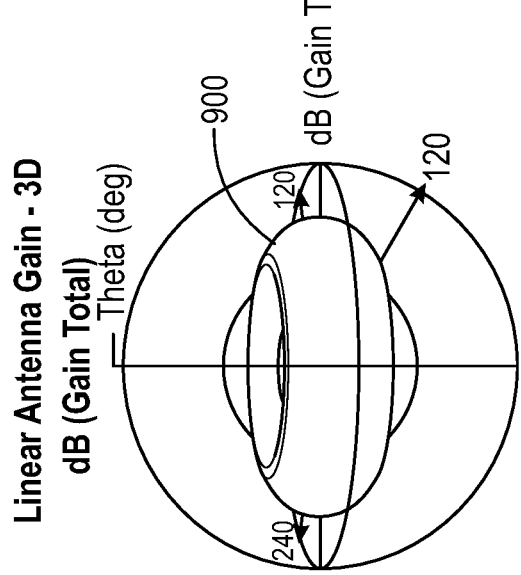
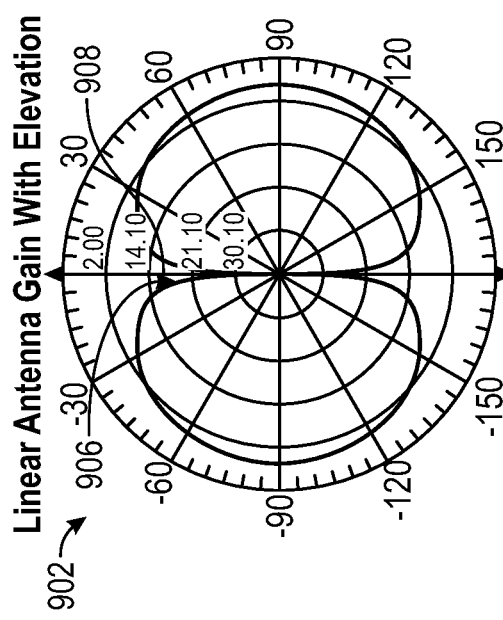
FIG. 9

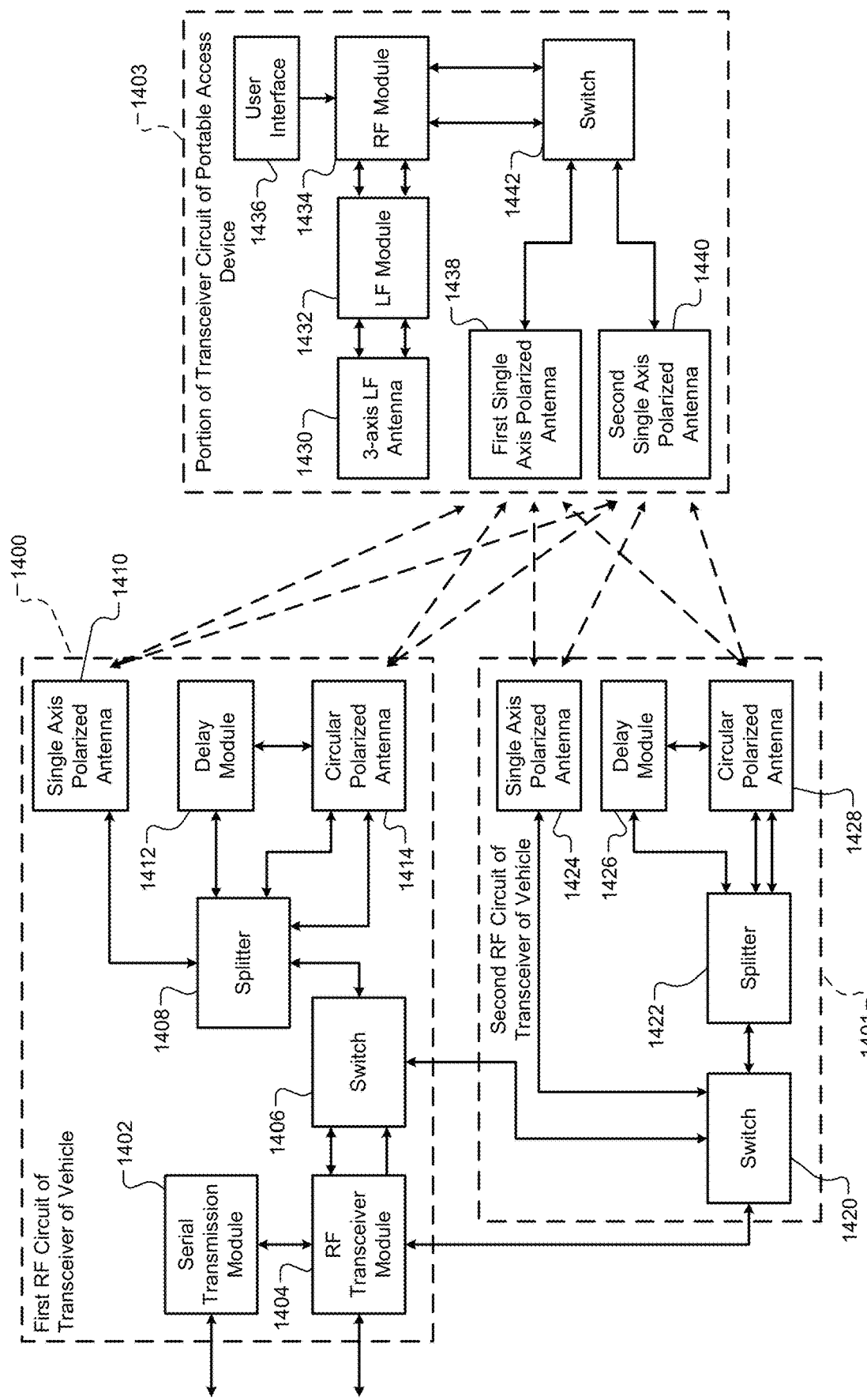

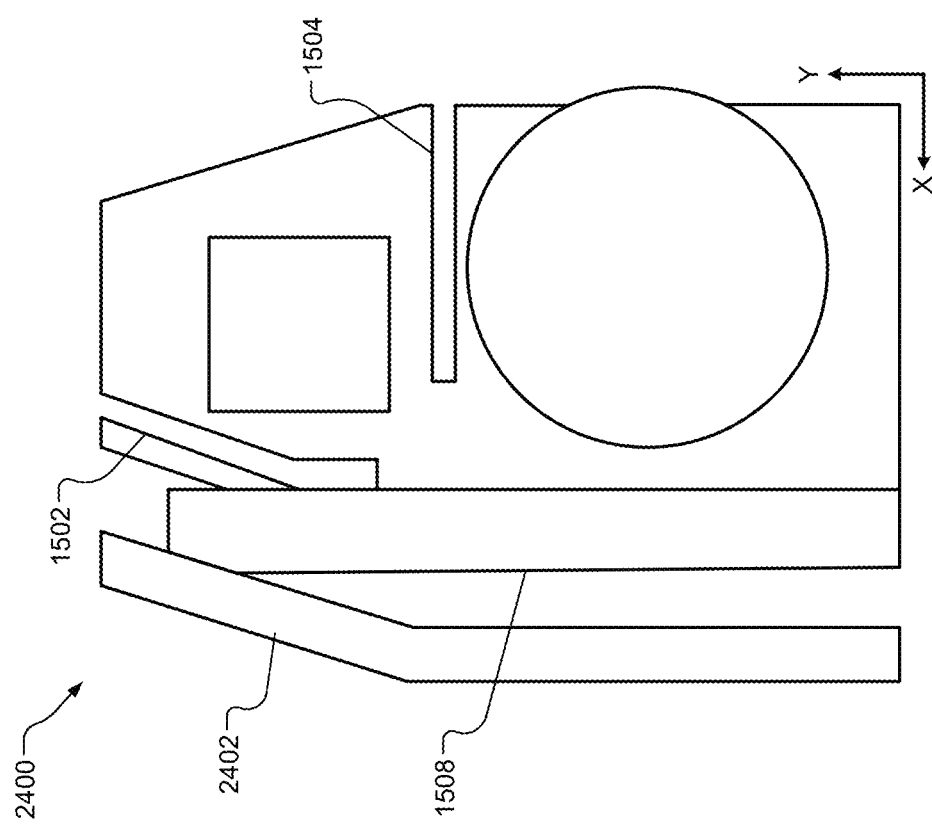

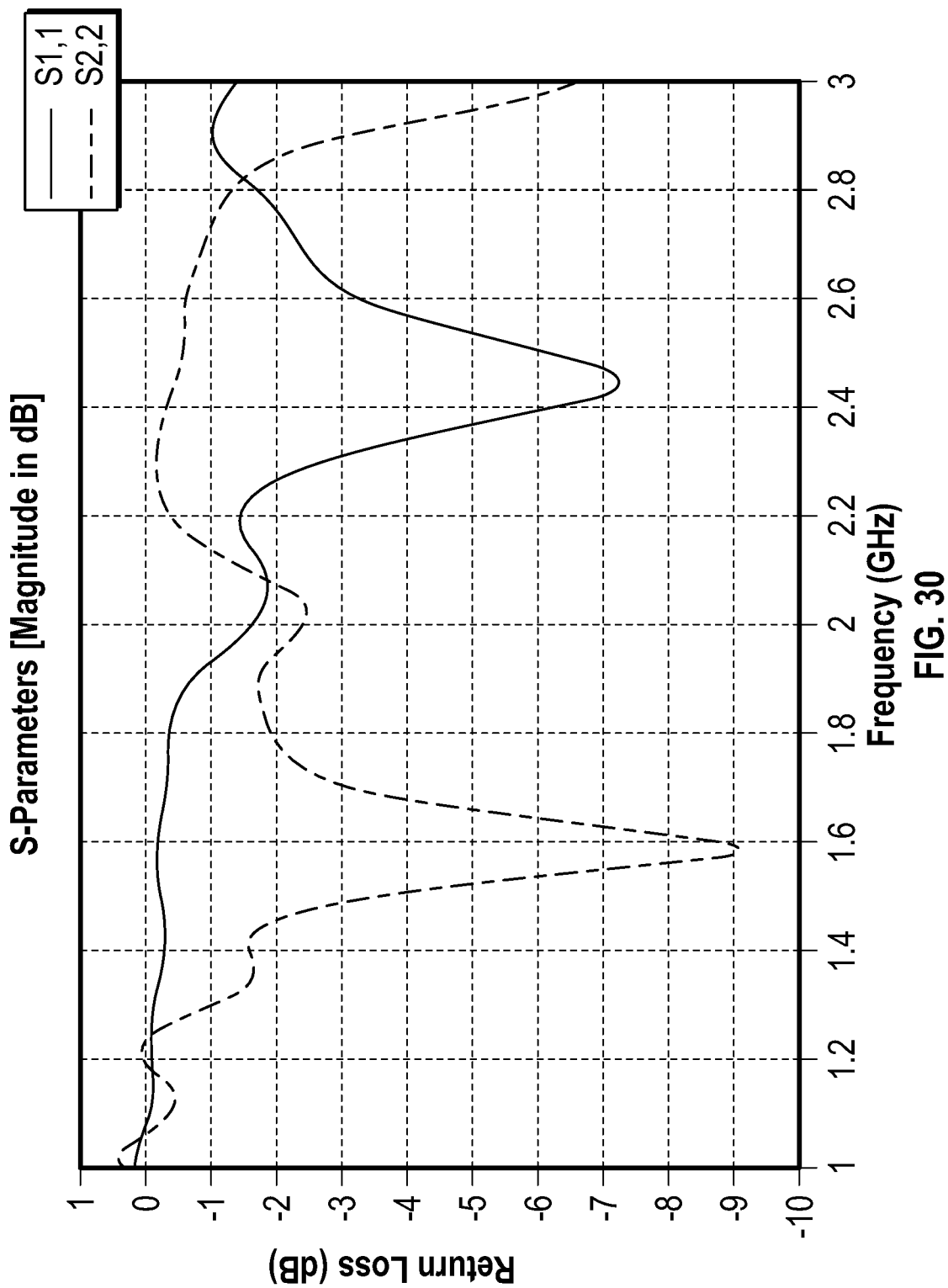

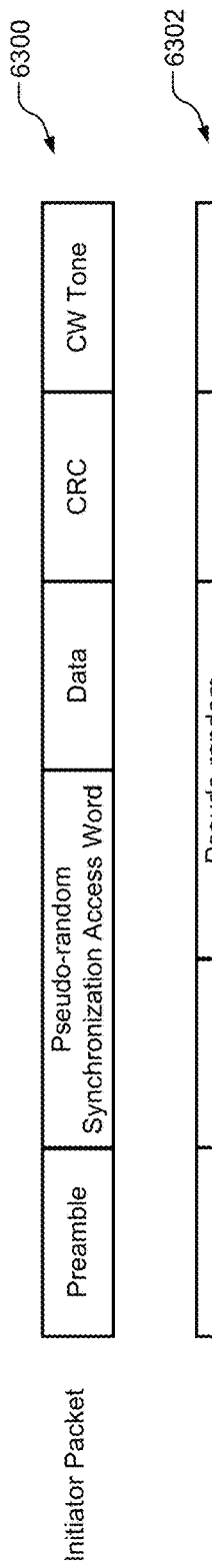
FIG. 57
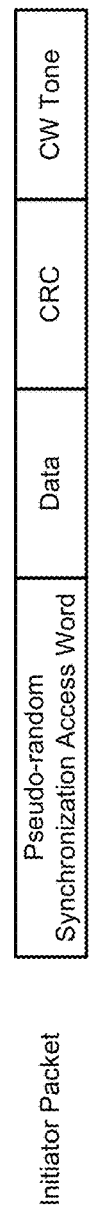
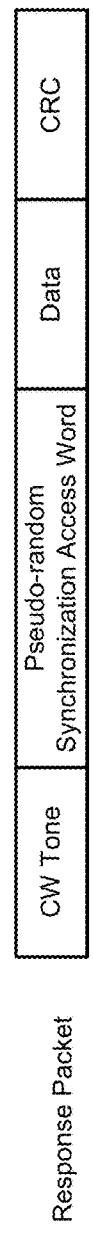
FIG. 58
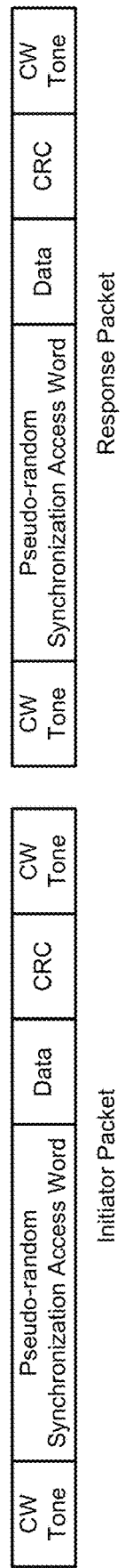
FIG. 59

PASSIVE ENTRY/PASSIVE START ACCESS SYSTEMS INCLUDING ROUND TRIP TIME SNIFFING

CROSS-REFERENCE TO RELATED APPLICATIONS

This application claims the benefit of U.S. Provisional Application No. 62/744,814, filed on Oct. 12, 2018, U.S. Provisional Application No. 62/801,392, filed on Feb. 5, 2019, and U.S. Provisional Application No. 62/826,212, filed on Mar. 29, 2019. The entire disclosures of the applications referenced above are incorporated herein by reference.

FIELD

The present disclosure relates to passive entry/passive start systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional passive entry/passive start (PEPS) systems allow keyless entry including providing a user access to various vehicle functions if the user possesses a key fob that has been paired with an in-vehicle PEPS electronic control unit (or PEPS module). As an example, the user in possession of the key fob may approach a vehicle having the PEPS module. The key fob communicates with the PEPS module and if the key fob is authenticated, the PEPS module may unlock doors of the vehicle. The PEPS module (i) performs an authentication process to determine if the key fob is authorized to access the vehicle, and (ii) determines a location of the key fob relative to the vehicle. The authentication process may include the exchange of an encrypted password or signature. If the password or signature is correct, then the key fob is determined to be authorized. Location of the key fob may be determined based on, for example, strength of a signal received from the key fob. If the key fob is authenticated and is located within an authorized zone of the vehicle, then access to the interior of the vehicle is permitted without use of a traditional key.

As another example, the user in possession of the key fob may activate a vehicle function by pushing a button on the key fob. In response to pushing the button, the key fob communicates with the PEPS module and if the key fob is authenticated and within a predetermined distance of the vehicle, the PEPS module performs the stated function (e.g., starts the vehicle, opens a door, sets off an alarm, etc.) associated with the button pressed on the key fob. The communication performed for the two examples may include the key fob and the PEPS module performing a one-way low-frequency (LF) wake-up function and a one-way or two-way radio frequency (RF) authentication function.

A phone as a key (PAK) vehicle access system can operate similarly as the stated PEPs system, except the vehicle is accessed using a mobile phone rather than a key fob. As an example, the mobile phone can communicate with a PAK module or a telematics control unit (TCU) in the vehicle to begin an access pairing process. The mobile phone and either the PAK module or the TCU perform the access pairing process to establish a trust relationship. The pairing process can include Bluetooth® pairing whereby: security information is exchanged between the mobile phone and the vehicle directly; a mobile phone address, a mobile phone identity resolving key, a reservation identifier and/or an encryption key are exchanged via a cloud-based network; and/or the mobile phone presents a certificate to the vehicle, where the certificate is signed by (i) the mobile phone, (ii) a trusted security signing authority such as a manufacturer of the vehicle, and/or (iii) a trusted third party. In the case of a certificate, the certificate can include an identifier of a person authorized to access a vehicle, an identifier of a cloud-based network authorized to transfer the certificate, an identifier of a rental or lease agreement of the vehicle, an identifier of the vehicle, a date and time period during which the vehicle is permitted for use by the authorized person, and/or other restrictions and/or access/license information.

For passive entry, some user action is typically needed to initiate a process of waking up a key fob or mobile phone (referred to as portable access devices). For example, this may include a user approaching the vehicle with a portable access device and/or touching and/or pulling on a door handle. When a PEPS module or a PAK module, which are referred to as access modules, detects this behavior, the access module performs a localization process to begin searching for and waking up the key fob. In a one-way RF system, a LF downlink signal (e.g., 125 kilo-Hertz (kHz) signal) is transmitted from the access module to the key fob to wake-up the key fob to send commands and data for authentication purposes to the key fob. The key fob then transmits a response signal to the access module via an RF uplink. The response signal may be at an ultra-high frequency (e.g., 315 mega-Hertz (MHz) or 433 MHz). In a two-way RF system, a LF downlink signal is transmitted from the access module to the key fob to wake-up the key fob and establish a bidirectional RF link between the access module and the key fob. The bidirectional RF link may transmit signals at an UHF frequency (e.g., 315 MHz, 422 MHz, 868 MHz or 915 MHz). The bi-directional RF link is then used to authenticate the key fob. The key fob includes a microcontroller that remains in a sleep mode (or low power listening mode) that constantly checks for a valid LF signal. Once a valid LF signal containing a correct vehicle specific wake-up identifier, the microcontroller generates a signal to wake-up a PEPS controller to communicate with the access module of the vehicle.

A vehicle may have, for example, 4-6 LF antennas that produce an LF magnetic field. A controller of the key fob measures a LF signal level during communication with the access module. The controller determines a received signal strength indicator (RSSI) and provides the RSSI to the access module. The access module then determines a location of the key fob based on the RSSI. The key fob includes three discrete antenna coils or one 3D-coil, which are used to determine x, y, and z axes values indicative of a location of the key fob.

A smartphone, a wearable device, and/or other smart portable network device may perform as a key fob. The smart portable network devices may enable various vehicle functions and long range distancing features, such as passive welcome lighting, distance bounding on remote parking applications, etc.

SUMMARY

A multi-axis polarized RF antenna assembly is provided and includes a circular polarized antenna, a circular isolator, and a linear polarized antenna. The circular polarized antenna includes a conductive ring-shaped body having an inner hole. The circular isolator is connected to the conductive ring-shaped body. The linear polarized antenna is connected to the circular polarized antenna and the circular isolator and extending outward from the circular isolator. The linear polarized antenna includes a sleeve and a conductive element extending through the sleeve. The linear polarize antenna extends orthogonal to a radius of the circular polarized antenna.

In other features, the conductive element is a wire. In other features, the sleeve is formed of polytetrafluoroethene. The conductive element is formed of copper.

In other features, the linear polarized antenna is configured to extend downward from the circular polarized antenna when is use.

In other features, the circular polarized antenna is a 2-axis antenna. The linear polarize antenna is a single axis antenna.

In other features, the multi-axis polarized RF antenna assembly further includes a ground layer. The circular isolator is disposed on the ground plane, between the conductive element and the ground plane, and between the circular polarized antenna and the ground plane.

In other features, the circular polarized antenna includes two feed points 90° phase offset and configured to receive signal 90° out of phase from each other.

In other features, a vehicle is provided and includes a body and a roof. The roof includes the multi-axis polarized RF antenna assembly. The multi-axis polarized RF antenna assembly is oriented in the roof, such that the linear polarized antenna extends downward from the circular polarized antenna.

In other features, a vehicle system is provided and includes the multi-axis polarized RF antenna assembly, a second multi-axis polarized RF antenna assembly and an access module. The multi-axis polarized RF antenna assembly is a first multi-axis polarized RF antenna assembly and is configured to be implemented in a vehicle. The second multi-axis polarized RF antenna assembly is configured to be implemented in the vehicle and includes: a second circular polarized antenna comprising a second conductive ring-shaped body having a second inner hole; a second circular isolator connected to the second conductive ring-shaped body; and a second linear polarized antenna connected to the second circular isolator and extending outward from the second circular isolator. The second linear polarized antenna includes a sleeve and a conductive element extending through the sleeve of the second linear polarized antenna. The second linear polarize antenna extends orthogonal to a radius of the second circular polarized antenna. The access module is connected to the first multi-axis polarized RF antenna assembly and the second multi-axis polarized RF antenna assembly and configured to communicate with a portable access device via the first multi-axis polarized RF antenna assembly and the second multi-axis polarized RF antenna assembly.

In other features, at any moment in time, at least one of the linear polarized antenna or the first multi-axis polarized RF antenna assembly is not cross-polarized with an antenna of the second multi-axis polarized RF antenna assembly.

In other features, the access module is configured to perform passive entry passive start operations or phone as a key operations including transmitting and receiving radio frequency signals via the first one of the multi-axis polarized RF antenna assembly and the second one of the multi-axis polarized RF antenna assembly.

In other features, the access module is configured to permit access to the vehicle based on the radio frequency signals.

In other features, the access module is configured to execute an algorithm to determine which antenna pair of the first one of the multi-axis polarized RF antenna assembly and the second one of the multi-axis polarized RF antenna assembly to use for communication with the portable access device. In other features, the portable access device is a key fob or a cellar phone.

In other features, a method of communicating with a portable access device is provided. The method includes iteratively performing an algorithm via an access module of a vehicle, wherein the algorithm includes a series of operations including: selecting a frequency from frequencies; selecting an antenna pair from possible antenna pairs; where antennas of the possible antenna pairs include antennas with different polarized axes; transmitting a packet to the portable access device via the selected antenna pair; receiving a first received signal strength indicator (RSSI) and a response signal from the portable access device, where the first RSSI corresponds to the transmission of the packet; and measuring a second RSSI of the response signal. Based on the first RSSIs and the second RSSIs, a best one of the frequencies and a best antenna pair of the possible antenna pairs are selected. One or more additional packets are transmitted using the selected best frequency and the selected best antenna pair.

In other features, each selected antenna pair includes one of the linear polarized antennas and one of the circular polarized antennas.

In other features, the method of claim 1, further includes: transmitting the one or more additional packets to authorize the portable access device; determining whether the portable access device is authorized to access an interior of the vehicle; and permitting access to an interior of the vehicle if the portable access device is authorized.

In other features, the method further includes: measuring time-of-flight of the one or more additional packets including time to transmit the one or more additional packets to the portable access device and time to receive one or more responses from the portable access device; and based on the measured time-of-flight, estimating a distance between the vehicle and the portable access device.

In other features, the estimated distance is used to detect whether another device is attempting to perform a range extender type relay station attack. In other features, the method of claim 4, further includes, if the another device is attempting to perform a range extender type relay station attack, performing a countermeasure including preventing access to the interior of the vehicle. In other features, the countermeasure includes notifying an owner of the vehicle of the range extender type relay station attack.

In other features, the method further includes: exchanging multiple pairs of unmodulated carrier tones with the portable access device at multiple frequencies, wherein the pairs of unmodulated carrier tones include received tones and transmitted tones; measuring phase of received tones relative to transmitted tones and gathering frequency data; and estimating a distance between the vehicle and the portable access device based on the measured phases and frequency data.

In other features, the method includes determining whether another device is attempting to perform a range extender type relay station attack based on the estimated distance. In other features, the each selected antenna pair includes linear polarized antennas.

In other features, the algorithm includes switching between the possible antenna pairs between consecutively transmitted packets. In other features, the algorithm includes switching between the possible antenna pairs during transmission of a portion of a packet. In other features, the portion of the packet is a continuous wave tone.

In other features, certain ones of the possible antenna pairs include two antennas that are collocated.

In other features, the method further includes: transmitting packets to the portable access device; measuring time-of-flight values for the packets based on response signals received from the portable access device, where the response signals are transmitted based on the packets; based on the time-of-flight values, determining whether the another device is performing a range extender type relay station attack; and preventing access to an interior of the vehicle in response to detecting the range extender type relay station attack.

In other features, the portable access device is a key fob or a cellar phone. In other features, the method further includes encrypting an identifier of the best antenna pair. The transmission of the one or more additional packets includes the encrypted identifier of the best antenna pair.

In other features, a vehicle system for communicating with a portable access device is provided. The vehicle system includes antennas with different polarized axes and an access module. The access module is configured to iteratively perform an algorithm. The algorithm includes a series of operations including: selecting a frequency from multiple frequencies; selecting an antenna pair from the antennas with different polarized axes; transmitting a packet to the portable access device via the selected antenna pair; receiving a first RSSI and a response signal from the portable access device, wherein the first RSSI corresponds to the transmission of the packet; and measuring a second RSSI of the response signal. The access module is configured to: based on the first RSSIs and the second RSSIs, select a best one of the frequencies and a best antenna pair of the antenna pairs; and transmit one or more additional packets using the selected best frequency and the selected best antenna pair.

In other features, the access module is configured to: measure time-of-flight of the one or more additional packets including time to transmit the one or more additional packets to the portable access device and time to receive one or more responses from the portable access device; and based on the measured time-of-flight, estimate a distance between the vehicle and the portable access device.

In other features, the access module is configured to: exchange multiple pairs of unmodulated carrier tones with the portable access device at multiple frequencies, wherein the unmodulated carrier tones include received tones and transmitted tones; measure the phases of the received tones relative to the transmitted tones; gather the measured phases and frequency data; and estimate distance between the vehicle and the portable access device using the measured phases and the frequency data.

In other features, the access module is configured to detect whether the portable access device is attempting to perform a range extender type relay station attack based upon the estimated distance.

In other features, the access module is configured to detect whether a device is attempting to perform a range extender type relay station attack based upon the estimated distance.

In other features, the access module is configured to, if the portable access device is attempting to perform a range extender type relay station attack, perform a countermeasure including preventing access to the interior of the vehicle.

In other features, the countermeasure includes notifying an owner of the vehicle of the range extender type relay station attack. In other features, the portable access device is a key fob or a cellar phone.

In other features, the portable access device is configured to encrypt an identifier of the best antenna pair. The transmission of the one or more additional packets includes the encrypted identifier of the best antenna pair.

In other features, a system for detecting a range extension type relay attack is provided. The system includes a first transmitter, a receiver and a first module. The first transmitter is configured to transmit a first radio frequency signal from one of a vehicle and a portable access device to the other one of the vehicle and the portable access device. The receiver is configured to receive a first response signal from one of the vehicle and the portable access device in response to the first radio frequency signal. The first module is configured to: monitor or generate one or more parameters associated with the transmission of the first radio frequency signal and the reception of the first response signal; based on the one or more parameters, detect the range extension type relay attack performed by an attacking device to obtain at least one of access to or operational control of the vehicle, where at least one of (i) the first radio frequency signal is relayed via the attacking device from the vehicle to the portable access device, or (ii) the first response signal is relayed via the attacking device from the portable access device to the vehicle; and perform a countermeasure in response to detecting the range extension type relay attack.

In other features, the first module is implemented at the vehicle. In other features, the first module is implemented at the portable access device.

In other features, the first module is configured to: measure a round trip time of the first radio frequency signal; and based on the round trip time, detect the range extension type relay attack.

In other features, the first module is configured to: transmit a second radio frequency signal and receive a second response signal, prior to transmission of the first radio frequency signal and reception of the first response signal; monitor at least one of a first received signal strength indicator of the second radio frequency signal or a second received signal strength indicator of the second response signal; and based on at least one of the first received signal strength indicator or the second received signal strength indicator, determine at least one of a path, a frequency, a channel, or an antenna pair for transmission of the first radio frequency signal and reception of the first response signal.

In other features, the first module is configured to: transmit a second radio frequency signal and receive a second response signal, prior to transmission of the first radio frequency signal and reception of the first response signal; monitor an antenna polarization status corresponding to at least one of the second radio frequency signal or the second response signal; and based on the antenna polarization status of the at least one of the first radio frequency signal or the first response signal, determine at least one of a path, a frequency, a channel, or an antenna pair for transmission of the first radio frequency signal and reception of the first response signal.

In other features, the first module is configured to transmit the first radio frequency signal while receiving the first response signal or a second radio frequency signal from one of the vehicle and the portable access device.

In other features, the first module is configured to receive the first response signal while receiving a second radio frequency signal from one of the vehicle and the portable access device.

In other features, the first module is configured to: determine a series of randomly selected frequencies or channels; share the series of randomly selected frequencies or channels with one of vehicle and the portable access device; and transmit the first radio frequency signal and receive the first response signal based on the randomly selected frequencies or channels.

In other features, the first module is configured to: randomize access addresses for the vehicle or the portable access device; share the randomized access addresses with the portable access device; and generate the first radio frequency signal to include one of the access addresses.

In other features, the first module is configured to: measure a length of at least one bit of the first response signal; and detect the range extension type relay attack based on the length of the at least one bit.

In other features, the first module is configured to: monitor slopes of the rising and falling edges of the first response signal; and detect the range extension type relay attack based on the slopes.

In other features, the first module is configured to: use a sliding correlation function to align the first response signal with an idealized Gaussian waveform for a known bit pattern and bit rate including scaling peaks and aligning zero offsets; and based on the alignment, detect the range extension type relay attack.

In other features, the first module is configured to: accumulate portions of the first response signal that are early after a zero crossing and before a next peak of a predetermined waveform; determining an average based on the accumulated portions; and detect the range extension type relay attack based on the average.

In other features, the first module is configured to: accumulate portions of the first response signal that are late after a peak and before a next zero crossing of a predetermined waveform; determining an average based on the accumulated portions; and detect the range extension type relay attack based on the average.

In other features, the first module is configured to randomize travel direction of the first radio frequency signal including whether the first radio frequency signal is transmitted from the vehicle to the portable access device or from the portable access device to the vehicle.

In other features, the countermeasure includes preventing at least one of access to or operation control of the vehicle.

In other features, the system further includes a second transmitter configured to transmit a dummy signal while the first transmitter transmits the first radio frequency signal or the receiver receives the first response signal.

In other features, the system includes: the first module implemented at the vehicle; and the portable access device comprising a second module. The first module is configured to transmit the first radio frequency signal to the portable access device and receive the first response signal from the portable access device. The second module is configured to transmit a second radio frequency signal to the vehicle and receive a second response signal from the vehicle. At least one of the first module transmits the first radio frequency signal while the second module transmits the first response signal or the second radio frequency signal, or the first module receives the first response signal while the second module transmits the second radio frequency signal.

In other features, the first module and second module are configured to: exchange at least three pairs of radio signals containing sections of unmodulated carrier tones, wherein the unmodulated carrier tones include received tones and transmitted tones; and measure phases of the received tones relative to the transmit tones. One or more of the first module and the second module is configured to: gather frequency and phase information; and estimate the distance between the first module and the second module based upon the phase and frequency information.

In other features, the one or more of the first module and the second module is configured to use the estimated distance to detect a range extension type relay attack.

In other features, a method of detecting a range extension type relay attack is provided. The method includes: transmitting, via a transmitter, a radio frequency signal from one of a vehicle and a portable access device to the other one of the vehicle and the portable access device; receiving, via a receiver, a response signal from one of the vehicle and the portable access device in response to the radio frequency signal; monitoring or generating one or more parameters associated with the transmission of the radio frequency signal and the reception of the response signal; and based on the one or more parameters, detecting the range extension type relay attack performed by an attacking device to obtain at least one of access to or operational control of the vehicle. At least one of (i) the radio frequency signal is relayed via the attacking device from the vehicle to the portable access device, or (ii) the response signal is relayed via the attacking device from the portable access device to the vehicle. The method further includes: performing a countermeasure in response to detecting the range extension type relay attack; measuring a round trip time of the radio frequency signal; monitoring at least one of a first received signal strength indicator of the radio frequency signal or a second received signal strength indicator of the response signal; and based on the round trip time, detecting the range extension type relay attack.

In other features, a system for accessing or providing operational control of a vehicle is provided. The system includes a master device including: a first antenna module comprising first antennas with different polarized axes; a transmitter configured to transmit a challenge signal via the first antenna module from the vehicle to a slave device, wherein the slave device is a portable access device; and a first receiver configured to receive a response signal in response to the challenge signal from the slave device. The system further includes a first sniffer device including: a second antenna module comprising second antennas with different polarized axes; and a second receiver configured to receive, via the second antenna module, the challenge signal from the transmitter and the response signal from the slave device. The first sniffer device is configured to measure when the challenge signal and the response signal arrive at the first sniffer device to provide arrival times. The master device or the first sniffer device is configured to (i) estimate at least one of a distance from the vehicle to the slave device or a location of the slave device relative to the vehicle based on the arrival times, and (ii) prevent at least one of access to or operation control of the vehicle based on the estimated at least one of the distance or the location.

In other features, the master device or the first sniffer device is configured to: determine a round trip time associated with the transmission of the challenge signal based on the arrival times; and based on the round trip time, detect a range extension type relay attack performed by an attacking device to obtain at least one of access to or operational control of the vehicle. The response signal is relayed by the attacking device from the slave device to the vehicle and altered by the attacking device. The master device is configured to perform a countermeasure in response to detecting the range extension type relay attack.

In other features and at any moment in time, at least one of the first antennas of the first antenna module is not cross-polarized with at least one of the second antennas of the second antenna module.

In other features and at any moment in time, at least one of the first antennas of the first antenna module is not cross-polarized with an antenna of the slave device.

In other features, the master device or the first sniffer device is configured to: determine a first amount of time for the first sniffer device to receive the challenge signal and a second amount of time for the sniffer device to receive the response signal; and based on the first amount of time and the second amount of time, estimate the distance.

In other features, the system further includes a second sniffer and a third sniffer. The second sniffer device includes a third antenna module including third antennas and a third receiver configured to receive, via the third antenna module, the challenge signal from the transmitter and the response signal from the slave device. The third sniffer device includes a fourth antenna module including fourth antennas and a fourth receiver configured to receive, via the fourth antenna module, the challenge signal from the transmitter and the response signal from the slave device. The second sniffer device is configured to measure when the challenge signal and the response signal arrive at the second sniffer device to provide arrival times. The third sniffer device is configured to measure when the challenge signal and the response signal arrive at the third sniffer device to provide arrival times. The master device, the first sniffer device, the second sniffer device, or the third sniffer device is configured to estimate the location based on the arrival times provided by the first sniffer device, the arrival times provided by the second sniffer device, and the arrival times provided by the third sniffer device.

In other features, the first sniffer device is configured to determine a first amount of time for the first sniffer device to receive the response signal. The second sniffer device is configured to determine a second amount of time for the second sniffer device to receive the response signal. The third sniffer device is configured to determine a third amount of time for the third sniffer device to receive the response signal. The master device, the first sniffer device, the second sniffer device, or the third sniffer device is configured to estimate the location based on the first amount of time, the second amount of time and the third amount of time.

In other features, the master device is configured to periodically send the challenge signal or other challenge signals to the slave device and receive respective response signals from the slave device. The first sniffer device is configured to measure when the challenge signals and the response signals arrive at the first sniffer device to provide corresponding arrival times. The master device or the first sniffer device is configured to (i) update the at least one of the distance or the location based on the arrival times associated with the challenge signals and the response signals, and (ii) prevent at least one of access to or operation control of the vehicle based on the at least one of the updated distance or the updated location.

In other features, a method for accessing or providing operational control of a vehicle is provided. The method includes: transmitting a challenge signal via a first antenna module from a master device of the vehicle to a slave device, where the first antenna module includes first antennas with different polarized axes; receiving at a first receiver a response signal in response to the challenge signal from the slave device; receiving at a first sniffer device, via a second antenna module and a second receiver, the challenge signal from the master device and the response signal from the slave device, wherein the second antenna module includes second antennas with different polarized axes; measuring when the challenge signal and the response signal are received at the first sniffer device to provide arrival times via the first sniffer device; estimating at least one of a distance from the vehicle to the slave device or a location of the slave device relative to the vehicle based on the arrival times; and preventing at least one of access to or operation control of the vehicle based on the estimated at least one of the distance or the location.

In other features, the method includes: determining a round trip time associated with the transmission of the challenge signal based on the arrival times; based on the round trip time, detecting a range extension type relay attack performed by an attacking device to obtain at least one of access to or operational control of the vehicle, where the response signal is relayed via the attacking device from the slave device to the vehicle and altered by the attacking device; and performing a countermeasure in response to detecting the range extension type relay attack.

In other features and at any moment in time, at least one of the first antennas of the first antenna module is not cross-polarized with at least one of the second antennas of the second antenna module.

In other features and at any moment in time, at least one of the first antennas of the first antenna module is not cross-polarized with an antenna of the slave device.

In other features, the method further includes: determining a first amount of time for the first sniffer device to receive the challenge signal and a second amount of time for the sniffer device to receive the response signal; and based on the first amount of time and the second amount of time, estimating the distance.

In other features, the method further includes: receiving at a third receiver of a second sniffer device, via a third antenna module, the challenge signal from the transmitter and the response signal from the slave device, where the third antenna module includes a third antennas with different polarized axes; and receiving at a fourth receiver of a third sniffer device, via a fourth antenna module, the challenge signal from the transmitter and the response signal from the slave device. The fourth antenna module comprises a fourth plurality of antennas with different polarized axes. The method further includes: measuring when the challenge signal and the response signal arrive at the second sniffer device to provide arrival times via the second sniffer device; measuring when the challenge signal and the response signal arrive at the third sniffer device to provide arrival times via the third sniffer device; and estimating the location based on the arrival times provided by the first sniffer device, the arrival times provided by the second sniffer device, and the arrival times provided by the third sniffer device.

In other features, the method further includes: determining a first amount of time for the first sniffer device to receive the response signal; determining a second amount of time for the second sniffer device to receive the response signal; determining a third amount of time for the third sniffer device to receive the response signal; and estimating the location based on the first amount of time, the second amount of time and the third amount of time.

In other features, periodically sending from the master device the challenge signal or other challenge signals to the slave device and receiving respective response signals from the slave device; measuring at the first sniffer device when the challenge signals and the response signals arrive at the first sniffer device to provide corresponding arrival times; updating the at least one of the distance or the location based on the arrival times associated with the challenge signals and the response signals; and preventing at least one of access to or operation control of the vehicle based on the at least one of the updated distance or the updated location.

In other features, a system for accessing or providing operational control of a vehicle is provided. The system includes a first network device and a control module. The first network device includes a first antenna module, a transmitter and a receiver. The first antenna module includes antennas with different polarized axes. The transmitter is configured to transmit a series of tones via the first antenna module from the vehicle to a second network device and change the frequencies of the tones during the transmission of the series of tones. At any moment in time, at least one of the antennas of the first antenna module is not cross-polarized with an antenna of the second network device. The receiver is configured to receive the series of tones from the second network device. The control module is configured to (i) determine differences in phases of the series of tones versus differences in frequencies of the series of tones, (ii) based on the differences in the phases and the differences in the frequencies, determine a distance between the first network device and the second network device, and (iii) prevent at least one of access to or operation control of the vehicle based on the distance.

In other features, the control module is configured to: for each of the tones, change a corresponding frequency during transmission of that tone; generate curves respectively for the tones relating changes in phases of each of the tones to changes in frequencies; determine slopes of the curves; and determine the distance based on the slopes of the curves.

In other features, the control module randomizes a channel selected for the transmission of the series of tones.

In other features, the control module randomizes a direction that tones are transmitted between the first network device and the second network device. The tones include one or more of the tones in the series of tones.

In other features, the control module is configured to: transmit and receive series of tones via the transmitter and the receiver; and based on differences in phases and corresponding differences in frequencies of the series of tones, determine the distance.

In other features, the system further includes the second network device. The first network device includes a first tone exchange responder and a first tone exchange initiator. The first tone exchange initiator includes the transmitter. The first tone exchange responder includes the receiver. The second network device includes a second tone exchange responder and a second tone exchange initiator. The second tone exchange responder responds to the series of tones by transmitting the series of tones or a second series of tones back to the first tone exchange initiator. The second tone exchange initiator transmits a third series of tones to the first tone exchange responder.

In other features, the control module is configured to determine the distance based on at least one of (i) differences in phases of the second series of tones versus differences of frequencies of the second series of tones, or (ii) differences in phases of the third series of tones versus differences of frequencies of the third series of tones.

In other features, the first network device is implemented within the vehicle. The second network device is a portable access device.

In other features, the first network device simultaneously transmits two symbols on two different frequencies to the second network device. The two symbols are each less than or equal to 1 µs in length to prevent a successful attack.

In other features, clock timing of the first network device and the second network device are synchronized. The first network device transmits a first symbol to the second network device on a first frequency. The second network device transmits a second symbol to the first network device simultaneously with the transmission of the first symbol by the first network device to the second network device. The first symbol and the second symbol are each less than or equal to 1 µs in length to prevent a successful attack.

In other features, a method of accessing or providing operational control of a vehicle is provided. The method includes: transmitting a series of tones from a first network device via a transmitter and a first antenna module to a second network device and change the frequencies of the tones during the transmission of the series of tones, where the first antenna module including antennas, and where, at any moment in time, at least one of the antennas of the first antenna module is not cross-polarized with an antenna of the second network device; receiving at a receiver in the vehicle the series of tones from the second network device; determining differences in phases of the series of tones versus differences in frequencies of the series of tones; based on the differences in the phases and the differences in the frequencies, determining a distance between the first network device and the second network device; and preventing at least one of access to or operation control of the vehicle based on the distance.

In other features, the method further includes: for each of the tones, changing a corresponding frequency during transmission of that tone; generating curves respectively for the tones relating changes in phases of each of the tones to changes in frequencies; determining slopes of the curves; and determining the distance based on the slopes of the curves.

In other features, the method further includes randomizing a channel selected for the transmission of the series of tones.

In other features, the method further includes randomizing a direction that tones are transmitted between the first network device and the second network device. The tones include one or more of the tones in the series of tones.

In other features, the method further includes: transmitting and receiving a series of tones via the transmitter and the receiver; and based on differences in phases and corresponding differences in frequencies of the series of tones, determining the distance.

In other features, the method further includes: responding to the series of tones via a second tone exchange responder of the second network device by transmitting the series of tones or a second series of tones back to a first tone exchange initiator of the first network device, where the first tone exchange initiator includes the transmitter; and transmitting a third series of tones via a second tone exchange initiator of the second network device to a first tone exchange responder of the first network device, wherein the first tone exchange responder includes the receiver.

In other features, the method further includes determining the distance based on at least one of (i) differences in phases of the second series of tones versus differences of frequencies of the second series of tones, or (ii) differences in phases of the third series of tones versus differences of frequencies of the third series of tones.

In other features, the first network device is implemented in the vehicle. The second network device is a portable access device.

In other features, a system for accessing or providing operational control of a vehicle is provided. The system includes an initiator device and a sniffer device. The initiator device includes: a first antenna module including multiple polarized antennas; a transmitter configured to transmit a first tone signal via the first antenna module from the vehicle to a responder device, where the responder device is a portable access device; a first receiver configured to receive a second tone signal from the responder device in response to the first tone signal. The sniffer device includes: a second antenna module comprising multiple polarized antennas; and a second receiver configured to receive, via the second antenna module, the first tone signal from the transmitter and the second tone signal from the responder device. The sniffer device is configured to determine states of the first tone signal and the second tone signal including respective phase delays. The initiator device or the sniffer device is configured to (i) estimate at least one of a first distance from the vehicle to the responder device or a second distance from the responder device to the sniffer device based on the states of the first tone signal and the second tone signal including respective phase delays, and (ii) prevent at least one of access to or operation control of the vehicle based on the estimated at least one of the first distance or the second distance.

In other features, the initiator device or the sniffer device is configured to estimate the first distance and the second distance and prevent at least one of access to or operation control of the vehicle based on the first distance and the second distance.

In other features, the initiator device or the sniffer device is configured to based on at least one of the first distance or the second distance, detect a range extension type relay attack performed by an attacking device to obtain at least one of access to or operational control of the vehicle. The second tone signal is relayed from the responder device to the vehicle and altered by the attacking device. The initiator device is configured to perform a countermeasure in response to detecting the range extension type relay attack.

In other features and at any moment in time, at least one of the multiple polarized antennas of the first antenna module is not cross-polarized with at least one of the multiple polarized antennas of the second antenna module.

In other features and at any moment in time, at least one of the multiple polarized antennas of the first antenna module is not cross-polarized with an antenna of the responder device.

In other features, the initiator device or the sniffer device is configured to: based on the state of the first tone signal when received at the responder device, determine a first amount of time for the first tone signal to travel from the initiator device to the responder device; based on the state of the second tone signal when received at the sniffer device, determine a second amount of time for the second tone signal to travel from the responder device to the sniffer device; and based on the first amount of time and the second amount of time, estimate the first distance and the second distance.

In other features, the initiator device or the sniffer device is configured to: generate a first representation of the first tone signal when received at the responder device in natural logarithmic form; generate a second representation of the first tone signal when received at the sniffer device in natural logarithmic form; generate a third representation of the second tone signal when received at the sniffer device in natural logarithmic form; and based on the first representation, the second representation and the third representation, estimate the first distance and the second distance.

In other features, a method for accessing or providing operational control of a vehicle is provided. The method includes: transmitting a first tone signal via a first antenna module from an initiator device of the vehicle to a responder device, where the first antenna module comprising multiple polarized antennas, and where the responder device is a portable access device; receiving at the initiator device a second tone signal from the responder device in response to the first tone signal; receiving at a sniffer device and via a second antenna module, the first tone signal from the transmitter and the second tone signal from the responder device, where the second antenna module comprising multiple polarized antennas; determining at the sniffer device states of the first tone signal and the second tone signal including respective phase delays; estimating at least one of a first distance from the vehicle to the responder device or a second distance from the responder device to the sniffer device based on the states of the first tone signal and the second tone signal including respective phase delays; and preventing at least one of access to or operation control of the vehicle based on the estimated at least one of the first distance or the second distance.

In other features, the method includes: estimating the first distance and the second distance; and preventing at least one of access to or operation control of the vehicle based on the first distance and the second distance.

In other features, the method further includes: based on at least one of the first distance or the second distance, detecting a range extension type relay attack performed by an attacking device to obtain at least one of access to or operational control of the vehicle, where the second tone signal is relayed from the responder device to the vehicle and altered by the attacking device; and performing a countermeasure in response to detecting the range extension type relay attack.

In other features and at any moment in time, at least one of the multiple polarized antennas of the first antenna module is not cross-polarized with at least one of the linear polarized antenna or the multiple polarized antennas.

In other features and at any moment in time, at least one of the multiple polarized antennas of the first antenna module is not cross-polarized with an antenna of the responder device.

In other features, the method further includes: based on the state of the first tone signal when received at the responder device, determining a first amount of time for the first tone signal to travel from the initiator device to the responder device; based on the state of the second tone signal when received at the sniffer device, determining a second amount of time for the second tone signal to travel from the responder device to the sniffer device; and based on the first amount of time and the second amount of time, estimating the first distance and the second distance.

In other features, a system for accessing or providing operational control of a vehicle is provided. The system includes a first network device and a control module. The first network device includes a first antenna module and a control module. The first antenna module includes multiple polarized antennas; a transmitter configured to transmit an initiator packet via the first antenna module from the vehicle to a second network device, where the initiator packet includes a synchronization access word and a first continuous wave (CW) tone, where one of the first network device and the second network device is implemented within the vehicle, and where the other one of the first network device and the second network device is a portable access device, and wherein, at any moment in time, at least one of the multiple polarized antennas of the first antenna module is not cross-polarized with an antenna of the second network device; and a receiver configured to receive a response packet from the second network device, wherein the response packet includes the synchronization access word and the first CW tone. The control module is configured to (i) determine a difference in round trip timing between the initiator packet and the response packet to be greater than a predetermined threshold, (ii) based on difference in timing being greater than the predetermined threshold, detect a range extension type relay attack performed by an attacking device to obtain at least one of access to or operational control of the vehicle, and (iii) in response to detecting the range extension type relay attack, prevent at least one of access to or operation control of the vehicle.

In other features, the control module is configured to: based on the initiator packet, determine a start time and an end time for the synchronization access word; and detect the difference in timing based on the start time and the end time.

In other features, the control module is configured to: based on the initiator packet, determine a start time and end time for the synchronization access word relative to the first CW tone of the response packet; determine if a start time and end time of the synchronization access word of the response packet match the determined start time and end time; and detect the difference in timing if the start time and end time of the synchronization access word of the response packet do not match the determined start time and end time.

In other features, the control module is configured to: determine a first length of the synchronization access word of the initiator packet; compare the first length to a second length of the synchronization access word of the response packet; and if a difference between the first length is more than a predetermined amount different than the second length, detect the range extension type relay attack.

In other features, the control module is configured to: determine a first length of the first CW tone of the initiator packet; compare the first length to a second length of the first CW tone of the response packet; and if a difference between the first length is more than a predetermined amount different than the second length, detect the range extension type relay attack.

In other features, the first CW tone of the initiator packet is at an end of the initiator packet; and the first CW tone of the response packet is at a beginning of the response packet.

In other features, the initiator packet comprises a second CW tone. The response packet comprises the second CW tone.

In other features, the first CW tone of the initiator packet is at a beginning of the initiator packet. The second CW tone of the initiator packet is at an end of the initiator packet. The first CW tone of the response packet is at a beginning of the response packet. The second CW tone of the response packet is at an end of the response packet.

In other features, the initiator packet and the response packet have a same format.

In other features, the response packet indicates an amount of phase difference between the second CW tone of the initiator packet and the first CW tone of the response packet. The first CW tone of the response packet is in a phase relationship with a phase locked loop of the responder.

In other features, the control module is configured to determine the phase difference between the first CW tone of the response packet and the second CW tone of the initiator packet. The second CW tone of the initiator packet is in a phase relationship with a phase locked loop of the initiator. The first device and second device are configured to determine a phase difference for a second frequency and a phase difference for a third frequency. The control module is configured to determine a distance between the devices based on (i) the phase difference between the first CW tone and the second CW tone, (ii) the phase difference for the second frequency, and (iii) the phase difference for the third frequency.

In other features, the control module is configured to compare a frequency, power levels, bits and amplitudes of a portion of a received signal including the response packet to a frequency, power levels, bits and amplitudes of a portion of a transmitted signal including the initiator packet, and based on resultant differences, determine if the range extension type relay attack has occurred.

In other features, a method for accessing or providing operational control of a vehicle is provided. The method includes: transmitting an initiator packet via a first antenna module of a first network device from the vehicle to a second network device, where the first antenna module comprising multiple polarized antennas, where the initiator packet includes a synchronization access word and a first continuous wave (CW) tone, where one of the first network device and the second network device is implemented within the vehicle, and where the other one of the first network device and the second network device is a portable access device, and where, at any moment in time, at least one of the multiple polarized antennas of the first antenna module is not cross-polarized with an antenna of the second network device; receiving a response packet from the second network device, where the response packet includes the synchronization access word and the first CW tone; determining a difference in timing between the initiator packet and the response packet to be greater than a predetermined threshold; based on difference in timing being greater than the predetermined threshold, detecting a range extension type relay attack performed by an attacking device to obtain at least one of access to or operational control of the vehicle; and in response to detecting the range extension type relay attack, preventing at least one of access to or operation control of the vehicle.

In other features, the method further includes: based on the initiator packet, determining a start time and an end time for the synchronization access word; and detecting the difference in timing based on the start time and the end time.

In other features, the method further includes: based on the initiator packet, determining a start time and end time for the synchronization access word relative to the first CW tone of the response packet; determining if a start time and end time of the synchronization access word of the response packet match the determined start time and end time; and detecting the difference in timing if the start time and end time of the synchronization access word of the response packet do not match the determined start time and end time.

In other features, the first CW tone of the initiator packet is at an end of the initiator packet; and the first CW tone of the response packet is at a beginning of the response packet.

In other features, the initiator packet comprises a second CW tone. The response packet comprises the second CW tone. The first CW tone of the initiator packet is at a beginning of the initiator packet. The second CW tone of the initiator packet is at an end of the initiator packet. The first CW tone of the response packet is at a beginning of the response packet. The second CW tone of the response packet is at an end of the response packet.

In other features, the method further includes determining a round trip time of the initiator packet based on an amount of phase delay. The response packet indicates the amount of phase delay between the first CW tone of the initiator packet and the first CW tone of the response packet.

In other features, a system for detecting a range extension type relay attack is provided. The system includes a transmitter, a receiver and a control module. The transmitter is configured to transmit a radio frequency signal from one of a vehicle and a portable access device to the other one of the vehicle and the portable access device. The receiver is configured to receive a response signal from one of the vehicle and the portable access device in response to the radio frequency signal. The control module is configured to: convert the response signal to an in-phase signal and a quadrature-phase signal; based on the radio frequency signal, the in-phase signal and the quadrature-phase signal, detect the range extension type relay attack performed by an attacking device to obtain at least one of access to or operational control of the vehicle, where at least one of (i) the radio frequency signal is relayed via the attacking device from the vehicle to the portable access device, or (ii) the response signal is relayed via the attacking device from the portable access device to the vehicle; and perform a countermeasure in response to detecting the range extension type relay attack.

In other features, the system further includes an antenna module. The antenna module is implemented at the one of the vehicle and the portable access device where the transmitter and the receiver are implemented. The antenna module includes multiple polarized antennas. At any moment in time, at least one of the multiple polarized antennas of the antenna module is not cross-polarized with an antenna of the other one of the vehicle and the portable access device.

In other features, the control module is implemented at the vehicle. In other features, the control module is implemented at the portable access device.

In other features, the control module is configured to: determine a difference in phase based on the in-phase signal and the quadrature-phase signal; measure a round trip time of the radio frequency signal based on the difference in phase; and based on the round trip time, detect the range extension type relay attack.

In other features, the control module is configured to: sample the in-phase signal and the quadrature-phase signal; and determine received bits based on the in-phase signal and the quadrature-phase signal.

In other features, the control module is configured to: up-sample the received bits on the in-phase signal and the quadrature-phase signal; up-sample another signal; cross-correlate results of the up-sampling the received bits based on the in-phase signal and the quadrature-phase signal with results of up-sampling the another signal; and determine the phase based on the results of the cross-correlation.

In other features, the another signal includes a reference bit pattern. The control module is configured to determine a sign of the differentiated arctangent signal, and based on the sign generate the reference bit pattern. In other features, the another signal includes the radio frequency signal after being filtered via a Gaussian low pass filter.

In other features, a method for detecting a range extension type relay attack is provided. The method includes: transmitting via a transmitter a radio frequency signal from one of a vehicle and a portable access device to the other one of the vehicle and the portable access device; receiving a response signal via a receiver from one of the vehicle and the portable access device in response to the radio frequency signal; converting via a control module the response signal to an in-phase signal and a quadrature-phase signal; based on the radio frequency signal, the in-phase signal and the quadrature-phase signal, detecting via the control module the range extension type relay attack performed by an attacking device to obtain at least one of access to or operational control of the vehicle, where at least one of (i) the radio frequency signal is relayed via the attacking device from the vehicle to the portable access device, or (ii) the response signal is relayed via the attacking device from the portable access device to the vehicle; and performing a countermeasure in response to detecting the range extension type relay attack.

In other features, an antenna module is implemented at the one of the vehicle and the portable access device where the transmitter and the receiver are implemented. The antenna module includes multiple polarized antennas. At any moment in time, at least one of the multiple polarized antennas of the antenna module is not cross-polarized with an antenna of the other one of the vehicle and the portable access device.

In other features, the control module is implemented at the vehicle. In other features, the control module is implemented at the portable access device.

In other features, the method further includes: determining a difference in phase based on the in-phase signal and the quadrature-phase signal; measuring a round trip time of the radio frequency signal based on the difference in phase; and based on the round trip time, detecting the range extension type relay attack.

In other features, the method further includes: sampling the in-phase signal and the quadrature-phase signal; and determining received bits based on the in-phase signal and the quadrature-phase signal.

In other features, the method further includes: up-sampling the received bits based on the in-phase signal and the quadrature-phase signal; cross-correlating results of the up-sampling the received bit with results of up-sampling the another signal; and determining the phase based on the results of the cross-correlation. In other features, the another signal includes a reference bit pattern. In other features, the another signal includes the radio frequency signal after being filtered via a Gaussian low pass filter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9 is an example electric field diagram and polar coordinate plot illustrating electric field patterns and nulls for a linear antenna;

FIG. 10 is an example voltage versus electric field diagram for a linearly polarized antenna;

FIG. 14 is a functional block diagram of an example of RF circuits and a portion of a portable access device in accordance with an embodiment of the present disclosure;

FIG. 24 is a block diagram of an example of a portion of the key fob of FIG. 15 with a portion of the metal trim and the spare key;

FIG. 30 is an example of a return loss versus frequency plot for the linear polarized slot antennas of FIG. 15;

FIG. 57 is a diagram of example initiator and responder packets used for RSSI and time-of-flight measurements, where the packet includes a continuous wave (CW) tone and a preamble in accordance with an embodiment of the present disclosure;

FIG. 58 is a diagram of example initiator and responder packets used for RSSI and time-of-flight measurements, where the packet includes a CW tone and not a preamble in accordance with an embodiment of the present disclosure;

FIG. 59 a diagram of example initiator and responder packets used for RSSI and time-of-flight measurements, where the packets are in the same format and include multiple CW tones and not a preamble in accordance with an embodiment of the present disclosure;

In the drawings, reference numbers may be reused to identify similar and/or identical elements.

DETAILED DESCRIPTION

RF devices may measure distances by unmodulated carrier tone exchange. For instance in U.S. Pat. No. 8,644,768 B2, which is incorporated herein by reference, a system and method for distance measurement between two nodes of a radio network is provided that uses unmodulated carrier tone exchange.

Figure 68:
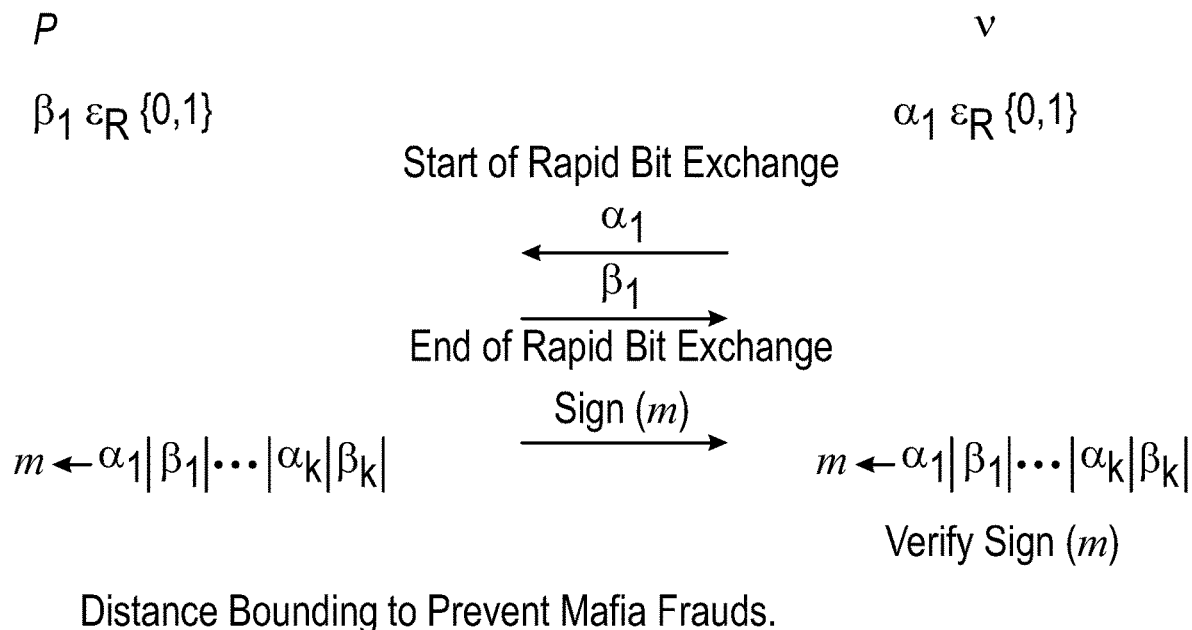
FIG. 68 is a diagram illustrating distance bounding while performing a rapid bit exchange, where a prover sequence can be cryptographically secure and pre-known, independent of a verifier sequence.
Figure 69:
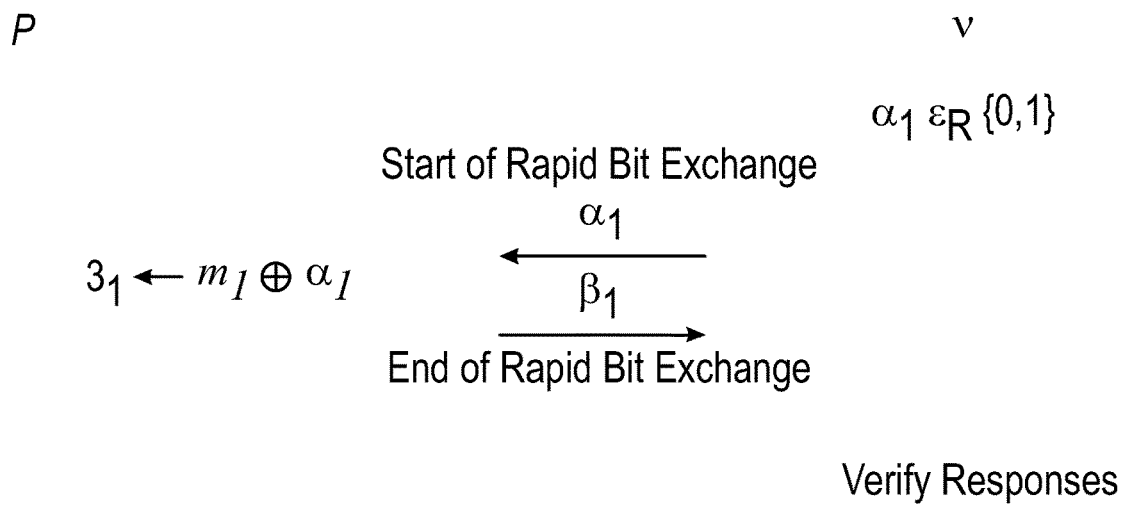
FIG. 69 is a diagram illustrating preventing response bit from being sent out too soon while performing a rapid bit exchange, where a prover sequence can be cryptographically secure and dependent upon a verifier sequence.

RF devices may measure or bound distances by round trip timing of a rapid exchange of cryptographically secure messages. For instance, in "Distance-Bounding Protocols (Extended abstract)" by Brands and Chaum in Workshop on the theory and application of cryptographic techniques on Advances in cryptology (EUROCRYPT '93), which is also incorporated herein by reference, a sequences of rapid bit exchanges between a verifier and a prover is used. The prover sequence can be cryptographically secure and pre-known, independent of the verifier sequence, as illustrated by FIG. 68. The prover sequence can be cryptographically secure and dependent upon the verifier sequence as illustrated by FIG. 69.

RF devices that measure distance by round trip timing may be subject to early detect and late commit attacks as described in "Attacks on Time-of-Flight Distance Bounding Channels" by Hancke and Kuhn in proceedings of the first ACM conference on Wireless network security (WiSec '08), which is also incorporated herein by reference. RF devices that measure distance by unmodulated carrier tone exchange can be subject to signal delay rollover attacks described in "On the Security of Carrier Phase-based Ranging" by Olafsdotter, Ranganathan, and Capkun from IACR Cryptology ePrint Archive 2016, which is also incorporated herein by reference.

Although traditional PEPS systems allow for keyless entry and starting of a vehicle, the traditional PEPS systems can be susceptible to range extender type relay station attacks. A range extender type relay station attack may refer to an attacker using a relay device to detect, amplify and relay signals between a key fob (or other smart portable network device) and a vehicle, such that an access module of the vehicle operates as if the key fob has approached and is in close proximity to the vehicle. When the attacker, for example, touches a door handle of the vehicle by hand and/or with the relay device, the access module may generate and transmit a LF wake-up signal. As a result, the relay device in effect is detected and the access module transmits the LF wake-up signal to the key fob, which is received at the relay device. The relay device receives, amplifies and forwards (or rebroadcast) the LF wake-up signal to the actual key fob. The key fob may be, for example, located within a residential home, whereas the vehicle may be parked outside or in front of the residential home. The key fob may receive the amplified wake-up signal and generate a response signal and/or begin communicating on an RF link. The response signal and/or RF communication signals are amplified and relayed between antennas on the vehicle and one or more antennas of the key fob. This may be done via the relay device. As a result, the relay device is seen by the access module as being the key fob and "tricks" the access module into operating as if the key fob was in the location of the relay device, which causes the access module to provide unauthorized access to the interior of the vehicle.

In addition, antenna systems of current PEPS systems may prevent the PEPS system from accurately estimating the distance between the key fob and the vehicle and accurately estimating the location of the key fob relative to the vehicle as further described below. The distance and location may be determined based on a time-of-flight measurement. Time-of-flight and corresponding received signal strengths are measured. A received signal strength indicator (RSSI) having the largest magnitude typically corresponds to a direct or shortest distance between the key fob and the vehicle. A time-of-flight measurement associated with the largest RSSI is used to calculate the distance between the key fob and the vehicle.

The examples set forth herein include combined LF and RF PEPS key fob that uses RF round trip timing (RTT) measurements to prevent range extender type relay station attacks. Other examples include RTT measurements, carrier phase based ranging, and a combination of RTT measurements and carrier phase based ranging in PEPS systems. The examples also set forth numerous other features, which are further described below.

Figure 1:
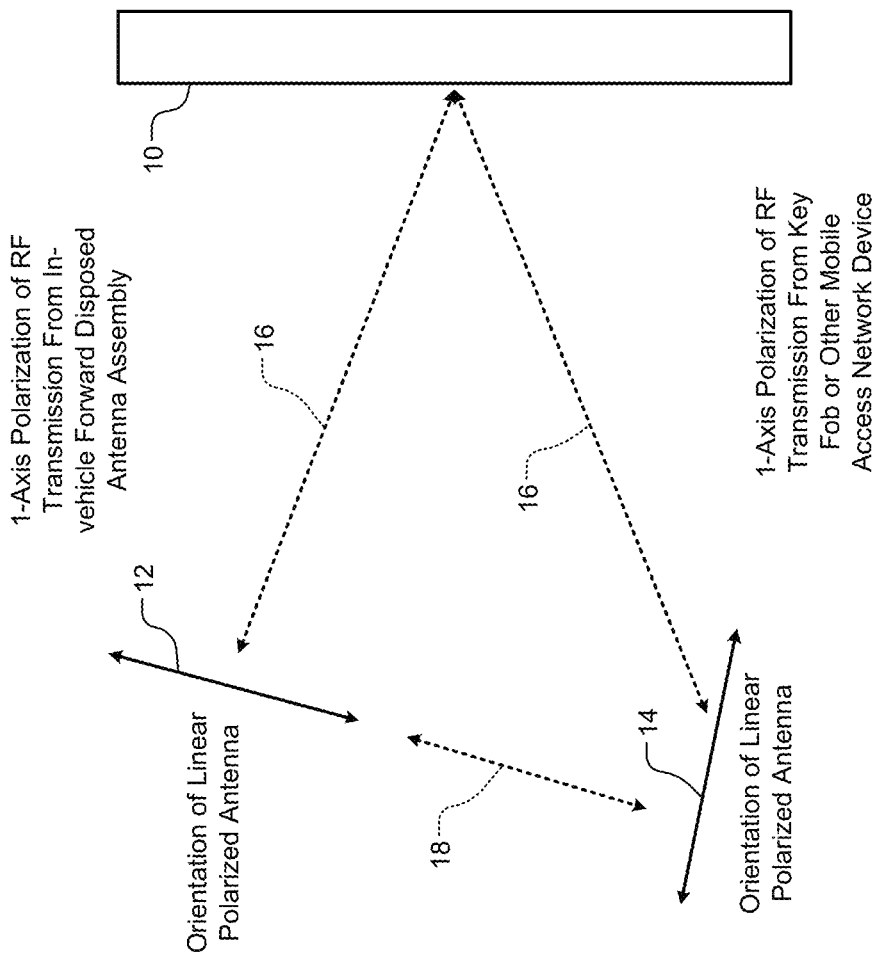
FIG. 1 is a side view of an object illustrating a RF primary higher power signal traveling along a bounce path due to cross-polarization of RF antennas.

FIG. 1 shows an example of when cross-polarization of antennas can cause an inaccurate distance determination between a first RF antenna of a key fob and a second RF antenna of a vehicle. If the first RF antenna of the key fob is disposed relative to the second RF antenna of the vehicle, such that the first RF antenna is cross-polarized with the second RF antenna, the distance determined corresponds to a bounce path rather than a direct path. The antennas are cross-polarized, for example, when polarizations of the antennas are perpendicular to each other. An example of this is shown in FIG. 1.

FIG. 1 shows an object 10 and polarization axes 12, 14 of respective RF antennas. The antennas are linear polarized antennas. The first RF antenna has a first polarization axis 12 and is in a vehicle. The second RF antenna has the second polarization axis 14 and is in a key fob. Due to relative positions of the first RF antenna, the second RF antenna and the object 10, RF signals 16 transmitted from the antennas may bounce off the object 10. Signal energy (or voltage) corresponding to the bounce path is greater than signal energy (or voltage) corresponding to a direct path 18 between the antennas. This is due to cross-polarization of RF antennas. An access module that determines distance between the antennas based on a signal path having the most signal energy or voltage may inaccurately determine the distance between the antennas to be the length of the bounce path 16 rather than a length of the direct path 18.

Aligning the nulls in a co-polarized antenna arrangement also causes a bounce path to be used. This occurs when the first and second RF antennas are pointed in the same direction. The antennas may be positioned such that a line extends longitudinally through the antennas. This is further described with respect to FIGS. 9-10.

Examples set forth herein include polarization diversity for RF signal transmission between RF antennas of a vehicle and RF antennas of portable access devices (e.g., key fobs, mobile phones, wearable devices, etc.). In addition, the examples include pseudo-random bi-directional data exchanges. Polarization diversity is provided to assure that, at any moment in time, at least one transmitting antenna has at least one polarization axis that is not cross-polarized, but is somewhat co-polarized with a polarization axis of at least one receiving antenna, co-polarized without colinear nulls. As used herein, the phrase "at any moment in time" means at all times while the corresponding devices are in communication with each other and/or at all times while one or more signals are being transmitted between the devices and while one or more signals are being received by one or more of the devices. This, in addition to allowing for accurate distance determinations, also aids in preventing range extender type relay station attacks. Pseudo-random bi-directional data exchanges as described below also aid in preventing range extender type relay station attacks.

Example embodiments will now be described more fully with reference to the accompanying drawings.

Figure 2:
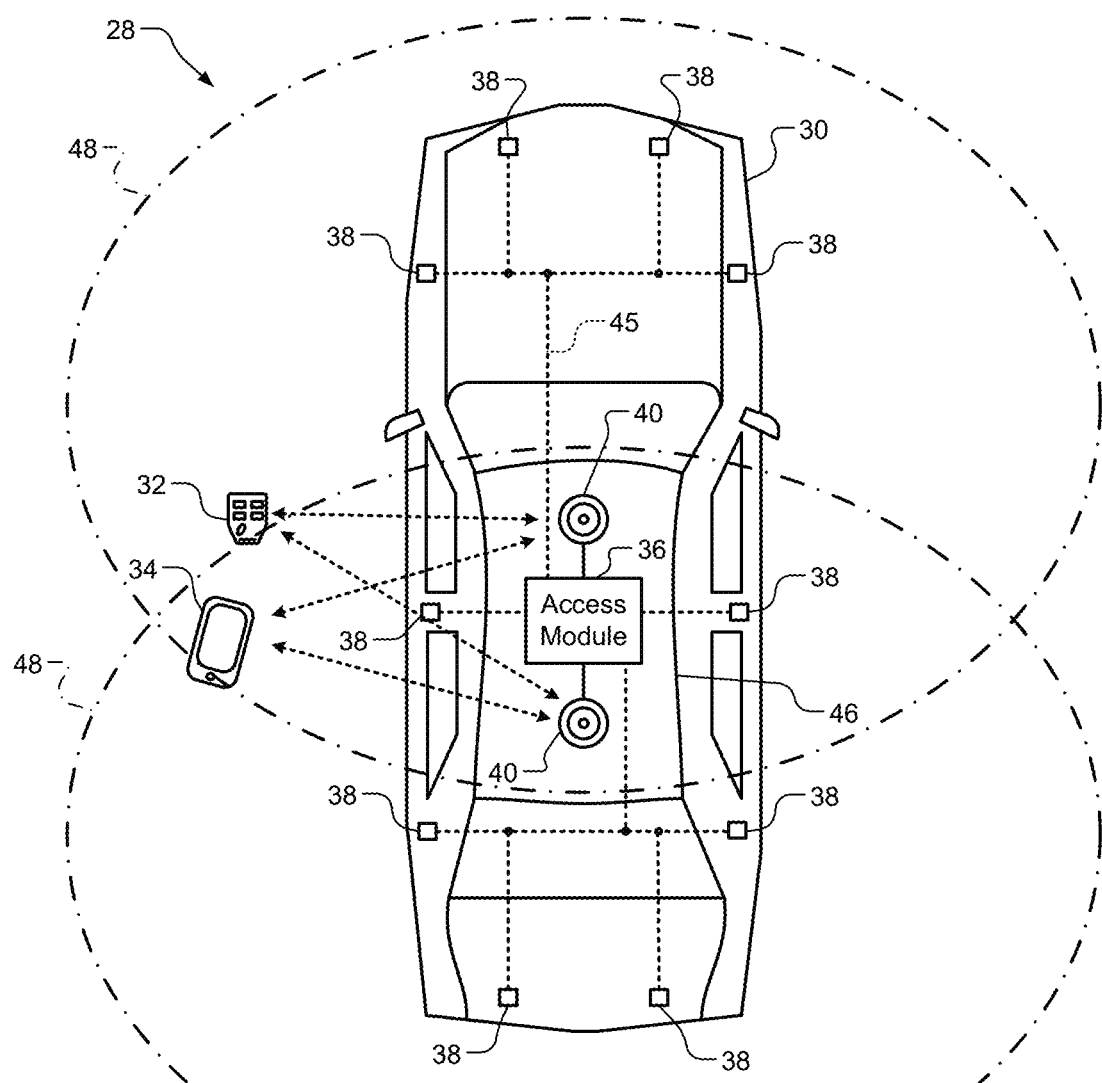
FIG. 2 is a functional block diagram of an example of a vehicle access system including an access module, RF antennas, and portable access devices in accordance with an embodiment of the present disclosure.

FIG. 2 shows a vehicle access system 28 that performs as a PEPS system and a PAK system. The vehicle access system 28 includes a vehicle 30 and may include a key fob 32, a mobile phone 34, and/or other portable access devices, such as a wearable device, a laptop computer, or other portable network device. The portable access devices may be, for example, a Bluetooth®-enabled communication device, such as a smart phone, smart watch, wearable electronic device, key fob, tablet device, or other device associated with a user of the vehicle 30. The user may be an owner, driver, or passenger of the vehicle 30 and/or a technician for the vehicle 30.

The vehicle 30 includes an access module 36, LF antenna modules 38, and RF antenna modules 40. The access module 36 may wirelessly transmit LF signals via the LF antenna modules 38 to the portable network devices and may wireless communicate with the portable access devices via the RF antenna modules 40. The RF antenna modules 40 provide polarization diversity between each of the antennas of the portable network devices and the antennas of the RF antenna modules 40. Polarization diversity as further described below provides a minimum number, combination and arrangement of polarization axes at the portable network devices and the vehicle 30 to assure, at any moment in time, at least one transmitting antenna has at least one polarization axis that is not cross-polarized with a polarization axis of at least one receiving antenna. In other words, at any moment in time, at least one RF antenna of the vehicle has at least one polarization axis that is not cross-polarized with a polarization axis of at least one RF antenna of each of the portable access devices. Although particular numbers of LF antenna modules and RF antenna modules are shown, any number of each may be utilized.

The access module 36 may communicate with the LF antenna modules 38 and the RF antenna modules 40 wirelessly and/or via a vehicle interface 45. As an example, the vehicle interface 45 may include a controller area network (CAN) bus, a local interconnect network (LIN) for lower data-rate communication, a clock extension peripheral interface (CXPI) bus and/or one or more other vehicle interfaces.

Figure 11B:
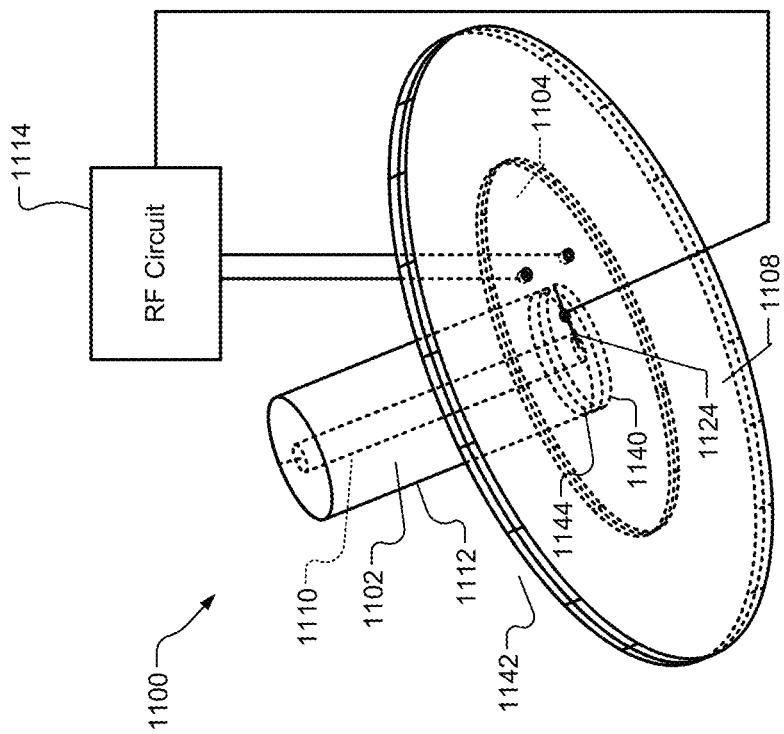
FIG. 11B is a bottom perspective view of the at least a portion of the multi-axis polarized RF antenna assembly of FIG. 11A.
Figure 11A:
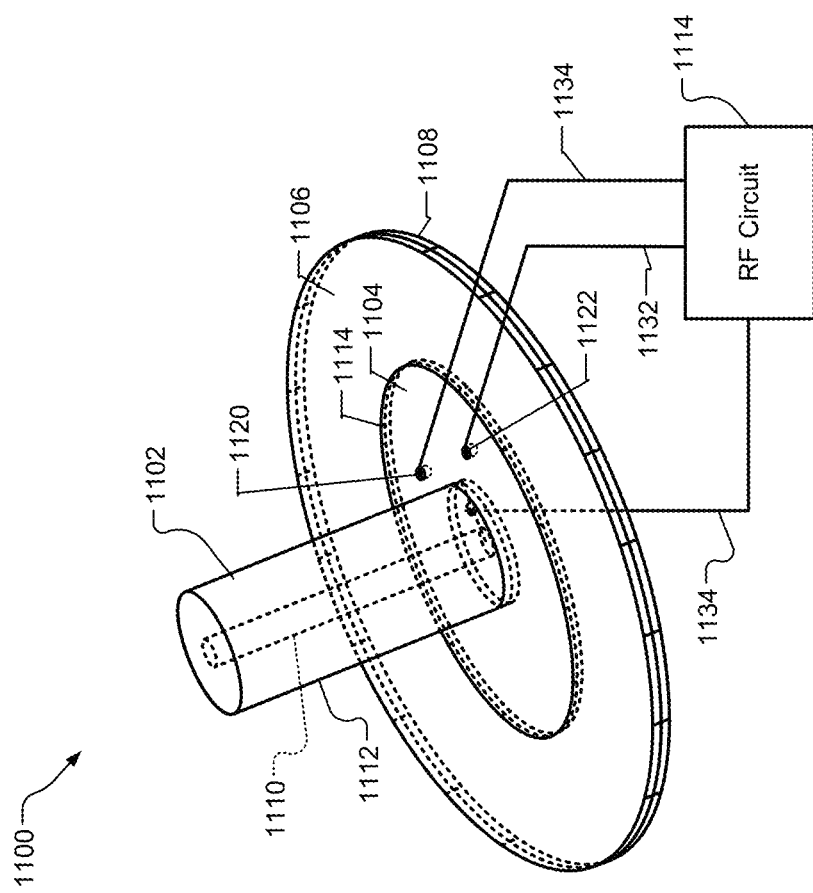
FIG. 11A is a top perspective view of an example of at least a portion of a multi-axis polarized RF antenna assembly including a linear polarized antenna and a circular polarized antenna in accordance with an embodiment of the present disclosure.

The LF antenna modules 38 may be at various locations on the vehicle and transmit low frequency signals (e.g., 125 kHz signals). Each of the LF antenna modules includes an LF antenna and may include a control module and/or other circuitry for LF signal transmission. The RF antenna modules 40 may also be located at various locations on the vehicle and transmit RF signals, such as Bluetooth low energy (BLE) signals according to BLE communication protocols. Alternatively, the RF antenna modules 40 may communicate according to other wireless communication protocols, such as wireless fidelity (Wi-Fi). An example of the antennas is shown in FIG. 11 (referring to collectively FIGS. 11A and 11B).

In one embodiment and to improve signal coverage relative to the vehicle and improve transmission and reception characteristics, the RF antenna modules 40 are located in a roof 46 of the vehicle 30. As an example, each of the RF antenna modules 40 may include a pair of RF antennas, one linear polarized antenna and one circular polarized antenna. The number and location of the RF antenna modules may be preselected based on the size and shape of the vehicle 30. In one embodiment, two RF antenna modules are included and spaced apart from each other as shown in FIG. 2, such that the corresponding electric fields overlap each other extend in a pattern 360° around the vehicle and past an outer perimeter of the vehicle. The electric fields provide a resultant electric field as shown in FIG. 1, which is represented by dashed circles 48. The dashed circles provide an overall shape that is "rectangular-like". In larger vehicles more antenna modules 40 may be added to make the shape more "rectangular-like". In a small vehicle only one of the RF antenna modules 40 may be included.

Figure 65:
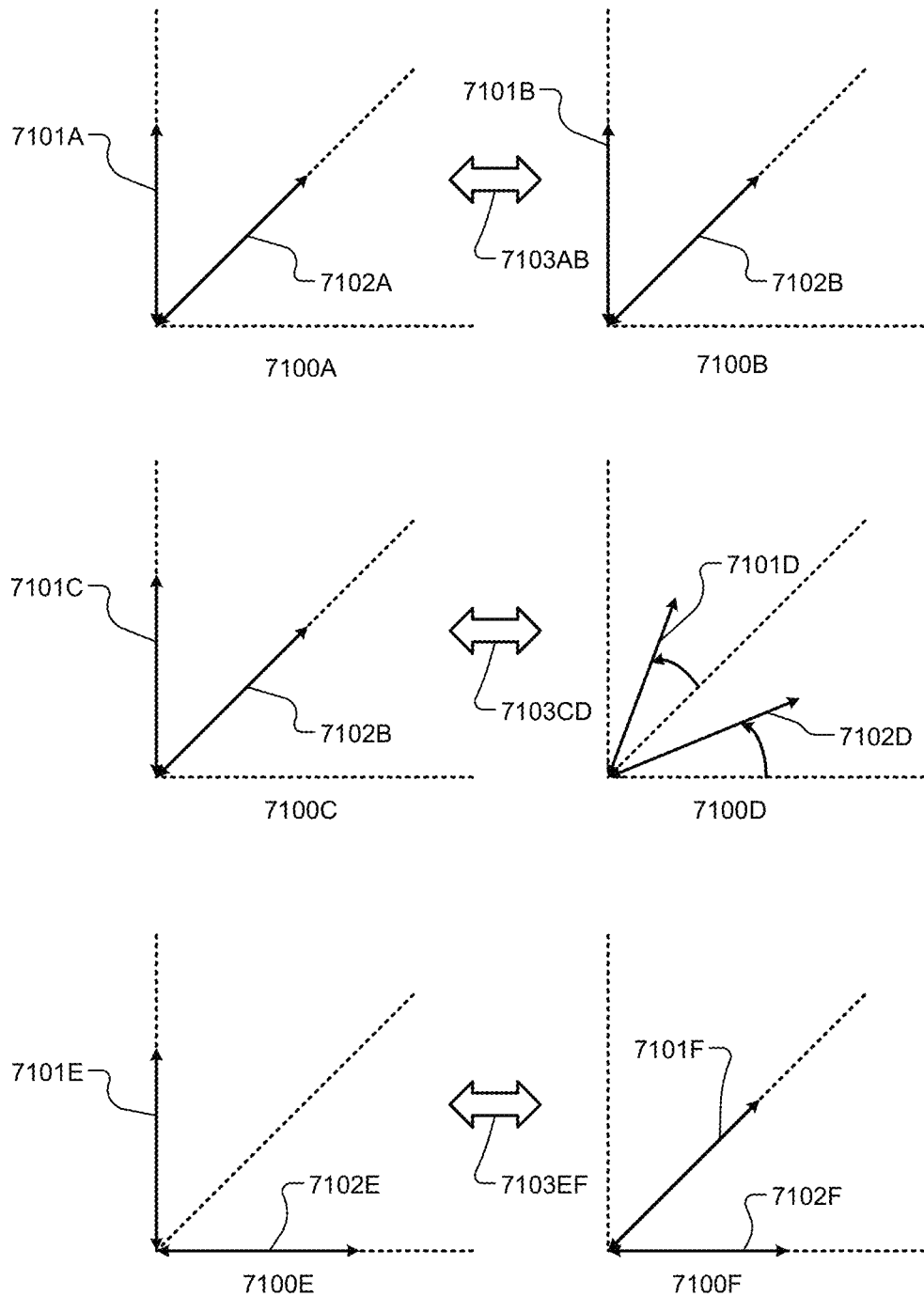
FIG. 65 illustrates a representation of different pairs of antenna axis assemblies each of which including two linear polarization antennas in accordance with another embodiment of the present disclosure.
Figure 66:
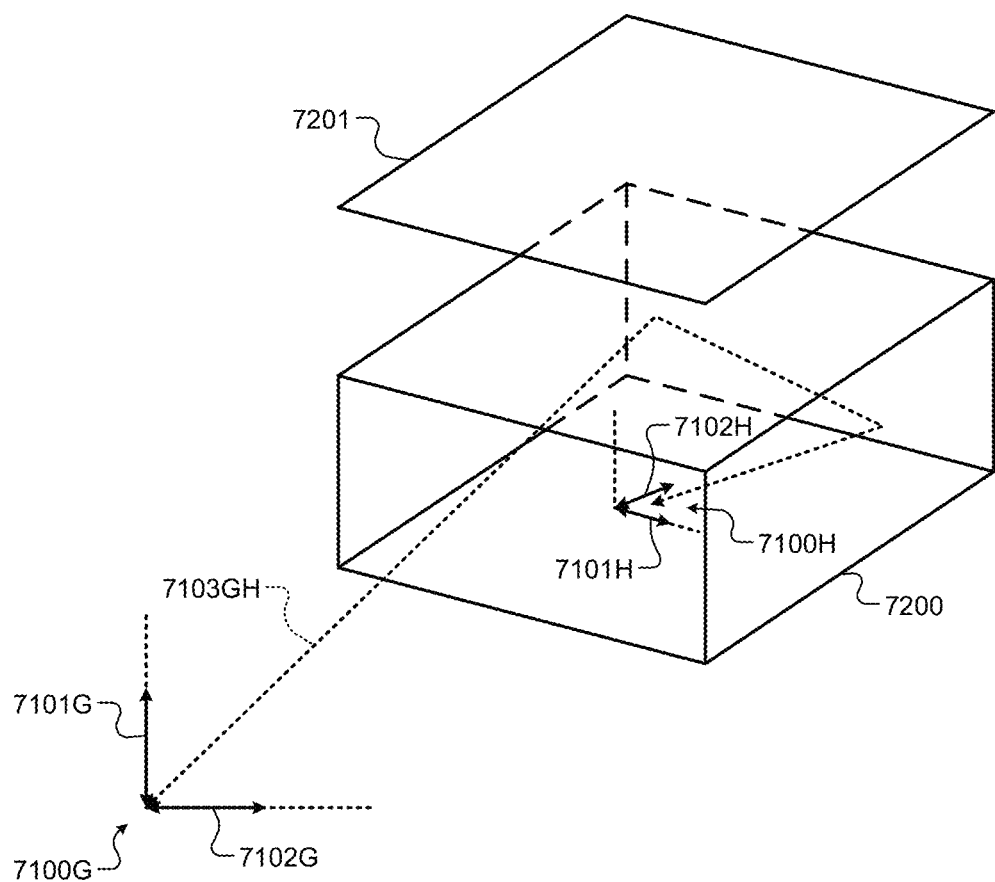
FIG. 66 illustrates a perspective view of a pair of antenna axis assemblies having a same number of antennas where one of which is disposed in a metal container and the other of which is external to the metal container in accordance with another embodiment of the present disclosure.
Figure 67:
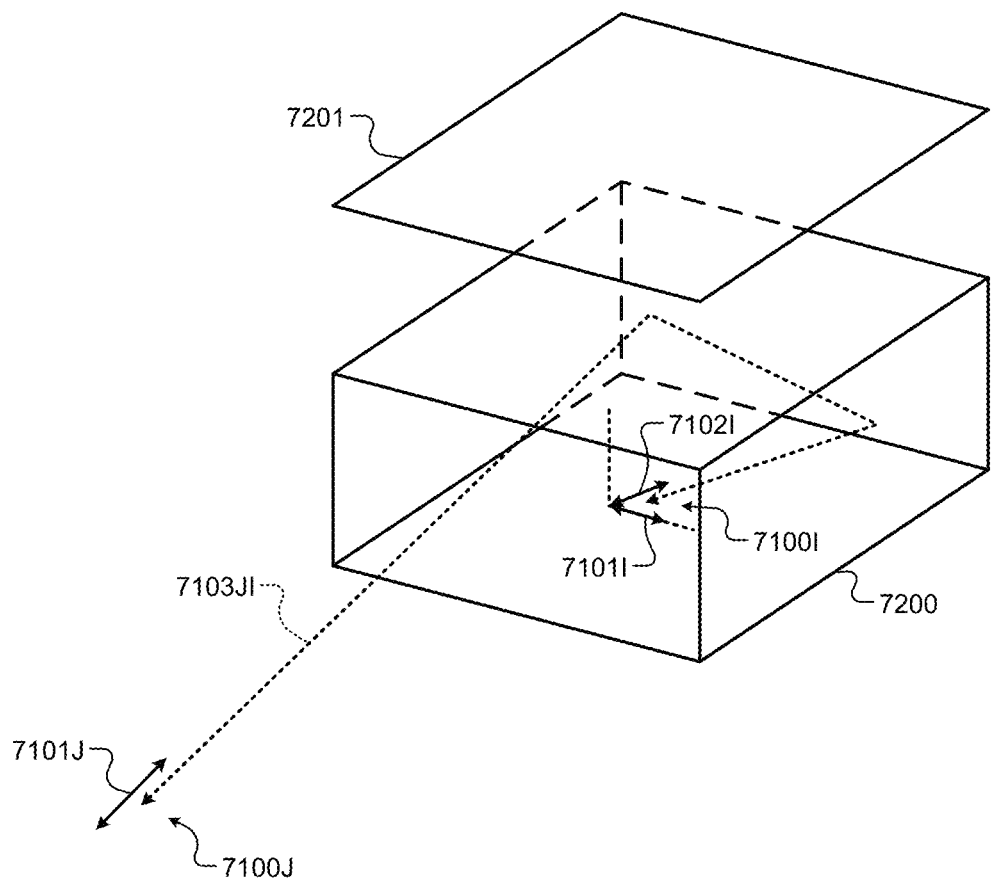
FIG. 67 illustrates a perspective view of another pair of antenna axis assemblies having a different number of antennas where one of which is disposed in a metal container and the other of which is external to the metal container in accordance with another embodiment of the present disclosure.

A different number of antennas having a different number of antenna polarizations may be utilized. FIGS. 65-67 illustrate some other example antenna implementations. FIGS. 65-67 include fewer antennas and antenna polarizations, which are used to measure or bound distances when a diverse set of frequencies and/or RF channels are used to measure or bound distances and/or reflections off metal in a vehicle. This is done to create virtual polarization diversity. The antenna systems are able to tolerate some rate of false measurement due to cross-polarization and/or alignment of nulls. In FIGS. 65-67, 7100A-J refer to antenna axis assemblies, 7100A-7100I refer to antenna axis assemblies with two polarized axes, and 7100J refers to an antenna axis assembly with one polarized axis. The numerical designators 7101A-7101I and 7102A-7102I refer to the polarized antenna axes of two polarized antenna axis assemblies. The numerical designator 7101J refers to a single polarized axis of 7100J. Numerical designators 7103AB, 7103CD, 7103EF, 7103GH, and 7103JI refer to RF paths between a pair of antenna assemblies. Many RF paths exist between the antenna axes, some with more link margin, some with less, some with more phase rotation time delay, and some with less. Different round trip timing and unmodulated carrier tone exchange ranging algorithms disclosed, described and/ or referred to herein have the capability to find or measure shorter paths that are some number of decibels (dB) up or down in link margin compared to the highest-link margin path, which may not be the shortest. The more round trip timing or tone exchange measurements that are taken, across more frequencies (or channels), and the more mathematically complex and timing consuming the algorithm, the smaller the link margin may be in the shorter indirect path that is found.

The additional antenna axes provide polarization diversity in RF paths between the antenna axis assemblies, which provide path diversity. Numerical designator 7200 refers to an open three-sided metal box and/or a simplified representation of a vehicle body for RF radio waves in a giga-hertz or multi-giga-hertz range. Numerical designator 7201 refers to a metal plate and/or a lid to the box and/or a simplified representation of the roof of a vehicle for RF radio waves in a giga-hertz or multi-giga-hertz range. FIGS. 66 and 67 may also be viewed upside down where 7200 is a simplified representation of the open concave shape of the roof of a vehicle and 7201 is a simplified representation of the floor of a vehicle.

The RF connection along RF path 7101AB, between 7100A and 7100B is strong because both pairs of antenna axis between the antenna axis assemblies are co-polarized. For arbitrarily oriented pairs of two axis antennas, this condition is rare, even when the co-polarized zones are wide, perhaps 5 degrees out of 90 degrees of rotation, at perhaps 6 dB up in link margin from the median link margin. This is because it takes three angular rotations to manipulate an arbitrarily oriented antenna axis assembly pair into this configuration and because the antenna axes are symmetrical every 90 degrees, which will happen arbitrarily about $(5/90)*(5/90)*(5/90)$, or 1.71E-4, portion of the time. The RF connection along RF path 7101CD, between 7100C and 7100D, is not as strong as 7101AB, but is good because no antenna path is co-polarized or cross-polarized and the nulls are not aligned. The RF connection along RF path 7101EF, between 7100E and 7100F, is weak because each antenna path between individual antenna axis is either cross polarized or involves the null of at least one antenna. This condition is rare, because again, it takes 3 angular rotations to manipulate a pair of arbitrarily oriented antenna axis pairs into this configuration. Again, for arbitrarily oriented antenna pairs of two axis antenna pairs, with for example 5 degree cross-polarized and aligned null zones, at for example 20 dB or $pow2\ db(sin(pi*5/180)^2)$ down in link margin, it takes three angular rotations to manipulate an arbitrarily oriented antenna pair into this configuration and the antennas axes are symmetrical every 90 degrees, which will happen arbitrarily about $(5/90)*(5/90)*(5/90)$, or 1.71E-4, portion of the time.

Figure 7:
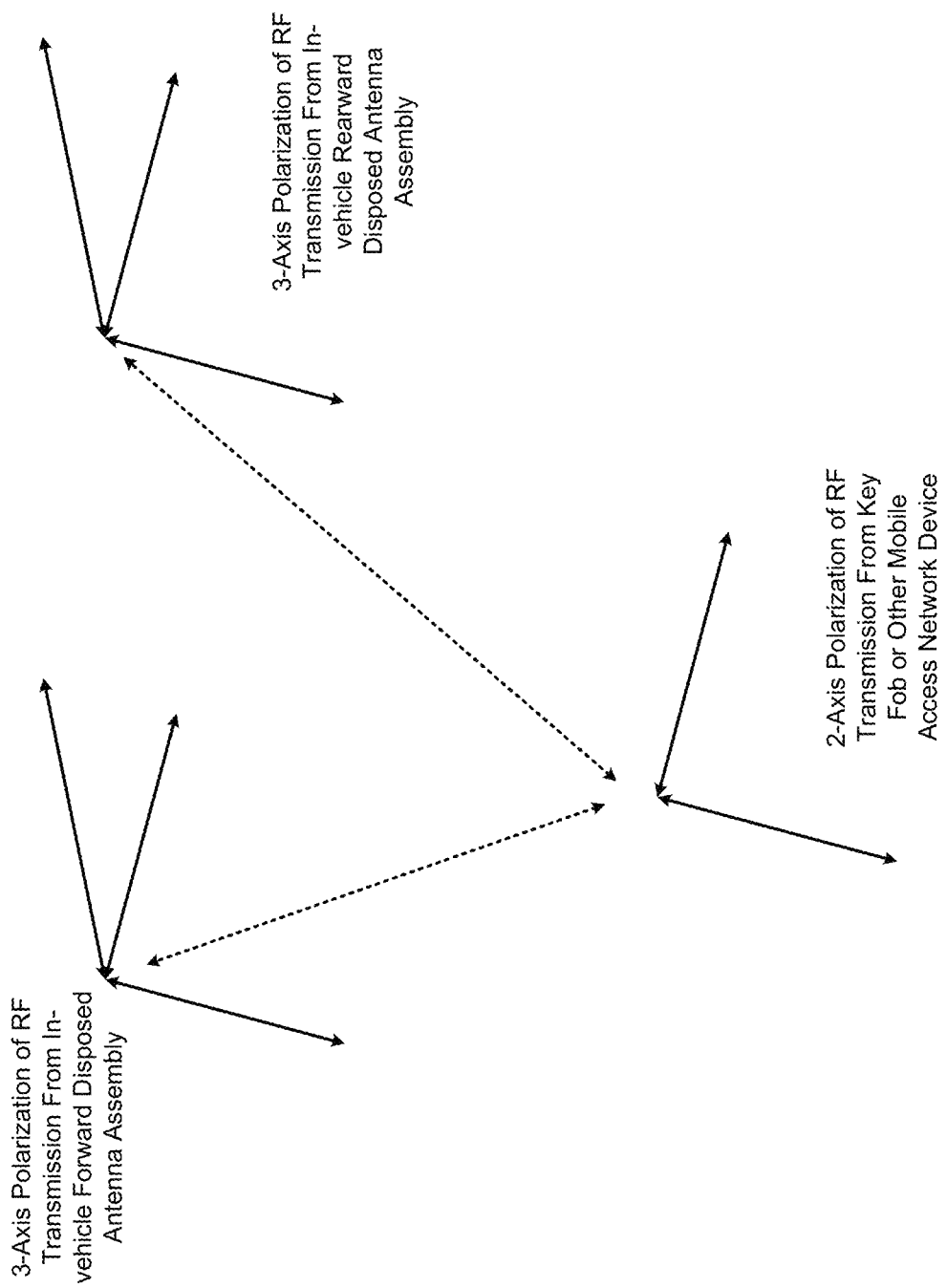
FIG. 7 is an example of a polarization axes diagram illustrating a polarization diversity example arrangement in accordance with an embodiment of the present disclosure.
Figure 8:
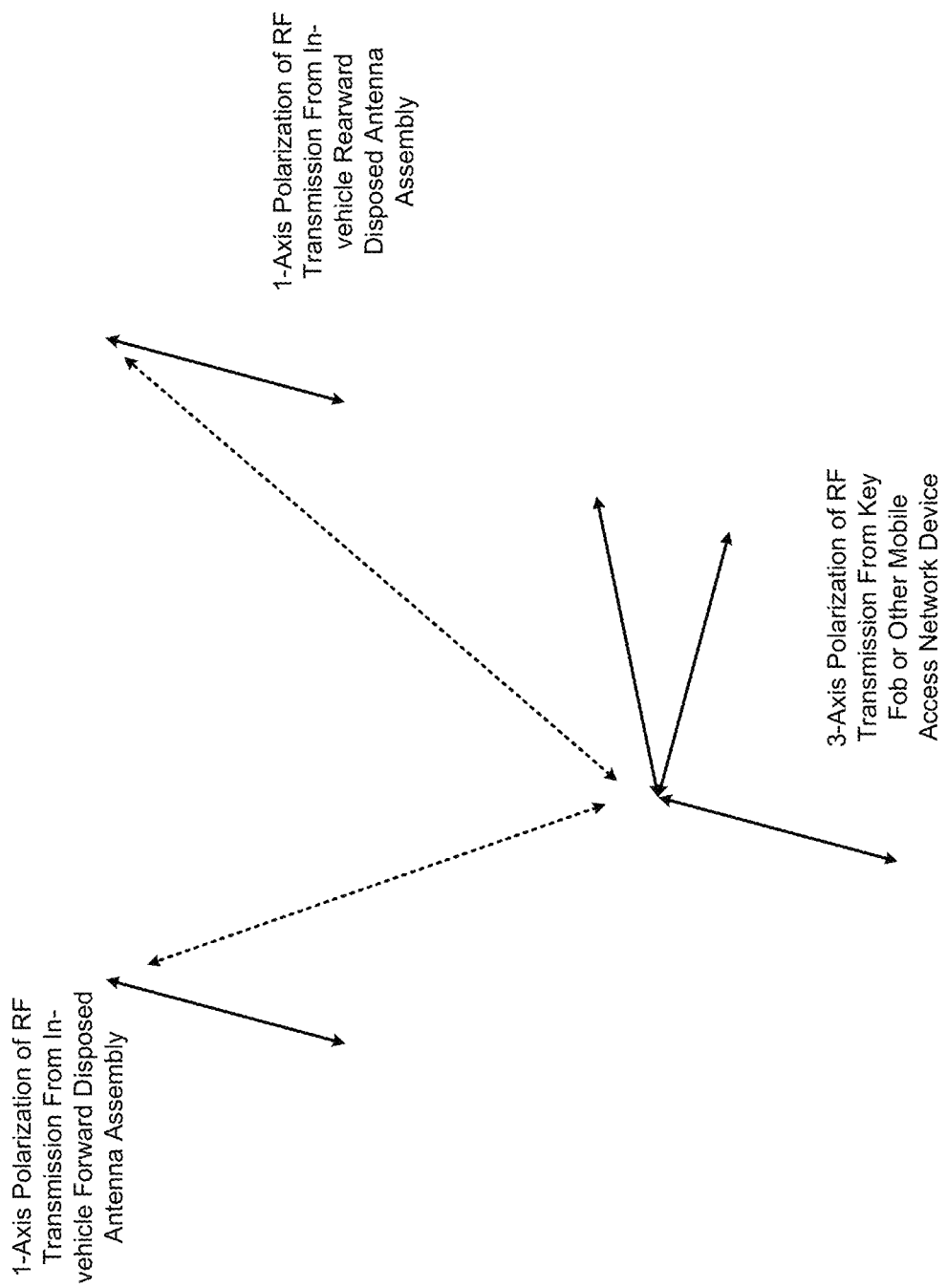
FIG. 8 is an example of a polarization axes diagram illustrating another polarization diversity example arrangement in accordance with an embodiment of the present disclosure.

Looking at FIGS. 7-8, it is clear that with three mostly orthogonal axes of polarizations on one size and two mostly orthogonal axes of polarizations on the other side, the nulls are unable to be aligned while being cross polarized. With three mostly orthogonal axes of polarizations on one side and one polarized axis on the other side, nulls may be aligned via two rotations to get it to happen arbitrarily.

Generally, the more antenna axes on each side of a connection, the lower the probability that a low link margin direct path will occur. Preventing or reducing the probability of low link margin direct paths is beneficial because round trip timing ranging and unmodulated carrier tone exchange ranging tends to measure the direct path greater the link margin in the direct path is relative to reflected paths. Conversely, the lower the link margin in the direct path is relative to the reflected paths, the more likely the ranging techniques are to measure the distance along the reflected path.

In FIG. 66, when: the size of the metal box is reasonably sized relative to the decision bound on the ranges being measured; the variation in distances are measured based upon the different reflected paths within the metal box; and one side of the ranging connection is placed inside the metal box, planning on few direct paths may reduce the number of polarized axes needed to obtain reasonable measurements. When one of the antenna axes of 7100G is oriented such that the null is pointed along the strongest and/or shortest reflected path towards 7100H, the other antenna axis in 7100G finds a bounce path that has a strong link margin to one of the antenna axes 7101H or 7102H. This especially true when averaged across multiple channels like the 37 data channels inside of a BLE data link. Some of the channel and antenna axis path combinations may fast fade due to multipath, but not the majority of them. At any arbitrary orientation of the antenna axes pair 7100G, the link margin to antenna axes pair 7100H is about the same and the distances measured along the 7103IJ reflected paths will be about the same. How the reflected paths 7103GH bounce off of the roof 7201 or side walls of 7200 will change but the overall path variation will be limited by the size and position of the 7200 and 7201 components. This path variation limit will change when 7100G is raised to a height where there is a direct path, which will shorten the measured distance, by the removal of the reflections from the path 7103GH. The range measured between 7100G and 7100H along the reflected paths or shorter direct paths will set a comparison bound indicating that 7100G, which may be part of the portable device is within a distance threshold of 7100H. 7100H may be part of the PEPS module 211 or PAKM module 212. These distance ranging measurements between a pair of 7100 modules may be taken and may be compared to be less than a bound. The measurements, distance and/or results of the comparisons may be used as part of "if-then-else" comparisons in a software decision tree to indicate that the portable access device 400 is within an approach zone, an unlock zone and/or a mobilization zone of a vehicle.

FIG. 67 is similar to FIG. 66, except that the antenna axis assembly 7100J includes single polarized antenna axis 7101J. In an embodiment, the antenna axis assembly 7100J includes only a single polarized antenna axis. It is possible to orient 7101J such that the null is oriented along the strongest and/or shortest reflected path towards 7100H. In this case, the round trip timing and unmodulated carrier tone exchange techniques would tend to measure a distance along a path (not depicted) that is away from the box 7200 and then bounces back towards the box. It takes two rotations to orient an arbitrarily oriented antenna axis in this orientation with for example a 5 degree wide aligned null zone, at for example 20 dB or pow2 db(sin(pi*5/180)^2) down in link margin, because it takes two angular rotations to manipulate an arbitrarily oriented antenna pair into this configuration, and because the antennas are symmetrical every 90 degrees. The orientation happens arbitrarily about (5/90)*(5/90), or 3E-3, portion of the time. Other than an increased portion of the time where a wildly different indirect path is measured because of a higher power path that is reflected off a distant object, this configuration may be used to take distance ranging measurements between a pair of 7100 modules and compare that measurement to be less than a bound. The measurements, distance and/or results of the comparison may be used as part of one or more "if-then-else" comparisons and software decision tree to indicate that the portable access device 400 is within the approach zone, unlock zone and/or mobilization zone of a vehicle.

Different polarizations of antennas may be used to create polarization diversity. Multiple polarized antennas (or antenna axes) create polarizing diversity. A linear axis and another linear axis, a linear axis and two linear axes including a circular polarize antenna, or three independent linear axes (linear polarized antennas) are all possible. Especially if there is nearby metal to create virtual polarization diversity.

The 7101H or 7101J antenna axis pair may be placed low in metal box that is the vehicle body or high in the metal box that is the roof of the vehicle to achieve these virtual antenna axis array effects.

Figure 3:
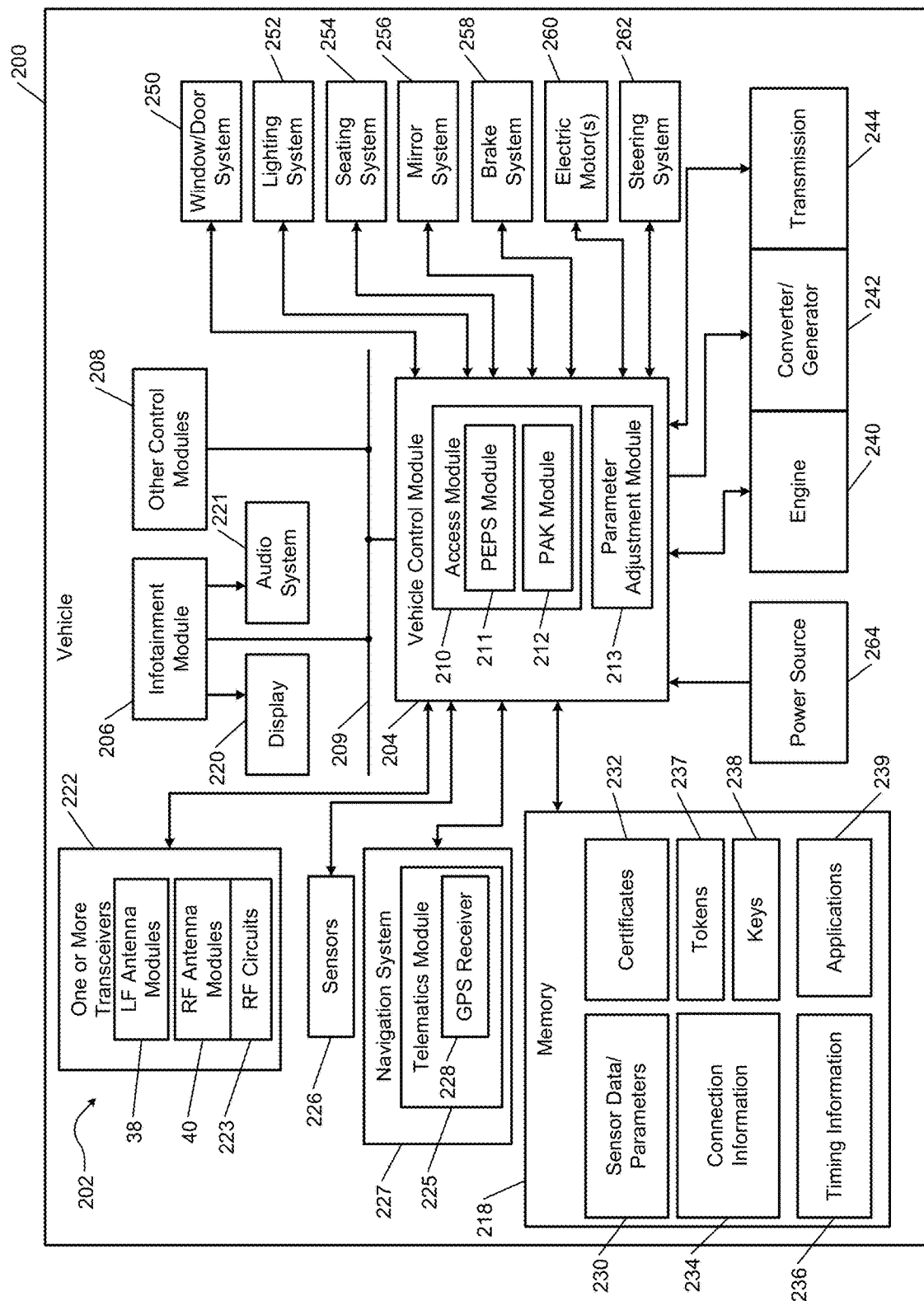
FIG. 3 is a functional block diagram of an example of a vehicle including the access module of FIG. 2 in accordance with an embodiment of the present disclosure.
Figure 4:
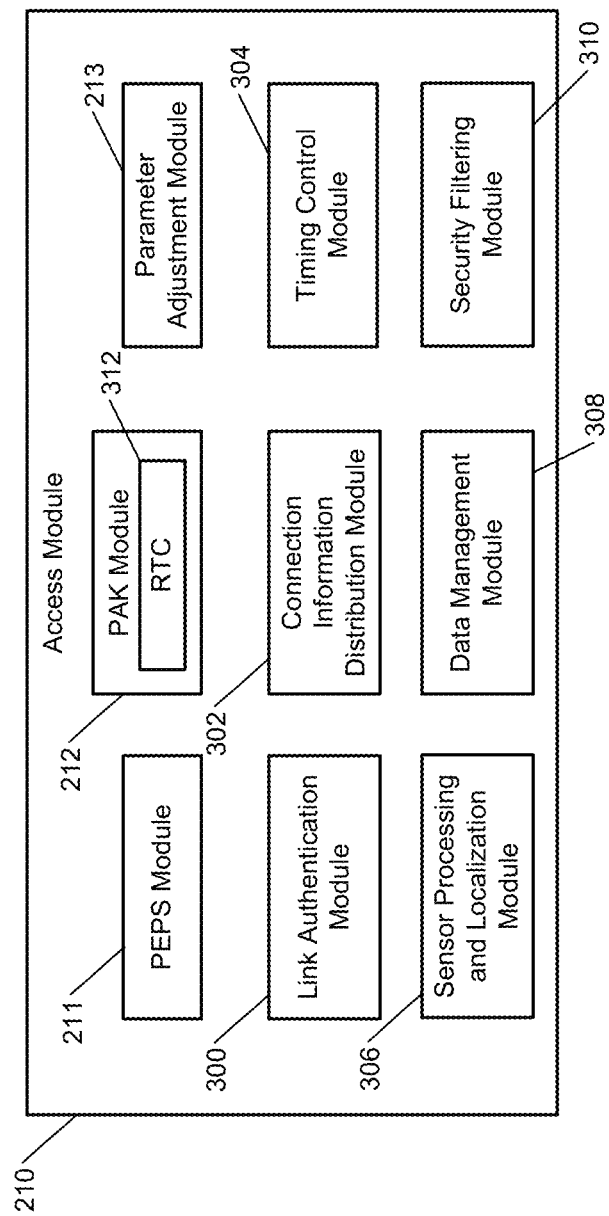
FIG. 4 is a functional block diagram of an example of the access module of FIG. 2 in accordance with an embodiment of the present disclosure.

FIG. 3 shows a vehicle 200 that is an example of the vehicles 108 of FIG. 1. The vehicle 200 includes a PAK system 202, which includes a vehicle control module 204, an infotainment module 206 and other control modules 208 (e.g., a body control module). The modules 204, 206, 208 may communicate with each other via a controller area network (CAN) bus 209 and/or other vehicle interface (e.g., the vehicle interface 45 of FIG. 2). The vehicle control module 204 may control operation of vehicles systems. The vehicle control module 204 may include a PEPS module 211, a PAK module 212 and a parameter adjustment module 213, as well as other modules, which are shown in FIG. 4. The vehicle control module 204 may also include one or more processors that are configured to execute instructions stored in a non-transitory computer-readable medium, such as the memory 218, which may include read-only memory (ROM) and/or random access memory (RAM).

The PEPS module 211 may perform PEPS operations to provide access to an interior of the vehicle and permit starting and/or operation of the vehicle. The PAK module 212 operates in cooperation with the PEPS module 211 and performs PAK operations as described herein. The PEPS module 211 may include the PAK module 212 or the modules 211, 212 may be implemented as a single module. The parameter adjustment module 213 may be used to adjust parameters of the vehicle 200.

The PAK system 202 may further include: a memory 218; a display 220; an audio system 221; and one or more transceivers 222 including the LF antenna modules 38 and the RF antenna modules 40. The RF antenna modules 40 may include and/or be connected to RF circuits 223. The PAK system 202 may further include: a telematics module 225; sensors 226; and a navigation system 227 including a global positioning system (GPS) receiver 228. The RF circuits 223 may be used to communicate with a mobile device (e.g., the mobile device 102 of FIG. 1) including transmission of Bluetooth® signals at 2.4 giga-Hertz (GHz). The RF circuits 223 may include BLE radios, transmitters, receivers, etc. for transmitting and receiving RF signals.

The one or more transceivers 222 may include a RF transceiver including the RF circuits 223 and implement an access application having code to inspect timestamped data received and transmitted by the RF antenna modules 40. The access application may confirm whether the RF antenna modules have, for example, received correct data at the correct time. The access application may be stored in the memory 218 and implemented by the PEPS module 211 and/or the PAK module 212. Other example operations of the access application are further described below.

The access application may implement a Bluetooth® protocol stack that is configured to provide a channel map, access identifier, next channel, and a time for a next channel. The access application is configured to output timing signals for timestamps for signals transmitted and received via the RF antenna modules 40. The access application may obtain channel map information and timing information and share this information with other modules in the vehicle.

The telematics module 225 may communicate with a server via a cell tower station. This may include the transfer of certificates, license information, and/or timing information including global clock timing information. The telematics module 225 is configured to generate location information and/or error of location information associated with the vehicle 200. The telematics module 225 may be implemented by a navigation system 227.

The sensors 226 may include sensors used for PEPS and PAK operations, cameras, objection detection sensors, temperature sensors, accelerometers, vehicle velocity sensor, and/or other sensors. The sensors 226 may include a touch sensor to detect, for example, a person touching a door handle to initiate a process of waking up a portable access device. The sensors 226 may be connected to the other control modules 208, such as the body control module, which may be in communication with LF and RF antenna circuits and/or modules disclosed herein. The GPS receiver 228 may provide vehicle velocity and/or direction (or heading) of the vehicle and/or global clock timing information.

The memory 218 may store sensor data and/or parameters 230, certificates 232, connection information 234, timing information 236, tokens 237, keys 238, and applications 239. The applications 239 may include applications executed by the modules 38, 40, 204, 206, 208, 210, 211, 212, 223 and/or transceivers 222. As an example, the applications may include the access application, a PEPS application and/or a PAK application executed by the transceivers 222 and the modules 210, 211, and/or 212. Although the memory 218 and the vehicle control module 204 are shown as separate devices, the memory 218 and the vehicle control module 204 may be implemented as a single device. The single device may include one or more other devices shown in FIG. 2.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208, 210, 211, 212, 213. The vehicle control module 204 may perform PEPS and/or PAK operations, which may include setting some of the parameters. The PEPS and PAK operations may be based on signals received from the sensors 226 and/or transceivers 222. The vehicle control module 204 may receive power from a power source 264 which may be provided to the engine 240, the converter/generator 242, the transmission 244, the window/door system 250, the lighting system 252, the seating system 254, the mirror system 256, the brake system 258, the electric motors 260 and/or the steering system 262, etc. Some of the PEPS and PAK operations may include unlocking doors of the window/door system 250, enabling fuel and spark of the engine 240, starting the electric motors 260, powering any of the systems 250, 252, 254, 256, 258, 262, and/or performing other operations as are further described herein.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control module 204 to, for example, adjust fuel, spark, air flow, steering wheel angle, throttle position, pedal position, door locks, window position, seat angles, etc. This control may be based on the outputs of the sensors 226, the navigation system 227, the GPS 228 and the above-stated data and information stored in the memory 218.

FIG. 4 shows the access module 210. The access module 210 includes the PEPS module 211, the PAK module 212, the parameter adjustment module 213 and may further include a link authentication module 300, a connection information distribution module 302, a timing control module 304, a sensor processing and localization module 306, a data management module 308 and a security filtering module 310. The PAK module 212 may include a RTC 312 that maintains a local clock time.

The link authentication module 300 may authenticate the portable access devices of FIG. 2 and establish the secure communication link. For example, the link authentication module 300 can be configured to implement challenge-response authentication or other cryptographic verification algorithms in order to authenticate the portable access devices.

The connection information distribution module 302 is configured to communicate with some of the sensors 226 of FIG. 3 and to provide the sensors with communication information necessary for the sensors to find and then follow, or eavesdrop on, the secure communication link. This may occur once the sensors are synchronized with a communication gateway, which may be included in or implemented by one of the transceivers 222. As an example, the vehicle 200 and/or the PAK system 202 may include any number of sensors disposed anywhere on the vehicle 200 for detecting and monitoring mobile devices. The connection information distribution module 302 is configured to obtain information corresponding to communication channels and channel switching parameters of a communication link and transmit the information to the sensors 226. In response to the sensors 226 receiving the information from the connection information distribution module 302 via the vehicle interface 45 and the sensors 226 being synchronized with the communication gateway, the sensors 226 may locate and follow, or eavesdrop on, the communication link.

The timing control module 304 may: maintain the RTC and/or currently stored date if not handled by the PAK module 212; disseminate current timing information with the sensors; generate timestamps for incoming and outgoing messages, requests, signals, certificates, and/or other items; calculate round trip times; etc. A round trip time may refer to the amount between when a request is generated and/or transmitted and a time when a response to the request is received. The timing control module 304 may obtain timing information corresponding to a communication link when the link authentication module 300 executes challenge-response authentication. The timing control module 302 is also configured to provide the timing information to the sensors 226 via the vehicle interface 209.

After link authentication is established, the data management module 308 collects the current location of the vehicle 108 from the telematics module 225 and shares the location with the portable access devices. The portable access devices optionally include GPS modules and application software that when executed compares the estimated relative locations of the portable access devices to the vehicle 108. Based on the estimated positions of the portable access devices relative to the vehicle 108, the portable access devices can send signals to one of the transceivers 222 requesting the vehicle to perform certain actions. As an example, the data management layer 308 is configured obtain vehicle information obtained by any of the modules (e.g., location information obtained by a telematics module 225) and transmit the vehicle information to the portable access devices.

The security filtering module 310 detects violations of a physical layer and protocol and filter data accordingly before providing information to the sensor processing and localization module 306. The security filtering module 310 flags data as injected such that the sensor processing and localization module 306 is able to discard data and alert the PEPS module 211. The data from the sensor processing and localization module 306 is passed along to the PEPS module 211, whereby the PEPS module 211 is configured to read vehicle state information from the sensors in order to detect user intent to access a feature and to compare the location of the mobile device 102 to a set of locations that authorize certain vehicle features, such as unlocking a door or trunk of the vehicle and/or starting the vehicle.

Figure 5:
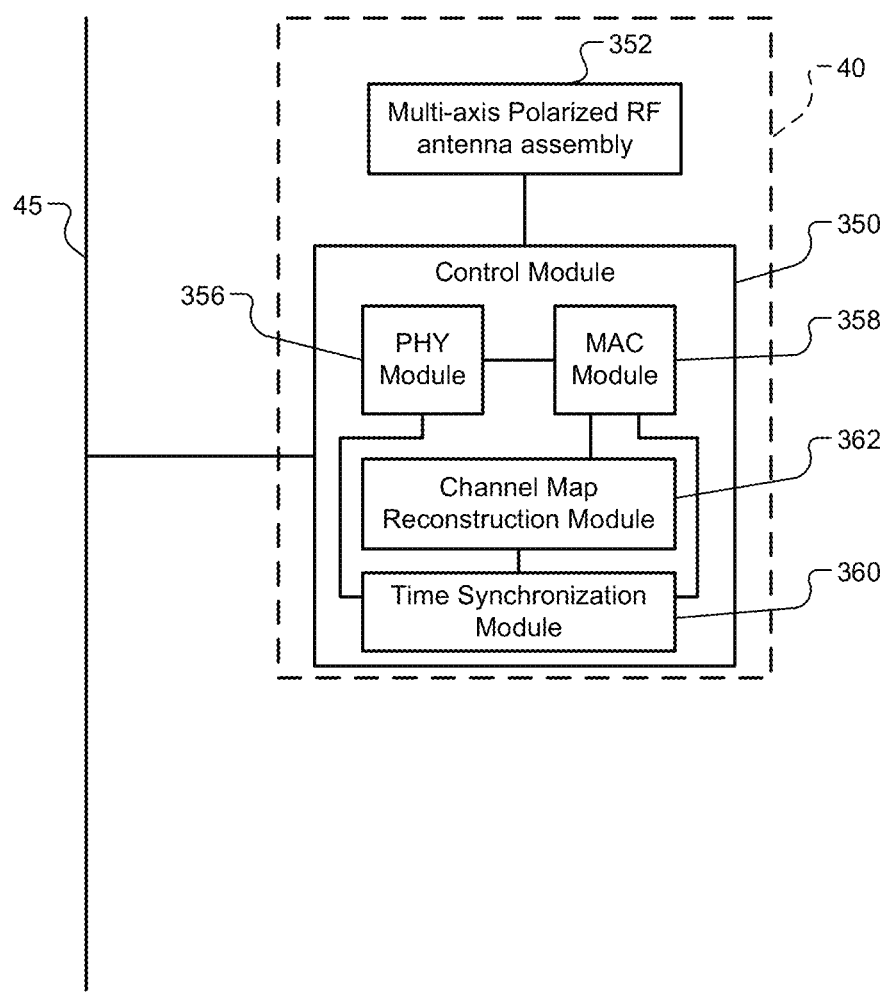
FIG. 5 is a functional block diagram of an example of a RF antenna module of a vehicle in accordance with an embodiment of the present disclosure.

FIG. 5 is a functional block diagram of the RF antenna module 40, which includes a control module 350 connected to a multi-axis polarized RF antenna assembly 352. The multi-axis polarized RF antenna assembly 352 may include a linear polarized antenna, other linear polarized antennas and/or a circular polarized antenna (e.g., a right-hand circular polarized antenna or a left-hand circular polarized antenna). An example of the multi-axis polarized RF antennas is shown in FIG. 11. The control module 350 may include or be part of a BLE communication chipset. Alternatively, the control module 350 may include or be part of a Wi-Fi or Wi-Fi direct communication chipset. The multi-axis polarized RF antenna assembly 352 may be included as part of the RF antenna module 40 or may be located remotely from the control module 350. Some or all of the operations of the control module 350 may be implemented by one or more of the modules 204, 210, 211, 212 of FIG. 3.

The control module 350 (or one or more of the modules 204, 210, 211, 212 of FIG. 3) may establish a secure communication connection with a portable access device (e.g., one of the portable access devices 32, 34 of FIG. 2). For example, the control module 350 may establish a secure communication connection using the BLE communication protocol this may include transmitting and/or receiving timing and synchronization information. The timing and synchronization information may include information directed to the secure communication connection, such as timing of next communication connection events, timing intervals between communication connection events, communication channels for next communication connection events, a channel map, a channel hop interval or offset, communication latency information, communication jitter information, etc. The control module 350 may detect (or "eavesdrop") packets sent by the portable access device to the vehicle control module 204 and measure signal information of the signals received from the portable access device. The channel hop interval or offset may be used to calculate a channel for a subsequent communication connection event.

The control module 350 may measure a received signal strength of a signal received from the portable access device and generate a corresponding RSSI value. Additionally or alternatively, the control module 350 may take other measurements of received signals from the portable access device, such as an angle of arrival, a time of arrival, a time difference of arrival, etc. The control module 350 may then send the measured information to the vehicle control module 204, which may then determine a location of and/or distance to the portable access device relative to the vehicle 30 based on the measured information. The location and distance determinations may be based on similar information received from one or more other RF antenna modules and/or other sensors.

As an example, the vehicle control module 204 may determine the location of the portable access device based on, for example, the patterns of the RSSI values corresponding to signals received from the portable access device by the RF antenna modules 40. A strong (or high) RSSI value indicates that the portable access device is close to the vehicle 30 and a weak (or low) RSSI value indicates that the portable access device is further away from the vehicle 30. By analyzing the RSSI values, the control module 204 may determine a location of and/or a distance to the portable access device relative to the vehicle 30. Additionally or alternatively, angle of arrival, angle of departure, round trip timing, unmodulated carrier tone exchange, or time difference of arrival measurements for the signals sent between the portable access device and the control module 204 may also be used by the control module 204 or the portable access device to determine the location of the portable access device. Additionally or alternatively, the RF antenna modules 40 may determine the location of and/or distance to the portable access device based on the measured information and communicate the location or distance to the control module 204.

Based on the determined location of or distance to the portable access device relative to the vehicle 30, the modules 211, 212 of FIG. 3 may then authorize and/or perform a vehicle function, such as unlocking a door of the vehicle 30, unlocking a trunk of the vehicle 30, starting the vehicle 30, and/or allowing the vehicle 30 to be started. As another example, if the portable access device is less than a first predetermined distance from the vehicle 30, the modules 211, 212 may activate interior or exterior lights of the vehicle 30. If the portable access device is less than a second predetermined distance from the vehicle 30, the modules 211, 212 may unlock doors or a trunk of the vehicle 30. If the portable access device is located inside of the vehicle 30, the modules 211, 212 may allow the vehicle 30 to be started.

Referring again to FIG. 5, the control module 350 may include a physical layer (PHY) module 356, a medium access control (MAC) module 358, a time synchronization module 360 and a channel map reconstruction module 362. The PHY module 356 receives BLE signals via the multi-axis polarized RF antenna assembly 352. The control module 350 may monitor received BLE physical layer messages and obtain measurements of physical properties of the corresponding signals, including, for example, the received signal strengths using a channel map that is produced by the channel map reconstruction module 362. The control module 350 may communicate with the control modules of other RF antenna modules and/or the modules 204, 210, 211, 212 via the vehicle interface 45 to determine time differences of arrival, time of arrival, angle of arrival and/or other timing information. In one embodiment, the control module 350 includes a portion of the RF circuits 223 of FIG. 3.

A time synchronization module 360 is configured to accurately measure the reception times of signals/messages on the vehicle interface 45. The control module 350 may tune the PHY module 356 to a specific channel at a specific time based on the channel map information and the reception times and/or other timing information. Furthermore, the control module may monitor received PHY messages and data that conform to a Bluetooth® physical layer specification, such as Bluetooth® Specification version 5.1. The data, timestamps, and measured signal strengths may be reported by the control module 350 to the control module 204 via the vehicle interface 45.

Figure 6:
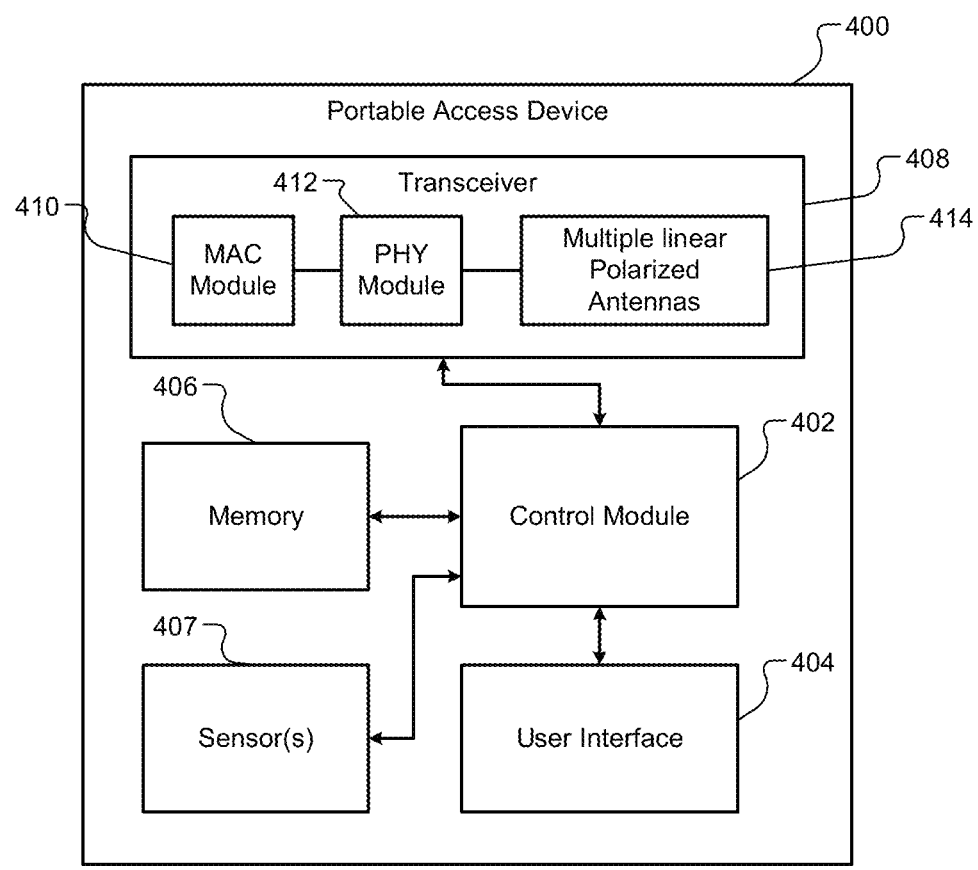
FIG. 6 is a functional block diagram of an example of a portable network device in accordance with an embodiment of the present disclosure.

FIG. 6 shows an example portable access device 400, which is an example of one of the portable access devices 32, 34 of FIG. 2. The portable access device 400 may include a control module 402, a user interface 404, a memory 406, sensors 407 and a transceiver 408. The transceiver 408 may include a MAC module 410, a PHY module 412 and multiple linear polarized antennas 414.

The control module 402 may include or be part of a BLE communication chipset. Alternatively, the control module 402 may include or be part of a Wi-Fi or Wi-Fi direct communication chipset. The memory 406 may store application code that is executable by the control module 402. The memory 406 may be a non-transitory computer-readable medium including read-only memory (ROM) and/or random-access memory (RAM).

The control module 402 communicates with the modules 204 and 350 of the vehicle and performs authentication and other operations as further described below. The control module 402 may transmit information regarding the portable access device 400, such as location and/or velocity information obtained from one or more of the sensors 407 (e.g., a global navigation satellite system (e.g., GPS) sensor, an accelerometer, and/or an angular rate sensor). The user interface 404 may include a key pad, a touch screen, a voice activated interface, and/or other user interface.

FIG. 7 shows a polarization axes diagram illustrating a polarization diversity example arrangement. In the example shown, two 3-axis antennas located within a vehicle are in communication with a 2-axis antenna located in a portable access device (or mobile access network device). With enough antenna axes, this antenna topology may prevent there from being a situation when cross-polarization exists between one of the 3-axis antennas and the 2-axis antenna. Also, with enough antenna axes the system may be configured so that there is at least one pair of antennas where a null does not exist (or is not pointed) in a direct signal path. Heuristic measurements of RSSI on continuous wave (CW) tone portions of packets may be taken while measuring round trip time and phase delays of the packets. This may be repeated across multiple frequencies. This may be accomplished at a vehicle access module and/or at the portable access device. Round trip timing and/or unmodulated carrier tone exchange may be used to secure ranging. RSSI and change (or delta) phase per frequency may be used.

FIG. 8 shows a polarization axes diagram illustrating another polarization diversity example arrangement. In the example shown, two single axis antennas located within a vehicle are in communication with a 3-axis antenna located in a portable access device (or mobile access network device). With enough antenna axes, this antenna topology may also prevent there from being a situation when cross-polarization exists between one of the single axis antennas and the 3-axis antenna. Also, with enough antenna axes, the system may be configured so that there is at least one pair of antennas where a null does not exist (or is not pointed) in a direct signal path. Heuristic measurements of RSSI on continuous wave (CW) tone portions of packets may be taken while measuring round trip time and phase delays of the packets. This may be repeated across multiple frequencies. This may be accomplished at a vehicle access module and/or at the portable access device. Round trip timing is used to secure ranging. RSSI and change (or delta) phase per frequency may be used. The Example of FIG. 7 may be more feasible than the example of FIG. 8. This is because it can be difficult to incorporate a 3-axis antenna in certain portable access devices, such as in a key fob.

FIG. 9 shows an electric field diagram 900 and polar coordinate plot 902 illustrating electric field patterns and nulls 906 for a linear antenna. The linear antenna is positioned along the vertical axis 908. The linear antenna has a "doughnut" shaped radiation pattern. When nulls are aligned between transmit and receive antennas (co-polarized antennas with the nulls co-linear or nearly co-linear), the bounce path of a transmitted signal is measured. The examples set forth herein prevent this situation from existing between at least one transmit antenna and at least one receive antenna at any moment in time. An algorithm is set forth herein for determining which transmit and receive antennas to use at any moment in time to prevent use of antennas that are cross-polarized and/or co-polarized. Once the appropriate antenna pair is selected, a time-of-flight measurement is taken to determine a distance between the transmitter and the receiver and/or between the vehicle and the portable access device. FIG. 10 shows voltage versus electric field diagram 1000 for a linearly polarized antenna 1002.

FIGS. 11A-B show at least a portion of an example of a multi-axis polarized RF antenna assembly 1100 including a linear polarized antenna 1102 and a circular polarized antenna 1104. The antennas 1102, 1104 are collocated. The linear polarized antenna 1102 extends linearly from a center of the circular polarized antenna 1104 axially outward away from the circular polarized antenna 1104. The antennas 1102, 1104 may transmit 90° out of phase from each other. The linear polarized antenna 1102 may include a conductive element (e.g., a straight wire or helix) 1110 extending within a sleeve 1112. The circular polarized antenna 1104 may be ring-shaped.

The linear polarized antenna 1102 is a monopole antenna. The sleeve 1112 is formed of a dielectric material, such as Teflon. Both of the antennas 1102, 1104 are concentric to a disk-shaped insulator (or isolator) 1106 and a disk-shaped ground plane 1108. The ring-shaped insulator 1106 is stacked as a top layer on the ground plane 1108 (or bottom layer). The circular polarized antenna 1104 is disposed on the ground plane 1108 in inside an inner recessed area 1114 of the insulator 1106. The inner recessed area 1114 of the insulator is disposed between the circular polarized antenna 1104 and the ground plane 1108.

The circular polarized antenna has two feedpoints 1120, 1122 and the linear polarized antenna 1102 has a single feedpoint 1124. The RF signals are transmitted and/or received via the feedpoints 1120, 1122, 1124. The RF signals are transferred between the antennas 1102, 1104 and the RF circuit 1114 via coaxial cables. The coaxial cables include inner conductive lines 1130, 1132, 1134 and outer ground shields (not shown). The ground shields are connected to the ground plane 1108. The conductive lines 1130, 1132, 1134 are connected to the feedpoints 1120, 1122, 1124.

During transmission, a signal or voltage is provide across the ground plane 1108 and the conductive element 1110 via the feedpoint 1124, which is connected to the conductive element 1110 and the ground plane 1108 via another conductive element 1140. RF signal(s) or voltage(s) are also applied across the ground plane 1108 and the feedpoints 1120, 1122 for the circular polarized antenna 1104. The feedpoints 1120, 1122, which are located at a 90° offset on the face of the antenna 1104 and are 90° out of phase from each other. The 90° electrical phase shift combined with the 90° geometric phase shift causes the circular polarized antenna 1104 to radiate circular polarized signals. The feedpoints 1120, 1122 are connected from the ground plane 1108 through the insulator 1106 to the circular polarized antenna 1104. A hole 1142 in the center of the ground plane 1108 and a hole 1144 in a center of the circular polarized antenna 1104 are large enough to allow the linear polarized antenna 1102 to radiate without shorting to the ground plane 1108.

Figure 13:
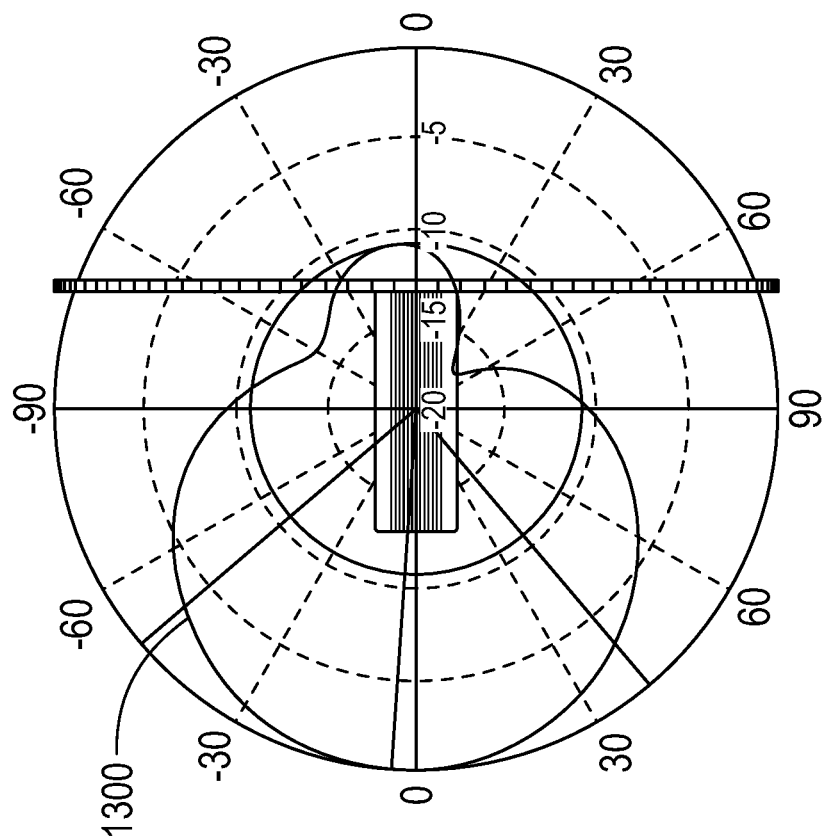
FIG. 13 is an example polar coordinate plot of radiated power associated with the circular polarized antenna of FIGS. 11A-B.
Figure 12:
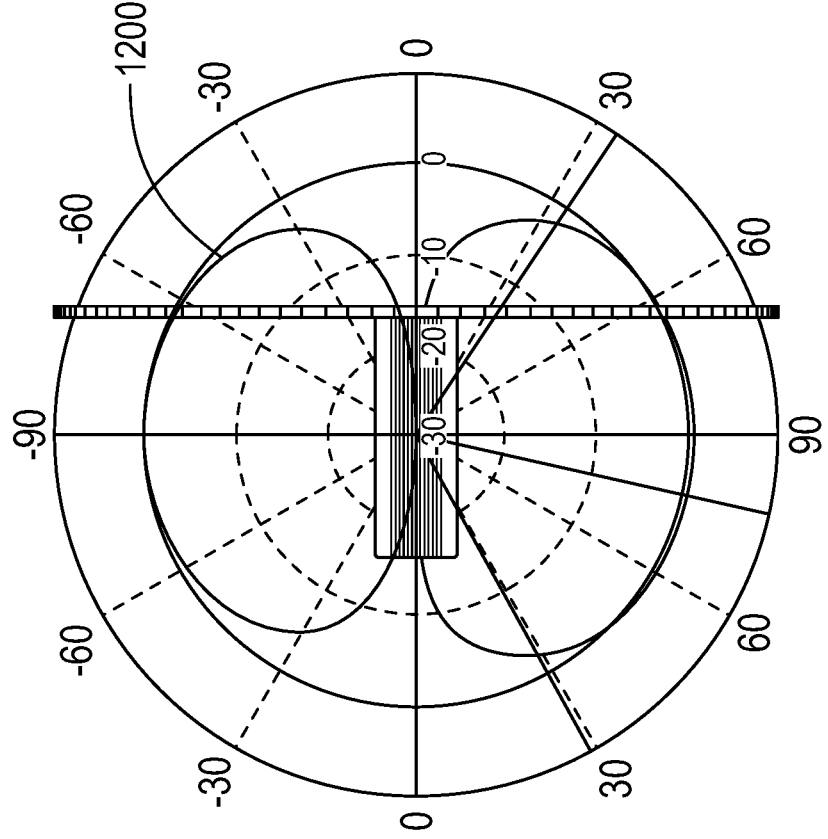
FIG. 12 is an example polar coordinate plot of radiated power associated with the linear polarized antenna of FIGS. 11A-B.

The antennas 1102, 1104 may be formed of a conductive material, whereas the circular isolator 1106 may be formed of a non-conductive (or electrically insulating) material. In one embodiment, the linear polarized antenna 1102 may be implemented as a straight wire, where the sleeve 1112 is formed of polytetrafluoroethene (PTFE) and the conductive element 1110 is formed of copper. In another embodiment, the linear polarized antenna 1102 is implemented as a helix, where the wire is wrapped around a cylindrically-shaped object formed of PTFE. FIG. 12 shows a polar coordinate plot 1200 of radiated power associated with the linear polarized antenna 1102 of FIG. 11. FIG. 13 shows a polar coordinate plot of radiated power associated with the circular polarized antenna 1104 of FIG. 11. The antennas 1102, 1104 may be connected to an RF circuit 1114, such as one of the RF circuits 223 of FIG. 3 and may be configured to be installed in a roof of a vehicle. The antennas 1102, 1104 may be used for time-of-flight measurements between a vehicle and a portable access device, whereas other LF antennas in a vehicle may be used for authentication of portable access devices.

Although antenna assemblies are primarily described as having a circular polarized antenna and a linear polarized antenna, which may be disposed, for example, in a roof of a vehicle, two linear polarized antennas may be used instead. This holds true for each of the examples disclosed herein. The two linear polarized antennas may be located deeper in the vehicle, such as in the floor, instrument panel or center console of the vehicle.

FIG. 14 shows a first RF circuit 1400, a second RF circuit 1401, and a portion 1403 of a portable access device (e.g., one of the portable access devices described above). Although a certain number of RF circuits are shown, any number of RF circuits may be included and communicate with the portable access device. The first RF circuit 1400 includes a serial transmission module 1402, a RF transceiver module 1404, a switch 1406, a splitter 1408, a single axis polarized (or monopole) antenna 1410, a delay module 1412, and a circular polarized antenna assembly 1414. The antennas 1410, 1414 may be implemented as the multi-axis polarized RF antenna assembly of FIG. 11. Although the RF circuits are each shown as having a single axis antenna and a circular polarized antenna to provide 3 axes of polarization, the RF circuits may each include only two single axis polarized antennas. Many permutations of linear and circular polarized antenna axes are possible to achieve polarization diversity in a module, preventing cross polarization and/or co-linear alignment of nulls. If the RF circuits include two single axis antennas, then the portable access device includes a three axis antenna or three single axis antennas that are orthogonal relative to each other to correspond with x, y, and z axes.

The serial transmission module 1402 may communicate with one or more vehicle modules (e.g., the vehicle control module or the access module disclosed above) via a serial bus according to a serial peripheral interconnect (SPI) protocol. Discrete signals (or general purpose I/O signals) may be transmitted between the modules 1402, 1404 and between the RF transceiver module 1404 and the switch 1406. The RF transceiver module 1404 may communicate with the PEPS module 211 (of FIG. 3). The switch 1406 switches between the antennas 1410, 1414. The splitter 1408 may split a single received from the RF transceiver module 1404 and provide the signal to the antenna 1410 and the antenna 1414 and/or combine signals received from the antenna 1410 and the antenna 1414. The splitter 1408 may be a 90° splitter and split a single signal into two 90° out of phase signals and provide the signals to two feedpoints (e.g., the feed points 1120, 1122 of FIG. 11) on the circular polarized antenna. The splitter 1408 may provide signals to or receive signals from the antenna 1414 via the delay module 1412.

The second RF circuit 1401 includes a switch 1420, a splitter 1422, a single axis polarized (or monopole) antenna 1424, a delay module 1426, and a circular polarized antenna 1428. The antennas 1424, 1428 may be implemented as the multi-axis polarized RF antenna assembly of FIG. 11. The devices 1420, 1422, 1424, 1426, 1428 may operate similarly as the devices 1406, 1408, 1410, 1412, 1414. The switch 1420 may communicate with the RF transceiver module 1404. The switch 1406 may also connect the splitter 1408, the single axis polarized antenna 1410, and/or the switch 1420 to the RF transceiver module 1404. The switch 1420 may connect the single axis polarized antenna 1424 or the splitter to the switch 1406 or the RF transceiver module 1404.

The portion 1403 includes a 3-axis LF antenna 1430, a LF module 1432, a RF module 1434, a user interface 1436, a first single axis polarized antenna 1438, a second single axis polarized antenna 1440, and a switch 1442. The LF module 1432 transmits and receives LF signals via the 3-axis LF antenna 1430. The RF module 1434 transmits and receives RF signals via the switch 1442 and the antennas 1438, 1440. The switch 1442 connects one or more of the antennas 1438, 1440 to the RF module 1434. Discrete signals and serial peripheral interconnect (SPI) signals may be transmitted between the LF module 1432 and the RF module 1434. Discrete signals may be transmitted between the RF module 1434 and the switch 1442.

RF signals are transmitted between (i) the antennas 1410, 1414, 1424, 1428 and (ii) the antennas 1438, 1440. As an example, the antennas 1410, 1424 may be associated with a z-axis, whereas the antennas 1414, 1428 may each be associated with x and y axes. The antennas 1438, 1440 may be, for example, slot antennas associated respectively with x and y axes. The 3-axis LF antenna 1430 may communicate with the LF antennas on the corresponding vehicle, as described above. The LF antennas may be used for waking up downlink purposes. The RF antennas may be used for authentication and communication.

The antennas 1410, 1414 may be used to communicate with the antennas 1438, 1440 or the antennas 1424, 1428 may be used to communicate with the antennas 1438, 1440. As an alternative, one of the antennas 1410, 1424 and either one of the antennas 1414, 1428 may be used to communicate with the antennas 1438, 1440. One or more of the antennas in the circuit 1400 may be used while using one or more of the antennas in the circuit 1401. By using one monopole (or linear polarized) RF antenna and a dipole (or multi-axis polarized) RF antenna, such as a circular polarized antenna, the number of RF switching lanes to poll is reduced from 3 down to 2. Heuristic measurements of RSSI on continuous wave tones of packets may be taken while measuring round trip times and phase delays of the packets. This may be repeated across multiple frequencies.

Figure 15:
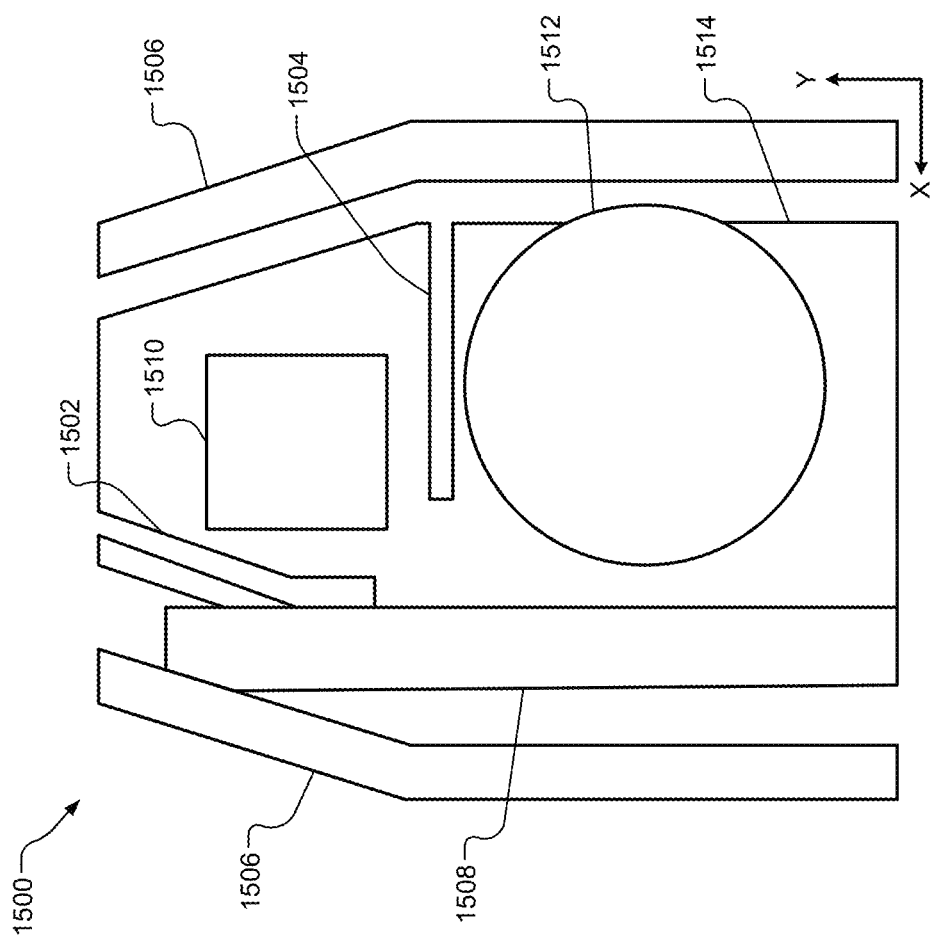
FIG. 15 is a block diagram of an example of a portion of a key fob having two linear polarized slot antennas, metal trim and a spare key in accordance with an embodiment of the present disclosure.

FIG. 15 shows a portion 1500 of a key fob having two linear polarized slot antennas 1502, 1504, metal trim 1506 and a spare key 1508. The metal in a key fob can short out fields that would otherwise stabilize along a long dimension (or Y dimension) of the key fob. As a result, it can be difficult to design an efficient radiator with structures that would otherwise include properly operating antennas. The antenna 1502 is an x-axis linear polarized slot antenna. The antenna 1504 is a y-axis linear polarized slot antenna. The metal trim 1506 may be cast decorative trim. The key fob may also include an LF coil antenna 1510, a processor (not shown), a battery 1512 and a metal plate (or conductive film) 1514. A RF signal is supplied to the metal plate 1514 and the openings of the slot antennas 1502, 1504 radiate electromagnetic waves.

Figure 16:
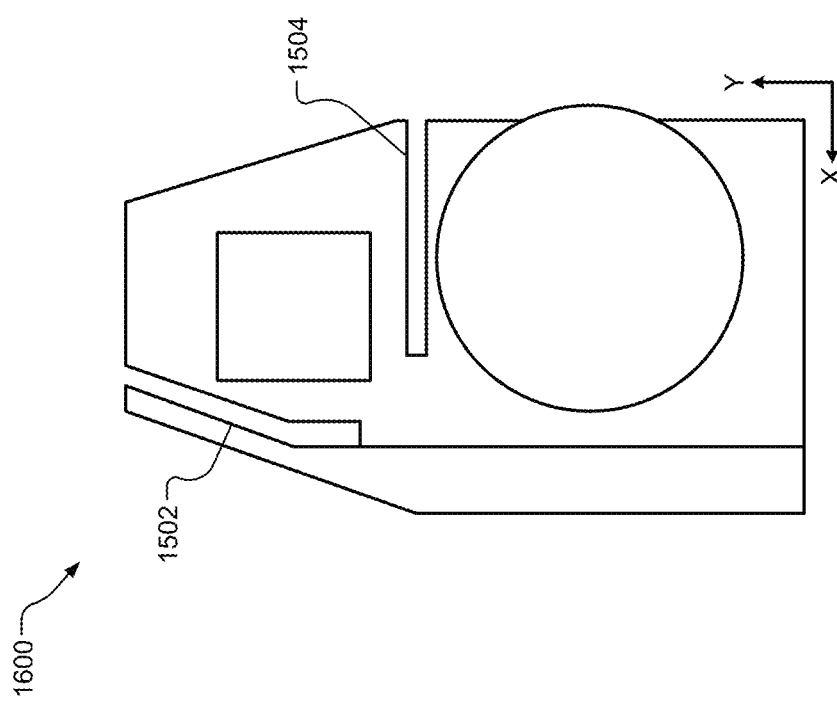
FIG. 16 is a block diagram of an example of a portion of the key fob of FIG. 15 without metal trim and a spare key having an x-axis linear polarized slot antenna and a y-axis linear polarized slot antenna.
Figure 18:
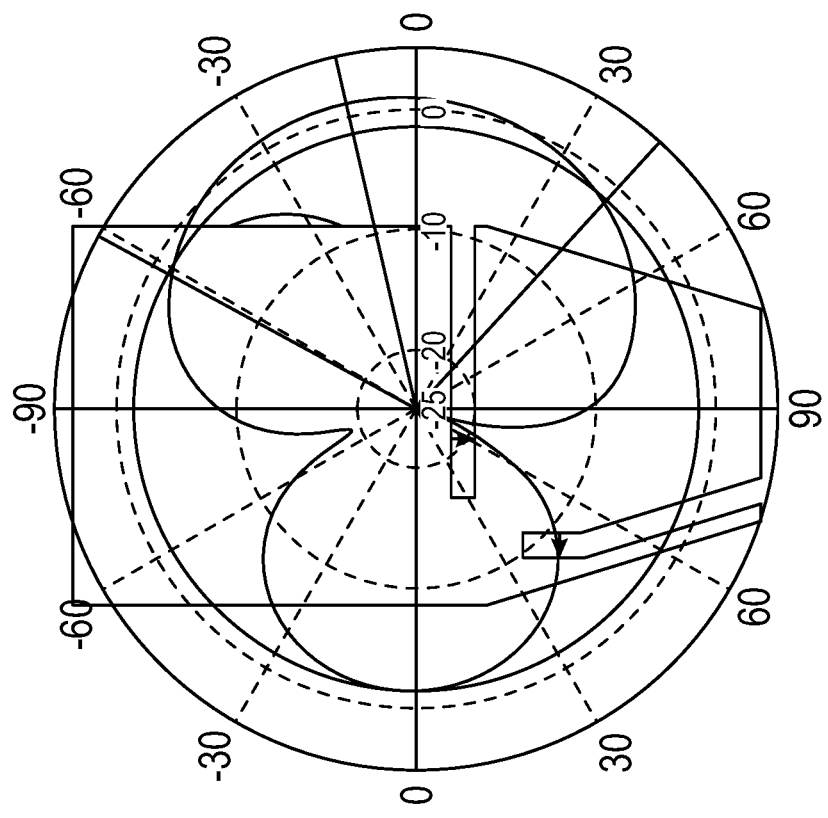
FIG. 18 is an example polar coordinate plot of radiated power associated with a y-axis linear polarized slot antenna of the portion of the key fob of FIG. 16.
Figure 17:
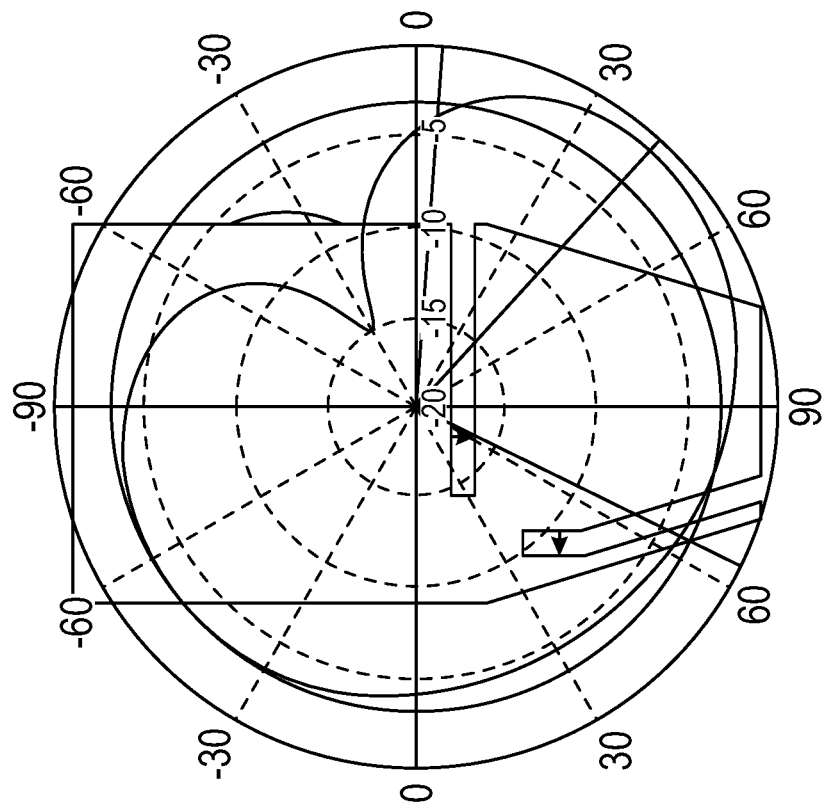
FIG. 17 is an example polar coordinate plot of radiated power associated with a x-axis linear polarized slot antenna of the portion of the key fob of FIG. 16.
Figure 19:
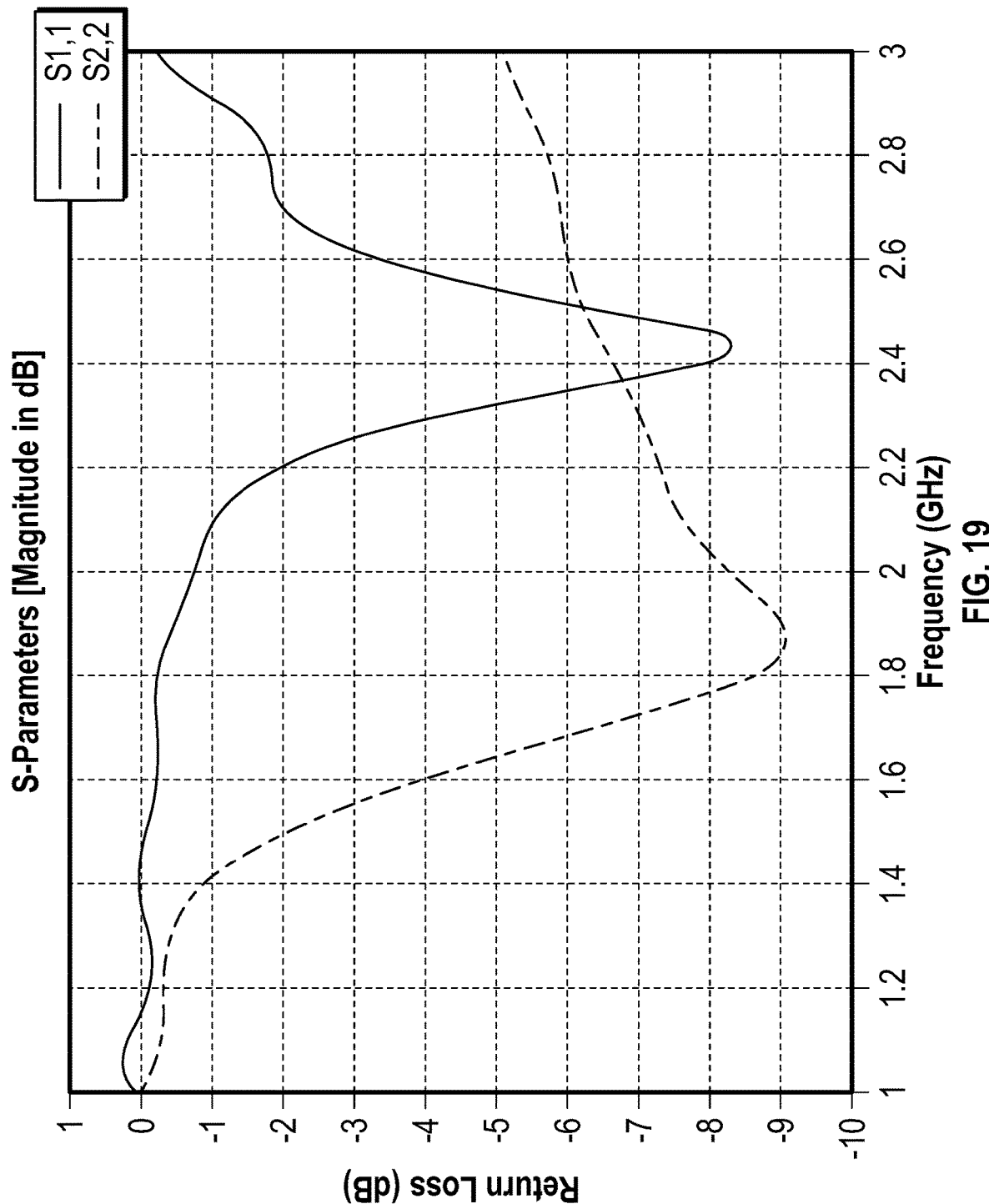
FIG. 19 is an example of return loss versus frequency plot for the linear polarized slot antennas of FIG. 16.

FIG. 16 shows a portion 1600 of the key fob of FIG. 15 without the metal trim 1506 and the spare key 1508. The portion 1600 includes the x-axis linear polarized slot antenna 1502 and a y-axis linear polarized slot antenna 1504. Removing the metal trim 1506 and the spare key 1508 supports radiation from the slot antennas 1502, 1504. Although this arrangement is configured to work with nearby metal, such as the metal trim and the spare key, the plots of FIGS. 17 and 18 are shown, which are skewed from the plots when the metal trim and the spare key are included. FIG. 17 shows a polar coordinate plot of radiated power associated with the x-axis linear polarized slot antenna 1502 of the portion 1600 of the key fob of FIG. 16. FIG. 18 shows an example polar coordinate plot of radiated power associated with the y-axis linear polarized slot antenna 1504 of the portion 1600 of the key fob of FIG. 16. FIG. 19 shows a return loss (in decibels (dB)) versus frequency plot for the linear polarized slot antennas 1502, 1504 of FIG. 16, where the curve S1,1 is reflective power for the first port or antenna 1502 of a first radio (or transmitter) and S2,2 is reflective power for the second port or antenna 1504 of a second radio (or transmitter). The structure of a key fob may be provided to provide S1,1 and S2,2 plots, where the "dip" or minimum return loss for the S1,1 and S2,2 curves is at a same frequency or within a predetermined range of each other to provide improved performance.

Return loss is a way to measure how well an antenna transforms an electric voltage on terminals of the antenna to an electric field in space or how well the antenna transforms the electric field in space to an electric voltage on the terminals. Return loss is a decibel measurement of how much power is reflected at the terminals. For example, if the return loss is 0 dB, all of the power is reflected and none of the power is transferred at the terminals. As another example, −10 dB of return loss means about 10% of the power is reflected and 90% of the power is transferred. When a return loss plot includes a curve that dips to a reasonable level at operating frequency (e.g., −6 dB), then the corresponding antenna is working well. If the return loss dips to −10 dB, then the antenna is considered a good working antenna. Return loss is measured as an S parameter. S1,1 is the return loss of port 1. S2,2 is the return loss for port 2.

Figure 20:
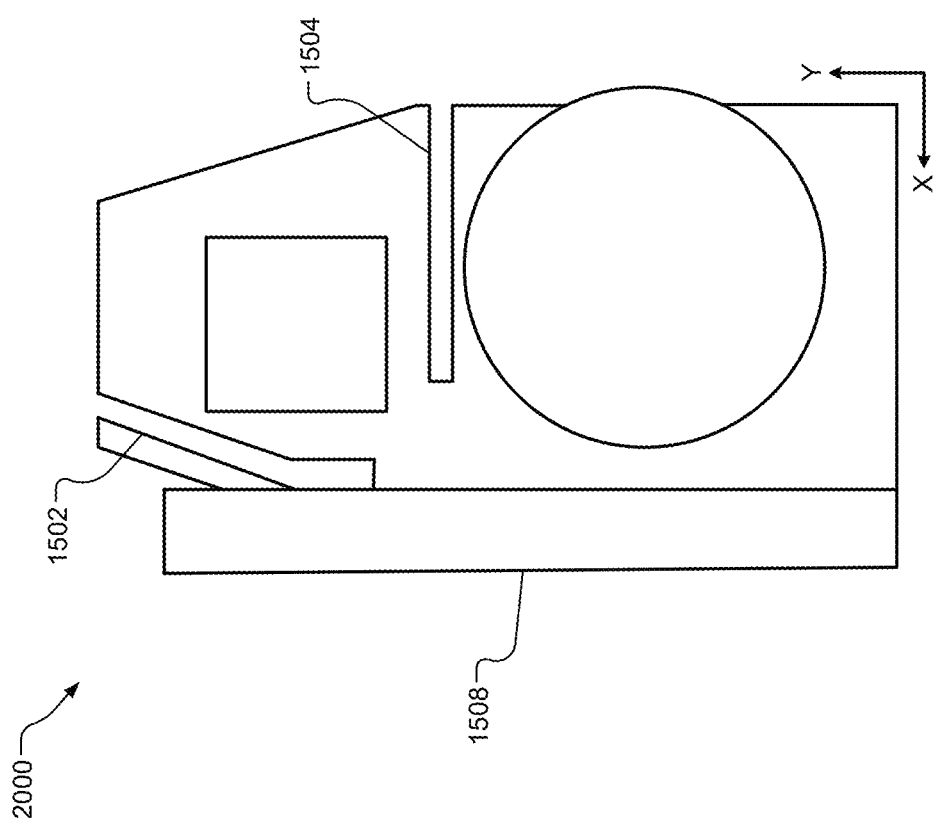
FIG. 20 is a block diagram of an example of a portion of the key fob of FIG. 15 without metal trim and including the spare key.
Figure 22:
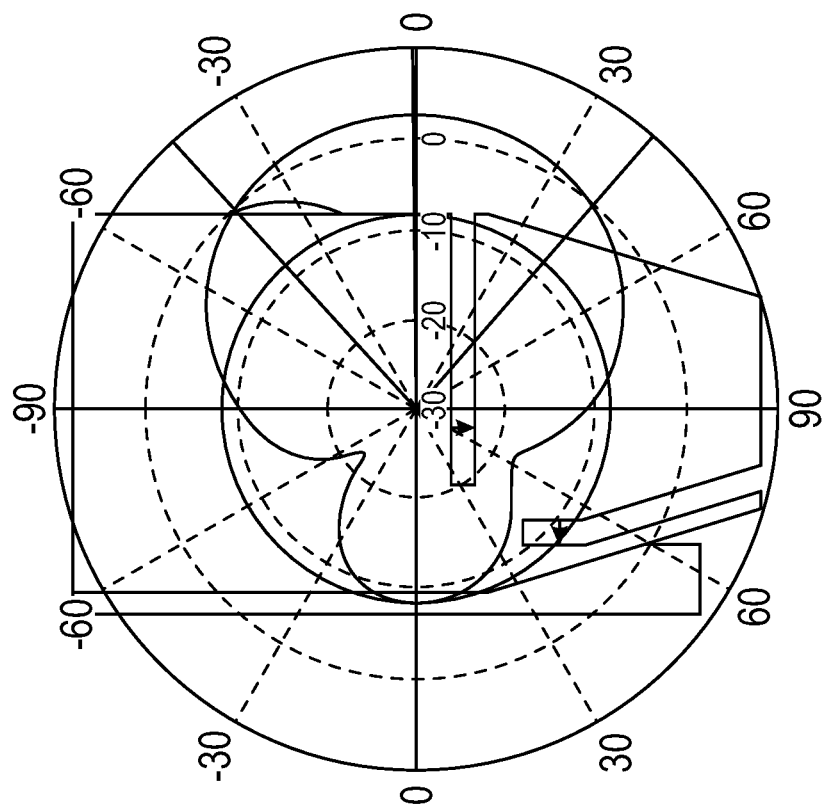
FIG. 22 is an example polar coordinate plot of radiated power associated with a y-axis linear polarized slot antenna of the portion of the key fob of FIG. 20.
Figure 21:
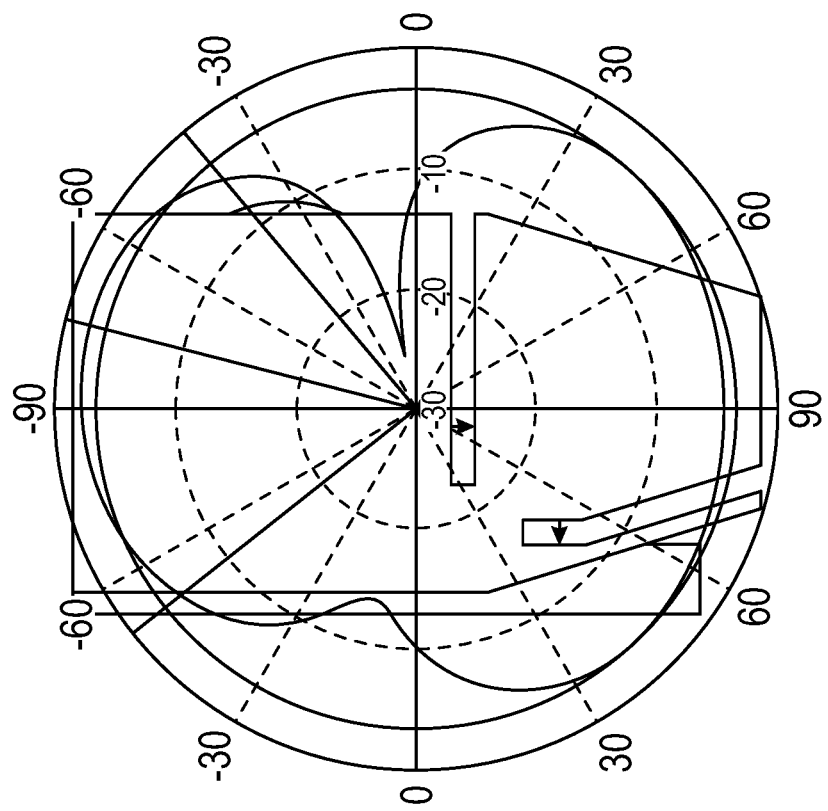
FIG. 21 is an example polar coordinate plot of radiated power associated with a x-axis linear polarized slot antenna of the portion of the key fob of FIG. 20.
Figure 23:
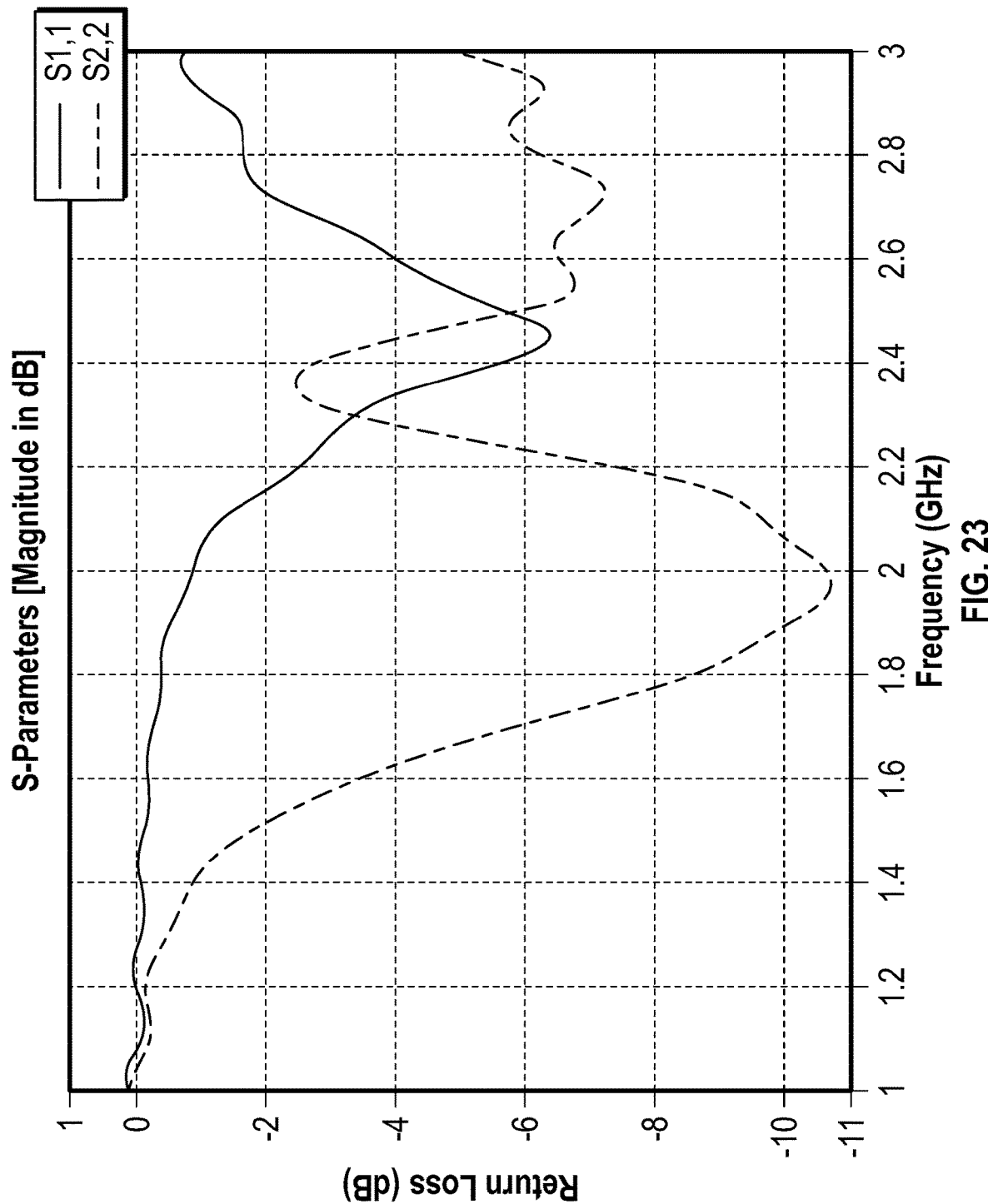
FIG. 23 is an example of return loss versus frequency plot for the linear polarized slot antennas of FIG. 20.

FIG. 20 shows a portion 2000 of the key fob of FIG. 15 without metal trim 1506 and including the spare key 1508. FIG. 21 shows a polar coordinate plot of radiated power associated with the x-axis linear polarized slot antenna 1502 of the portion 2000 of the key fob of FIG. 20. FIG. 22 shows a polar coordinate plot of radiated power associated with a y-axis linear polarized slot antenna 1504 of the portion 2000 of the key fob of FIG. 20. Adding the spare key can negatively affect the y polarization, but is acceptable for operation. FIG. 23 shows a return loss versus frequency plot for the linear polarized slot antennas 1502, 1504 of FIG. 20, where S1,1 is for the antenna 1502 and S2,2 is for the antenna 1504.

Figure 26:
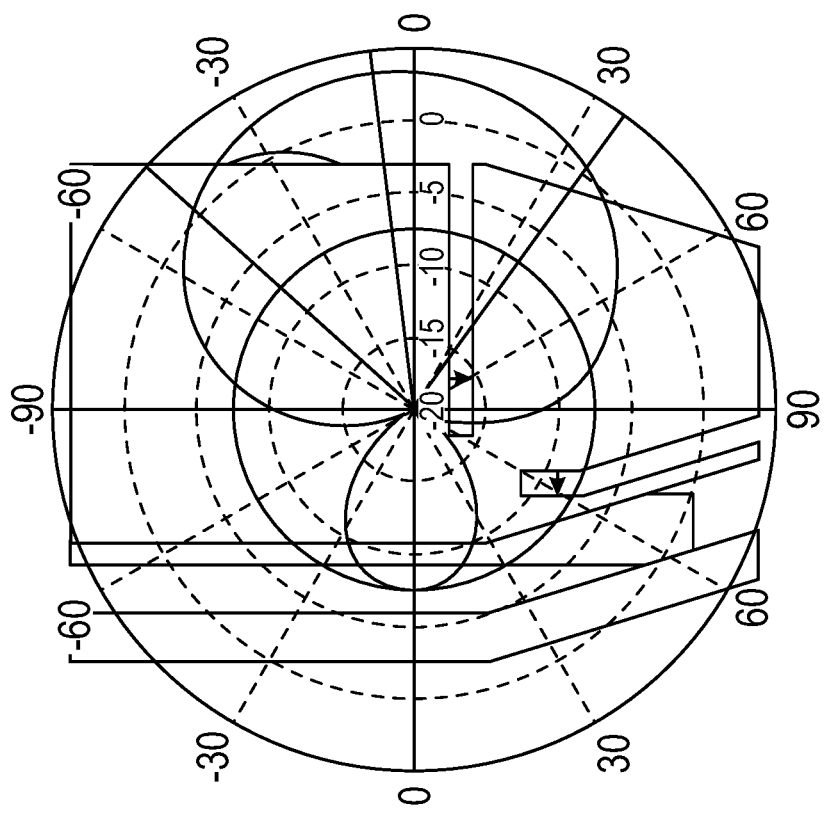
FIG. 26 is an example polar coordinate plot of radiated power associated with a y-axis linear polarized slot antenna of the portion of the key fob of FIG. 24.
Figure 25:
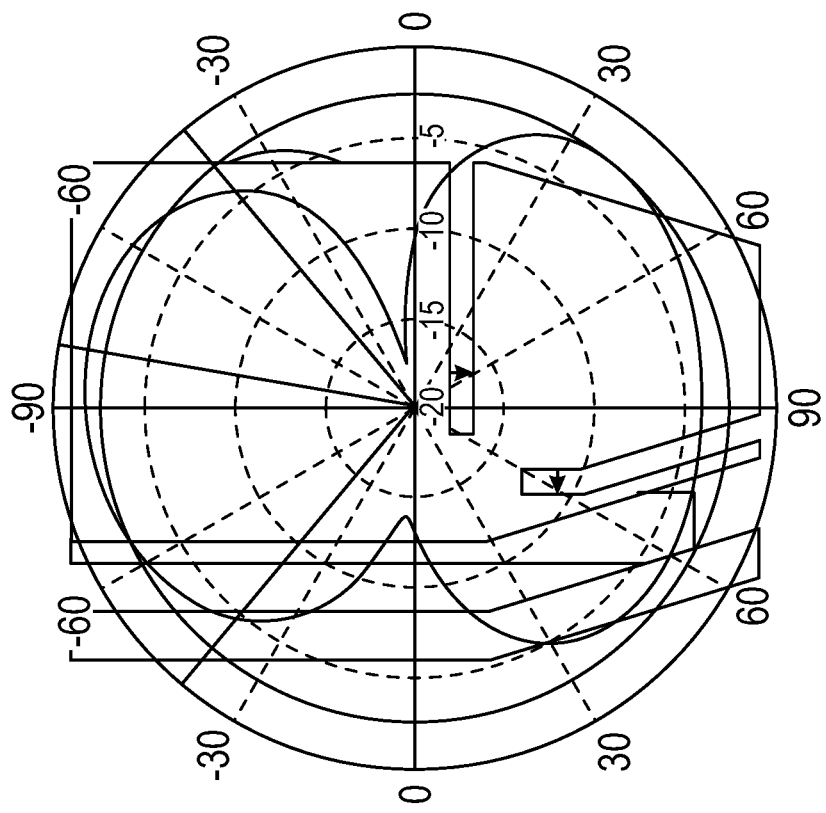
FIG. 25 is an example polar coordinate plot of radiated power associated with a x-axis linear polarized slot antenna of the portion of the key fob of FIG. 24.
Figure 27:
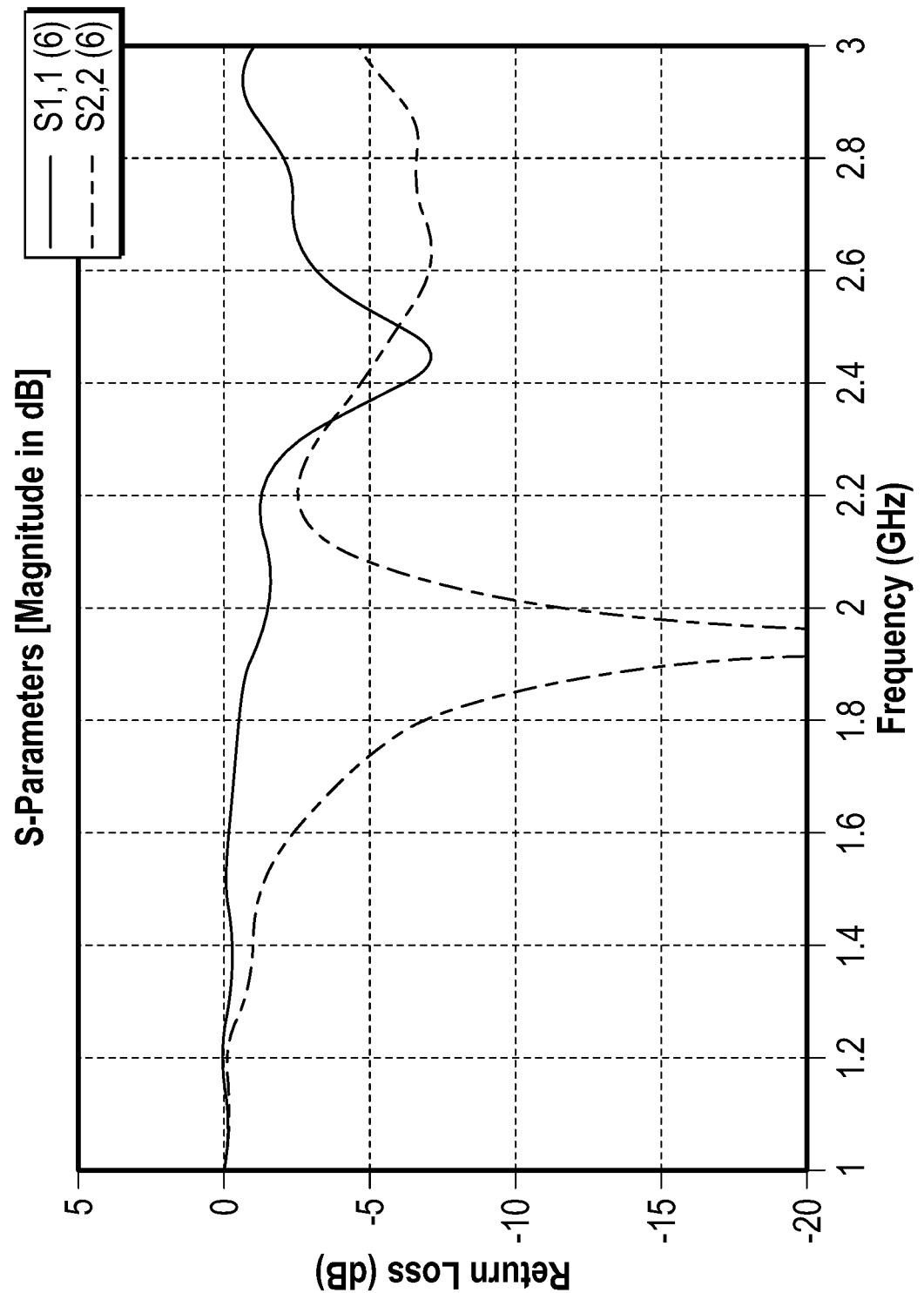
FIG. 27 is an example of return loss versus frequency plot for the linear polarized slot antennas of FIG. 24.

FIG. 24 shows a portion 2400 of the key fob of FIG. 15 with a portion of the metal trim 2402 and the spare key 1508. Adding the metal trim 2402 near the spare key 1508 can negatively affect operation as shown by the plots and curves of FIGS. 25-27. FIG. 25 shows a polar coordinate plot of radiated power associated with the x-axis linear polarized slot antenna 1502 of the portion 2400 of the key fob of FIG. 24. FIG. 26 shows a polar coordinate plot of radiated power associated with the y-axis linear polarized slot antenna 1504 of the portion of the key fob of FIG. 24. FIG. 27 shows a return loss versus frequency plot for the linear polarized slot antennas of FIG. 24, where S1,1 is for the antenna 1502 and S2,2 is for the antenna 1504. FIGS. 19, 23 and 27 show that the antennas work reasonable well at the frequency range of interest (e.g., 2.4-2.8 GHz).

Figure 29:
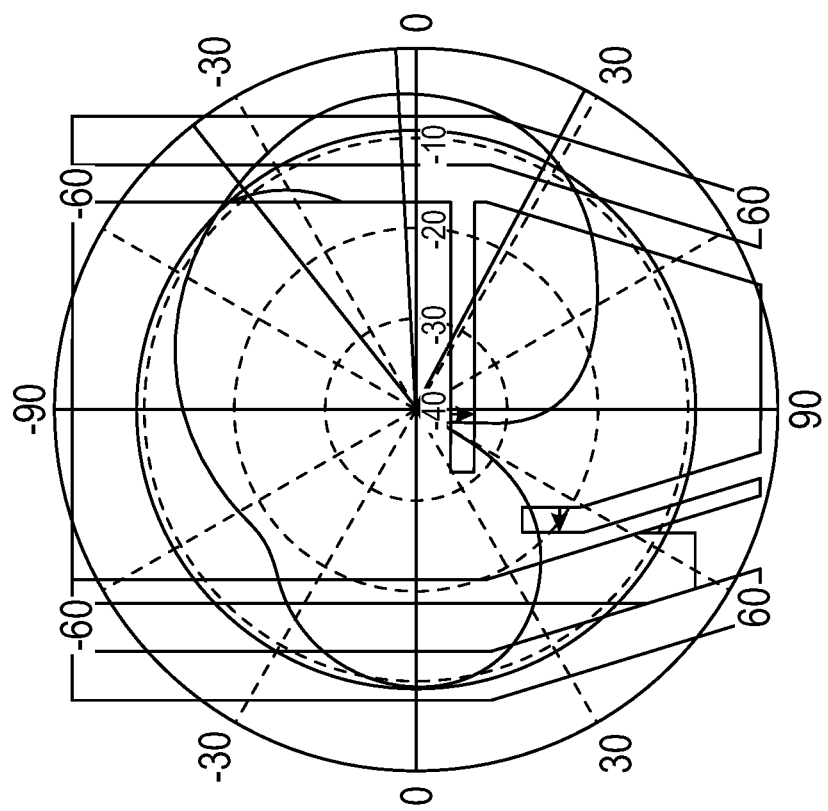
FIG. 29 is an example polar coordinate plot of radiated power associated with a y-axis linear polarized slot antenna of the portion of the key fob of FIG. 15.
Figure 28:
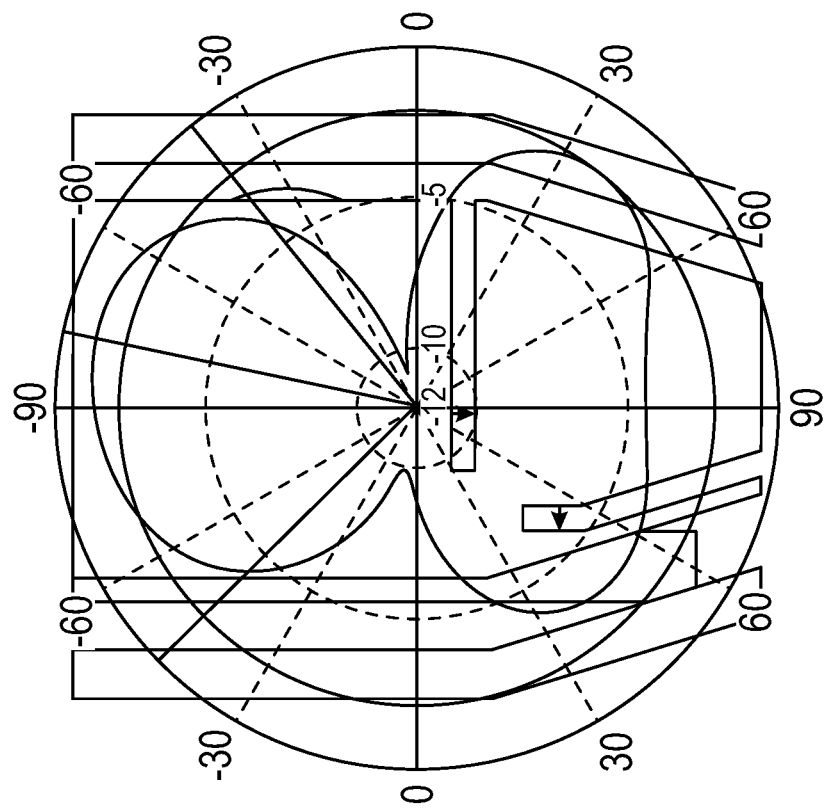
FIG. 28 is an example polar coordinate plot of radiated power associated with a x-axis linear polarized slot antenna of the portion of the key fob of FIG. 15.

Referring to the portion 1500 of FIG. 15, where the full metal trim 1506 is present, the operation of the antennas is further negatively affected as shown in FIGS. plots and curves of FIGS. 28-30. FIG. 28 shows a polar coordinate plot of radiated power associated with the x-axis linear polarized slot antenna 1502 of the portion 1500. FIG. 29 shows a polar coordinate plot of radiated power associated with the y-axis linear polarized slot antenna 1504 of the portion 1500. FIG. 30 shows a return loss versus frequency plot for the linear polarized slot antennas 1502, 1504, where S1,1 is for the antenna 1502 and S2,2 is for the antenna 1504.

Figure 31:
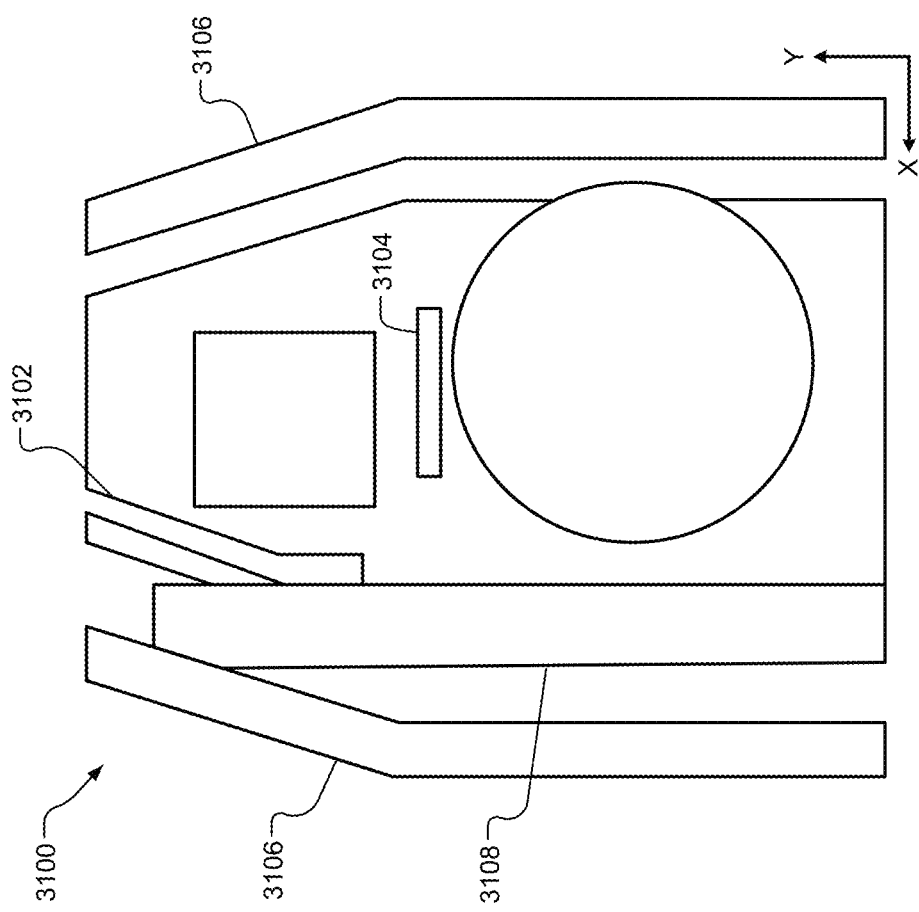
FIG. 31 is a block diagram of an example of a portion of a key fob having a closed linear polarized slot antenna, an open linear polarized slot antenna, metal trim and a spare key in accordance with an embodiment of the present disclosure.
Figure 33:
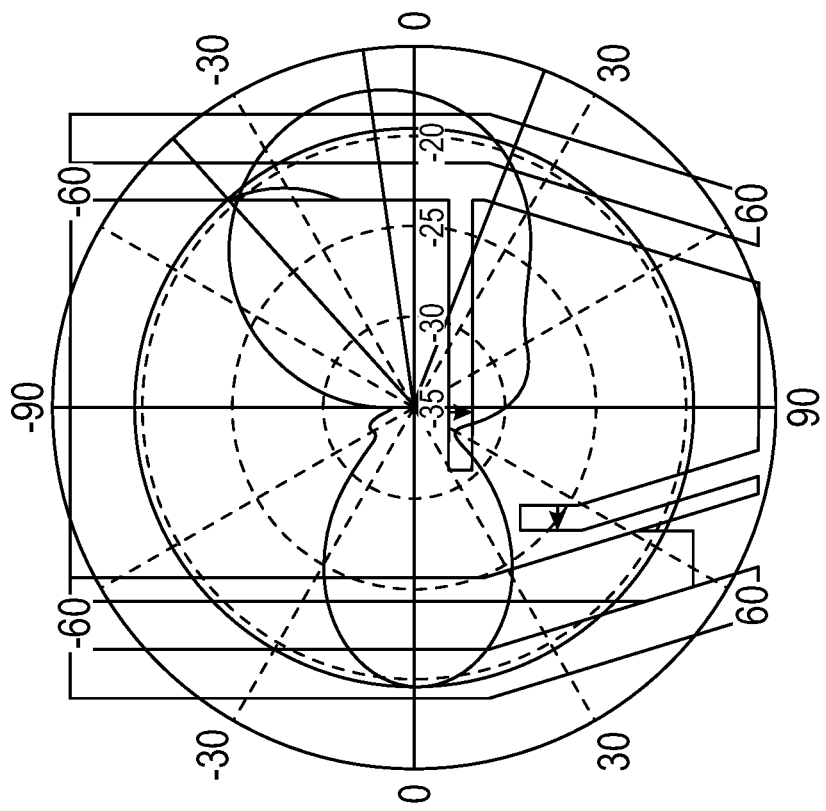
FIG. 33 is an example polar coordinate plot of radiated power associated with a y-axis linear polarized slot antenna of the portion of the key fob of FIG. 31.
Figure 32:
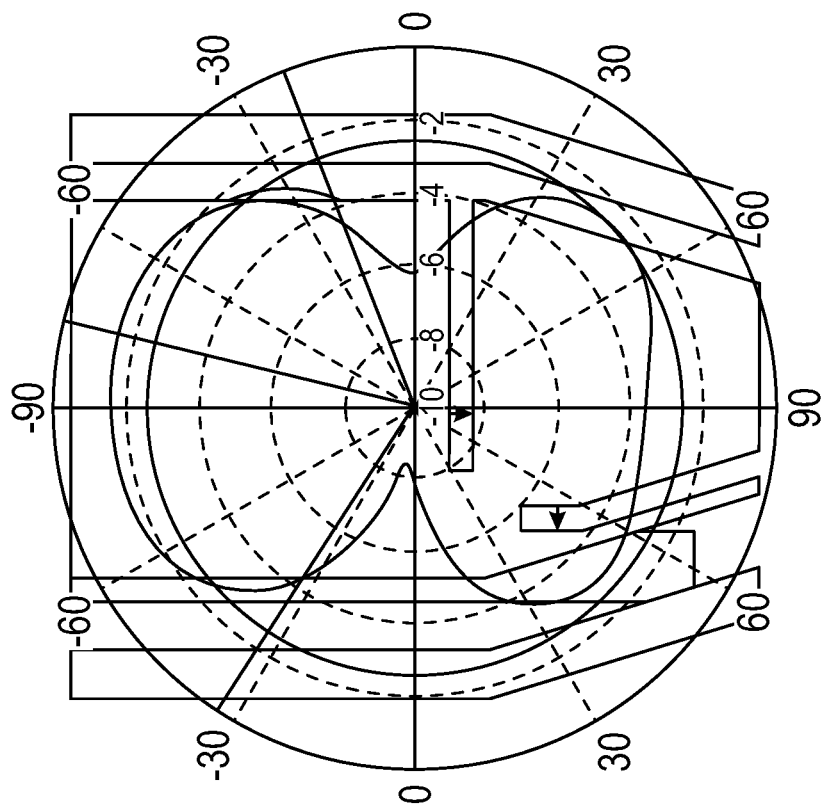
FIG. 32 is an example polar coordinate plot of radiated power associated with a x-axis linear polarized slot antenna of the portion of the key fob of FIG. 31.
Figure 34:
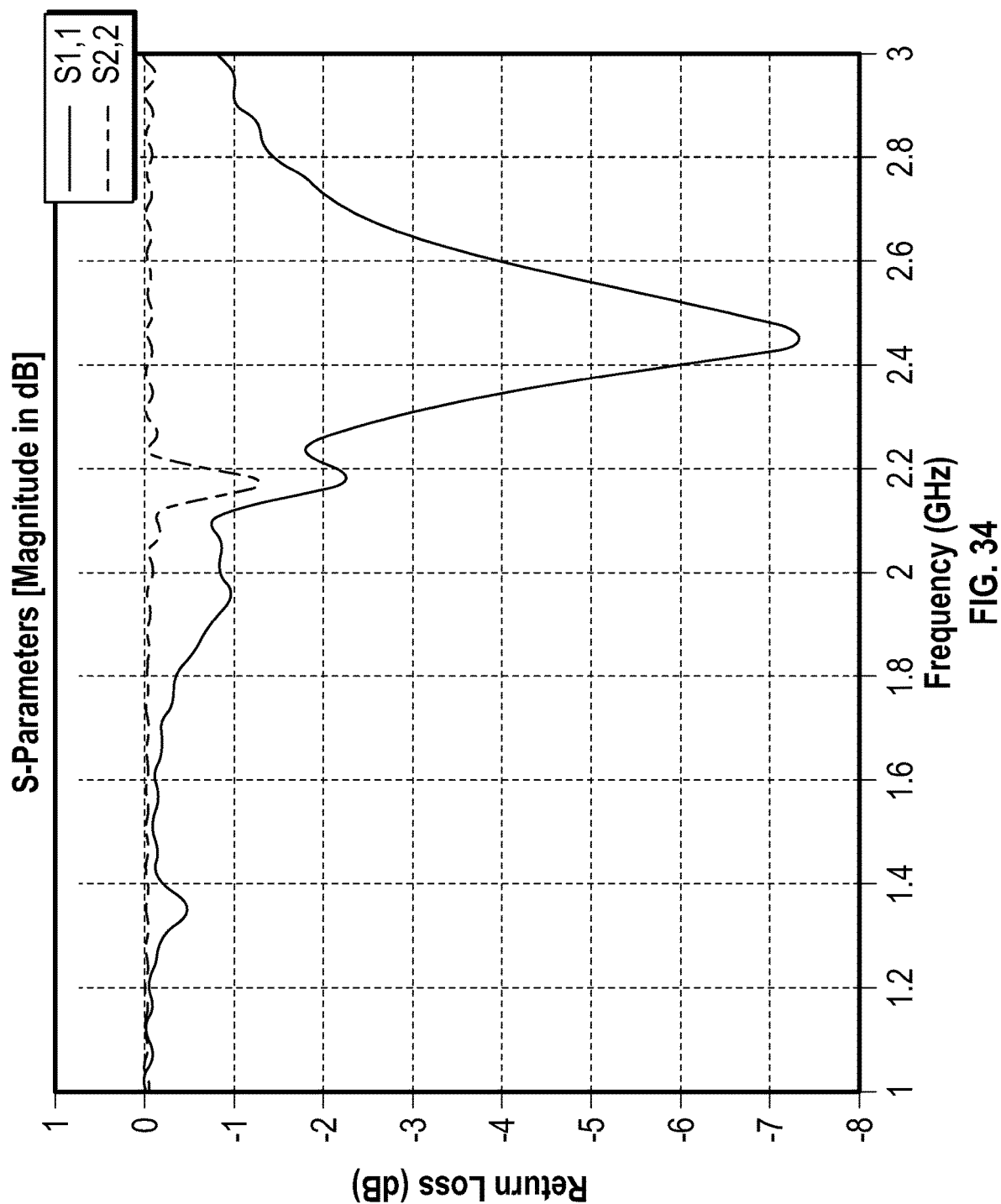
FIG. 34 is an example of return loss versus frequency plot for the linear polarized slot antennas of FIG. 31.

The y-axis linear polarized slot antennas 1502, 1504 are open slot antennas since each of the antennas 1502, 1504 has an open end. FIG. 31 shows a portion 3100 of a key fob having an open linear polarized slot antenna 3102, a closed linear polarized slot antenna 3104, metal trim 3106 and a spare key 3108. FIG. 32 shows a polar coordinate plot of radiated power associated with the x-axis linear polarized slot antenna 3102 of the portion 3100. FIG. 33 shows a polar coordinate plot of radiated power associated with the y-axis linear polarized slot antenna 3104 of the portion 3100. FIG. 34 shows a return loss versus frequency plot for the linear polarized slot antennas 3102, 3104 of FIG. 31. FIG. 34 shows that the antenna measured at port S2,2 works poorly.

When a portable access device has multiple orthogonal antennas as described above, the larger the portable access device is compared to a corresponding physical metal key and the larger the portable access device is compared to a palm of a hand, removal of decorative metal trim provides improved round trip time performance. Improved round trip time performance improves accuracy of distance determinations.

Figure 35:
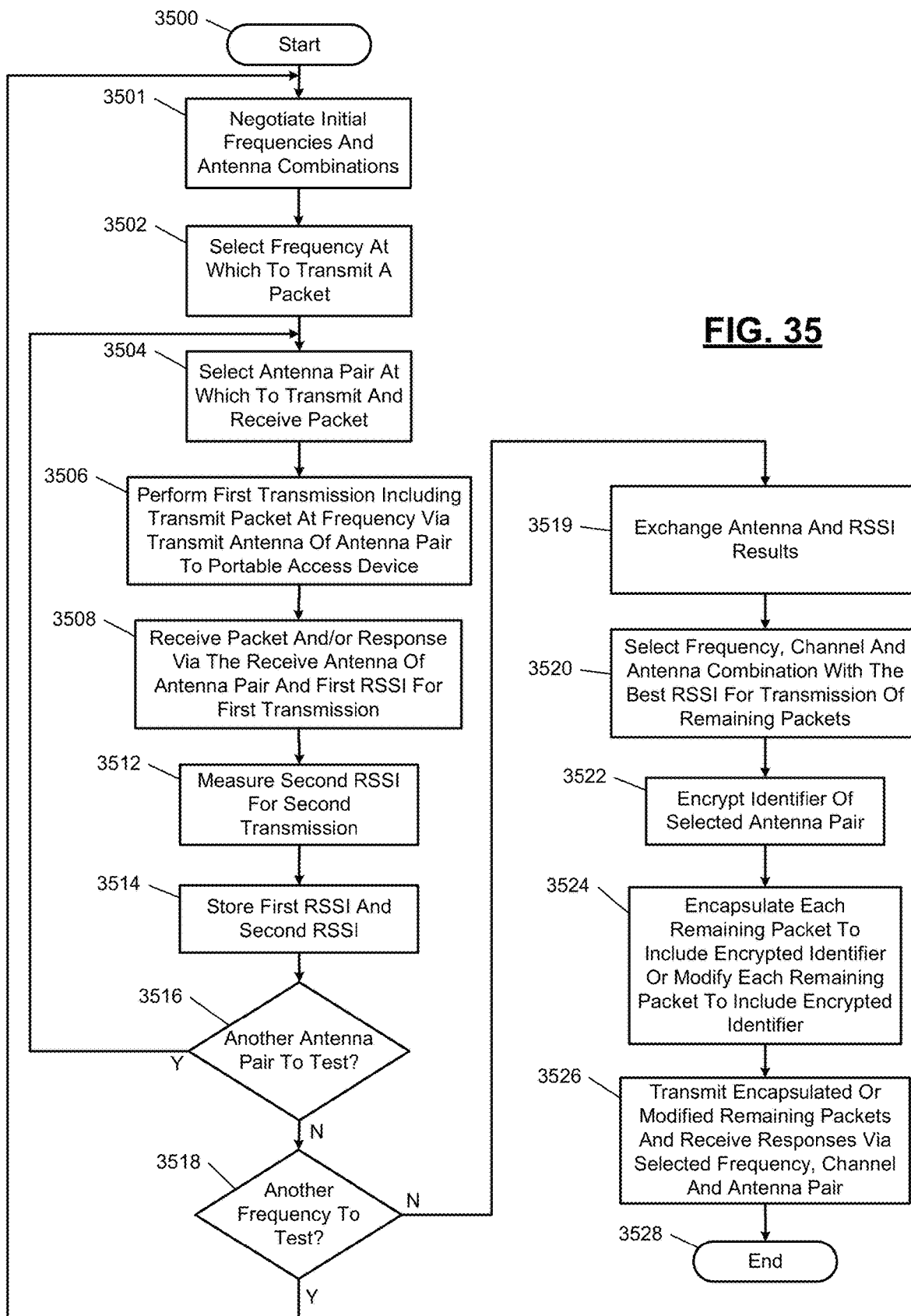
FIG. 35 illustrates a method of determining which antenna combination to use for exchanging packets between RF antenna modules of a vehicle and a portable access device for round trip time-of-flight measurements in accordance with an embodiment of the present disclosure.
Figure 36:
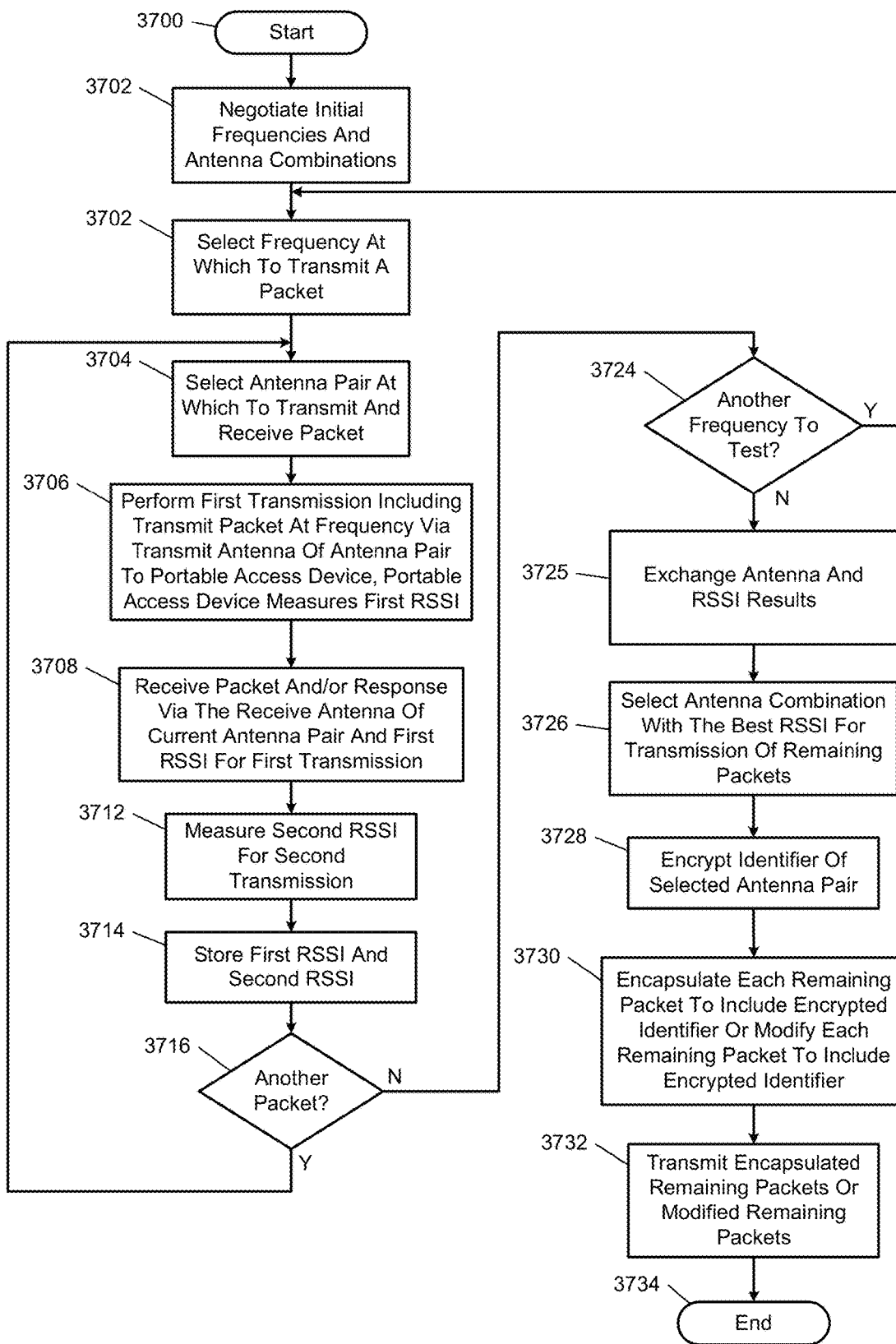
FIG. 36 illustrates another method of determining which antenna combination to use for exchanging packets between RF antenna modules of a vehicle and a portable access device for round trip time-of-flight measurements in accordance with an embodiment of the present disclosure.
Figure 37:
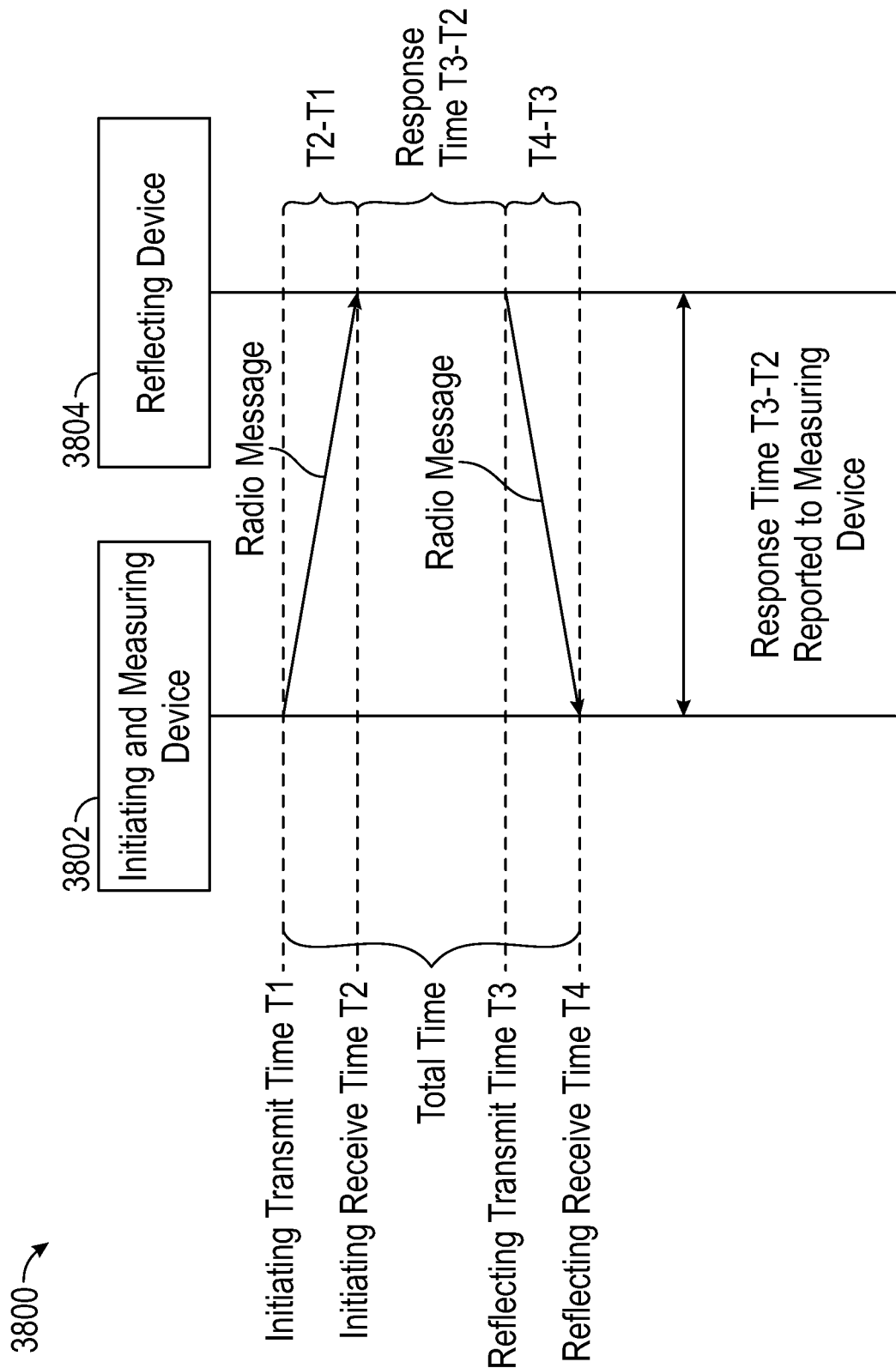
FIG. 37 is a time-of-flight measurement diagram.

The systems disclosed herein may be operated using numerous methods, which are described herein. A couple of example methods of determining which antenna combination to use are illustrated in FIGS. 35 and 36. FIGS. 35 and 36 illustrate methods of determining which antenna combination to use for exchanging packets between RF antenna modules (or RF circuits) of a vehicle and a portable access device for round trip time-of-flight measurements. FIGS. 35 and 37 represent the method from the point of view of the initiator of the round trip time-of-flight measurements. In one embodiment, this is the vehicle. In another embodiment, this is the portable access device. The reflector/responder would perform the obvious steps that correspond to initiator steps in the process. Round trip time-of-flight measurements may be used to prevent range extender type relay station attacks as further described below. FIG. 35 illustrates a switching antennas between packets approach. FIG. 36 illustrates a switching antennas during transmission of packets and/or continuous wave (CW) tones approach.

Although the following operations are primarily described with respect to the implementations of FIGS. 2-6, 11 and 14, the operations may be easily modified to apply to other implementations of the present disclosure. The operations may be iteratively performed.

The method may begin at 3500. The following operations may be generally performed simultaneously by the control module 402 in a portable access device 400 and by modules located on the vehicle, for example, by the access module 210, the PEPS module 211 and/or the PAK module 212 of FIG. 4. There are many ways that the frequencies and antenna combinations that are sampled may be select to then identify the best frequencies (or channels) and antenna axes. Optionally, at 3501 the modules negotiate the initial frequencies (or channels) and antenna combinations to use for the frequency and antenna sounding. This step can be based on an a priori agreement, negotiated between the modules based upon a posteriori data, and/or commanded by a module based upon a posteriori data. At 3502, a frequency (or channel) is selected at which to transmit a first (or next) packet.

At 3504, an antenna pair is selected at which to transmit and receive the packet. Such as two of the antennas of the RF circuits of the vehicle of FIG. 11. At 3506, the packet is transmitted from a first (or transmit) antenna at the selected frequency to a portable access device. The portable access device measures the RSSI of the transmission and transmits the packet and as a first RSSI back to the second (or receive) antenna of the selected pair of antennas.

At 3508, the second antenna receives the packet and/or a response to the transmission of the packet and the first RSSI. At 3512, a second RSSI is measured for the second transmission of the packet. At 3514, the first RSSI and the second RSSI are stored in memory in association with the packet, the selected frequency and the selected pair of antennas.

At 3516, if another antenna pair is to be selected, operation 3504 is performed, otherwise operation 3518 is performed. This allows each antenna pair permutation to be cycled through for each selected frequency. The antenna pair permutations may be cycled through in a pseudo random and/or predefined order.

At 3518, if another frequency (or channel) is to be selected, operation 3502 is performed, otherwise operation 3520 is performed. This allows each frequency (or channel) to be cycled through. This allows the RSSIs of each of the frequencies (or channels) to be determined. Multipath fast fading can cause some frequencies to have lower power levels (or RSSI values). As an example, the frequencies of 37 BLE data channels may be cycled through in a pseudo random and/or pre-defined order to determine the best frequency and/or channel and best antenna pair for transmission of other packets.

Optionally at 3519, after cycling through a predetermined, negotiated and/or agreed set of the frequencies and the antenna axes pairs, the algorithm may have the nodes (control modules) optionally exchange antenna and/or channel RSSI results. Because of RF channel reciprocity the modules may use a heuristic that selects the antenna axes used by the modules without sharing antenna RSSI measurements taken by the modules. Because of RF channel reciprocity the modules may use a heuristic to select the channels (frequencies) without results from the other channels, but the modules may use an algorithm that selects the channels based upon results from the channel. In this case the algorithm and system are more immune from interference from other nearby transmitters.

At 3520, after cycling through a predetermined number of the frequencies and the antenna pairs, the antenna axes combination and/or frequencies (channels) with the best RSSIs are selected for transmission of remaining packets. Best, being the antenna axes combinations with the highest RSSI. For frequencies (or channels) best being those that don't have low RSSIs and/or don't have high RSSIs. At 3522, an identifier of the selected antenna pair and/or frequencies (channels) may be encrypted. At 3524, the encrypted selected antenna axis pair and/or frequencies (channels) may be transmitted to the other node. At 3526, the packets are transmitted and responses are received using the selected frequencies (channels) and antenna pair. The method may end at 3528.

Although the following operations of FIG. 36 are primarily described with respect to the implementations of FIGS. 2-6, 11 and 14, the operations may be easily modified to apply to other implementations of the present disclosure. The operations may be iteratively performed.

The method may begin at 3700. The following operations may be generally performed simultaneously by the control module 402 in a portable access device 400 and by modules located on the vehicle, for example, the PEPS module 211 and/or the PAK module 212 of FIG. 4. Multiple different techniques may be used to select the frequencies and antenna combinations that are sampled to then identify the best frequencies (or channels) and antenna axes. Optionally at 3701 the modules negotiate the initial frequencies (or channel) and antenna combinations to use for the frequency and antenna sounding. This step can be based on an a priori agreement, or negotiated between the modules based upon a posteriori data, or commanded by a module based upon a posteriori data. At 3702, a frequency (or channel) is selected at which to transmit a first (or next) packet.

At 3704, an antenna pair is selected at which to transmit and receive the packet. Such as two of the antennas of the RF circuits of the vehicle of FIG. 11. At 3706, the packet is transmitted from a first (or transmit) antenna at the selected frequency to a portable access device. The vehicle switches between a negotiated set of antenna axes with dwells during the CW tone portion of the packet. The portable access device switches between a negotiated set of antenna axes with dwells within each of vehicle antenna axis "switch and dwells" for periods within the CW tone measures the RSSIs of transmit and receive antenna axis permutation during the reception and transmits the packet and a first set of measured RSSIs back to the vehicle and then switches between a negotiated set of antenna axes with dwells during the CW tone portion of the packet selected pair of antennas.

At 3708, the vehicle receives the packet and/or a response to the transmission of the packet and the first set of RSSIs. At 3712, a second RSSI is measured for the second transmission of the packet. At 3714, the first RSSI and the second RSSI are stored in memory in association with the packet, the selected frequency, and the selected pair of antennas.

At 3716, if another packet is to be transmitted, operation 3718 is performed, otherwise operation 3726 may be performed. At 3718, if another antenna pair is to be selected, operation 3720 is performed, otherwise operation 3724 is performed. This allows each antenna pair permutation to be cycled through for each selected frequency. The antenna pair permutations may be cycled through in a pseudo random and/or predefined order.

At 3720, a first transmission of a next packet is started using the previous transmission antenna of the previously selected antenna pair.

At 3722, a switch occurs between the previous antenna pair and a next selected antenna pair. This may occur during a CW tone of the currently being transmitted packet or during another portion of the currently being transmitted packet, such that a remainder of the packet is transmitted via the transmission antenna of the next selected antenna pair. Operation 3708 may be performed subsequent to operation 3722.

At 3724, if another frequency (or channel) is to be selected, operation 3704 is performed, otherwise operation 3718 is performed. This allows each frequency (or channel) to be cycled through. This allows the RSSIs of each of the frequencies (or channels) to be determined. Multipath fast fading can cause some frequencies to have lower power levels (or RSSI values). As an example, frequencies of 37 BLE data channels may be cycled through in a pseudo random and/or pre-defined order to determine the best frequency and/or channel and best antenna pair for transmission of other packets. At 3725, antenna and RSSI result values may be exchanged as described above at 3519.

At 3726, after cycling through a predetermined number of the frequencies and the antenna pairs, the antenna combination and frequency and/or channel with the best RSSIs are selected for transmission of remaining packets.

At 3728, an identifier of the selected antenna pair may be encrypted. At 3730, each remaining packet may be encapsulated to include the encrypted identifier or modified to include the encrypted identifier. At 3732 the encapsulated or modified packets are transmitted and responses are received using the selected frequency, channel and antenna pair. The method may end at 3734.

In the above-described methods, the packets that are transmitted to determine the best frequency, channel and antenna pair may be discarded. The discarded packets are used simply for measuring the RSSI values. In another embodiment, CW tones are included at the end of packets, and antenna switching occurs during these tones. In another embodiment, a predetermine period of time (e.g., 4 μs) is allocated for each antenna permutation, CW tones are included at ends of packets, and the antenna pair with the best RSSI (or power values) is selected. The selected frequency, channel, and/or antenna pair may be changed if another nearby network device is transmitting and/or receiving data in a same frequency range. In an embodiment, the pattern in which frequencies are selected during the methods of FIGS. 35 and 36 is pre-known and shared between the access module of the vehicle and the portable access device.

The operations 3526 and 3732 may be performed to authorize a portable access device, detect range extender type relay station attacks by the portable access device, provide access to an interior of a vehicle, and/or perform other PEPS system and/or PAK system operations. As an example, the packets may be transmitted to authorize the portable access device and access to the interior of the vehicle may be provided when the portable access device and/or corresponding user is determined to be authorized to access the vehicle. This may include permitting operation of the vehicle. The packets may be transmitted to take time-of-flight measurements including time to transmit the packets to the portable access device and time to respond and receive corresponding responses from the portable access device. Based on the measured time-of-flight values, the access module (e.g., PEPS module or PAK module) of the vehicle may determine whether the portable access device is attempting to perform a range extender type relay station attack. If the portable access device is attempting to perform a range extender type relay station attack, the access module performs one or more countermeasures including preventing access to the interior of the vehicle. The countermeasures may include notifying an owner of the vehicle of the range extender type relay station attack. This may be done, for example, via a text message or email transmitted from the access module to one or more network devices of the owner. One or more alert signals may be generated and a central monitoring station and/or authorities may be notified of the attack.

FIG. 37 shows a time-of-flight measurement diagram 3800 that includes an initiating and measuring device 3802 and a reflecting (or responding) device 3804. The initiating and measuring device 3802 transmits a radio message (e.g., a packet) to the reflecting device 3804, which then responds and resends the radio message back to the initiating and measuring device 3802. The time-of-flight (or total time to transmit and receive these signals) is equal to a sum of $(T_2-T_1)$, $(T_3-T_2)$ and $(T_4-T_3)$, where: $T_2-T_1$ is the amount of time for the radio message to travel from the initiating and measuring device 3802 to the reflecting device 3804; $T_3-T_2$ is the amount of time for the reflecting device 3804 to respond; and $T_4-T_3$ is the amount of time for the radio message to travel from the reflecting device 3804 to the initiating and measuring device 3802. Example average time of flight and distance calculations may be performed according to equations 1-4, where the distance refers to the distance between the initiating and measuring device 3802 and the reflecting device 3804.

$$\text{Average Time of Flight} = \frac{(\text{Total Time}) - (\text{Response Time})}{2} \quad (1)$$

$$\text{Average Time of Flight} = \frac{(T_4 - T_1) + (T_3 - T_2)}{2} \quad (2)$$

$$\text{Distance} = (\text{rate})(\text{time}) \quad (3)$$

$$\text{Distance} = (c)\left(\frac{(T_4 - T_1) + (T_3 - T_2)}{2}\right) \quad (4)$$

When a timer is used to time the response time $T_3-T_2$, the amount of timing information may be reduced to adjust fine tuning information measured and associated with the response time. The time $T_3-T_2$ may be reported back to an initiator, if the initiator is not aware of this amount of time.

Figure 38:
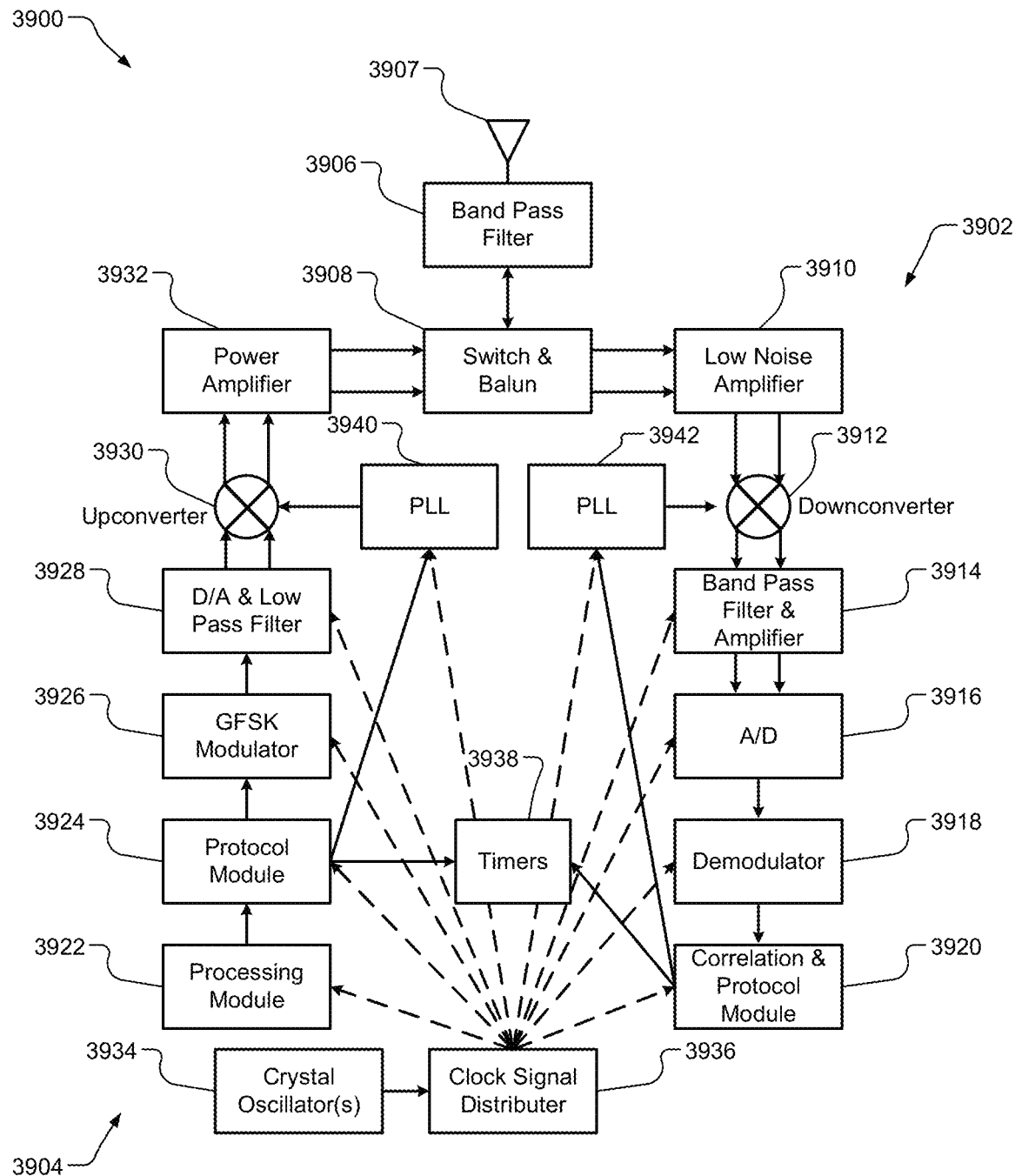
FIG. 38 is a functional block diagram of an example BLE radio with a superheterodyne receiver and a transmitter in accordance with an embodiment of the present disclosure.

FIG. 38 shows an example BLE radio 3900 with a superheterodyne receiver 3902 and a transmitter 3904. The BLE radio 3900 may be used as, for example, one of the transceivers 222 of FIG. 3 and include or be part of one of the RF antenna modules 40 and RF circuits 223. The superheterodyne receiver 3902 uses frequency mixing to convert a received signal to a fixed intermediate frequency (IF). The superheterodyne receiver 3902 includes a RF (e.g., band pass) filter 3906, a switch and balun 3908, a low noise amplifier 3910, a downconverter 3912, a bandpass filter and amplifier 3914, an analog-to-digital converter 3916, a demodulator 3918 and a correlation and protocol module 3920. The transmitter 3904 includes a processing module 3922, a protocol module 3924, a Gaussian frequency shift keying (GFSK) modulator 3926, a digital-to-analog converter and low pass filter 3928, an upconverter 3930 and a power amplifier 3932. Crystal oscillator(s) 3934 may generate one or more clock signals, which may be distributed to the devices 3914, 3916, 3918, 3920, 3922, 3924, 3936, 3938 and phase lock loops 3940, 3942. As an example the processing module 3922 and the correlation and protocol module 3920 may be implemented as a single module and as part of one or more of the modules 204, 210, 211, 212 of FIG. 3. Operations performed by the modules 3922 and 3920 may be implemented by any one of the modules 204, 210, 211, 212 of FIGS. 3-4. One or more of the devices 3906, 3908, 3910, 3912, 3914, 3916, 3918, 3920, 3924, 3926, 3928, 3930, 3932, 3934, 3936, 3938, 3940, and 3942 may be implemented as part of the RF circuits 223 and/or as part of one or more of the modules 204, 210, 211, 212.

The band pass filter 3906 may be connected to a linear polarized antenna and/or a circular polarized antenna (designated 3907). The downconverter 3912 downconverts received signals from an RF frequency to an IF frequency based on a signal from the phase lock loop 3942. The upconverter 3930 upconverts IF signals to RF signals based on a single from the phase lock loop 3940.

Figure 39:
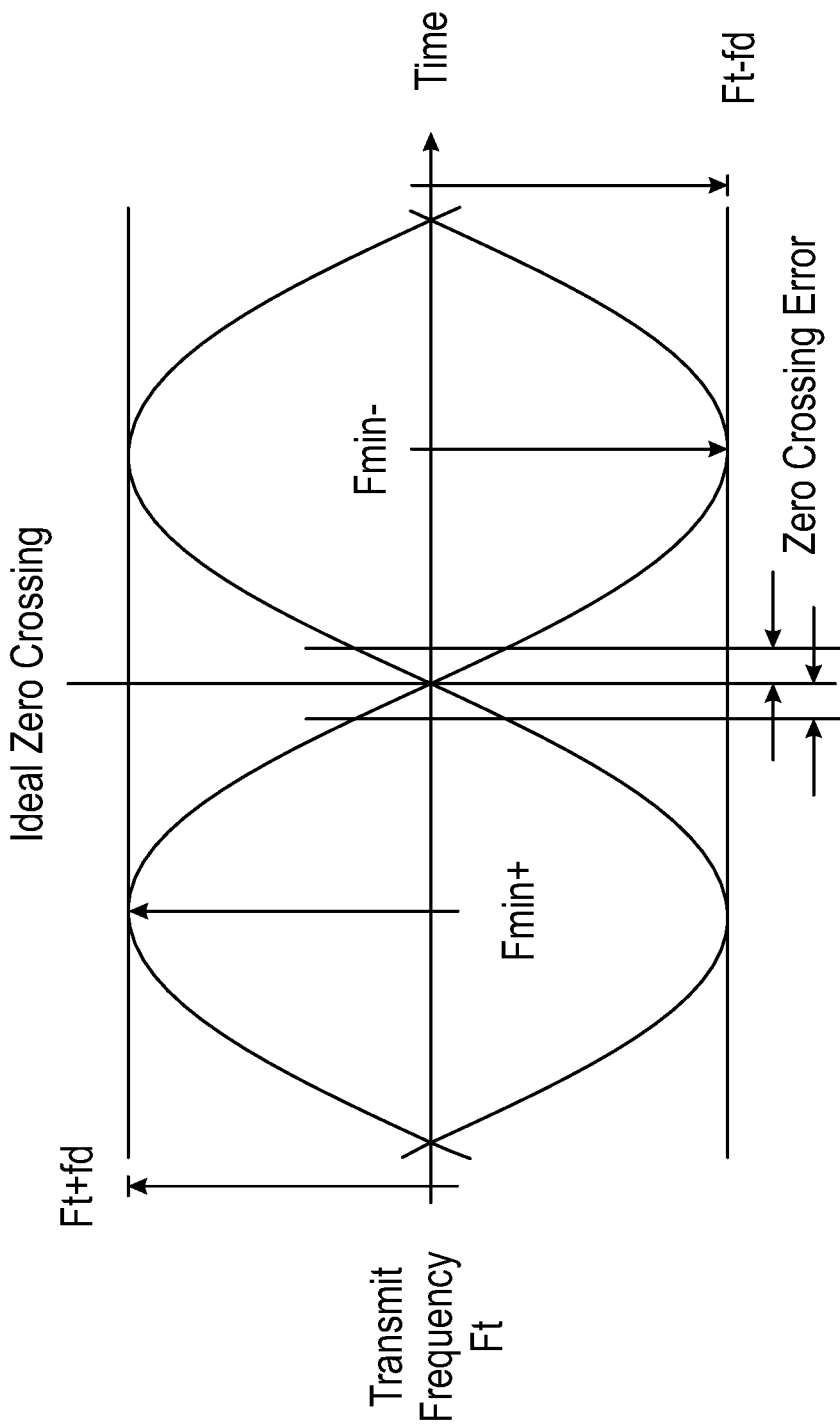
FIG. 39 is an example GFSK parameters definition plot.

The GPSK modulator 3926 and the demodulator 3918 may modulate and demodulate bits of signals according GFSK protocols. FIG. 39 shows an example GFSK parameters definition plot including a plot of transmit carrier frequency $F_c$ illustrating zero-crossing points and error. As an example, the transmit carrier frequency $F_c$ may be ±250 KHz or ±500 KHz with a symbol time of 1 μs or 0.5 μs and zero-crossing error of $\frac{1}{8}^{th}$ of 1 μs (1 Mbps) or $\frac{1}{8}^{th}$ of 0.5 μs (2 Mbps).

Figure 40:
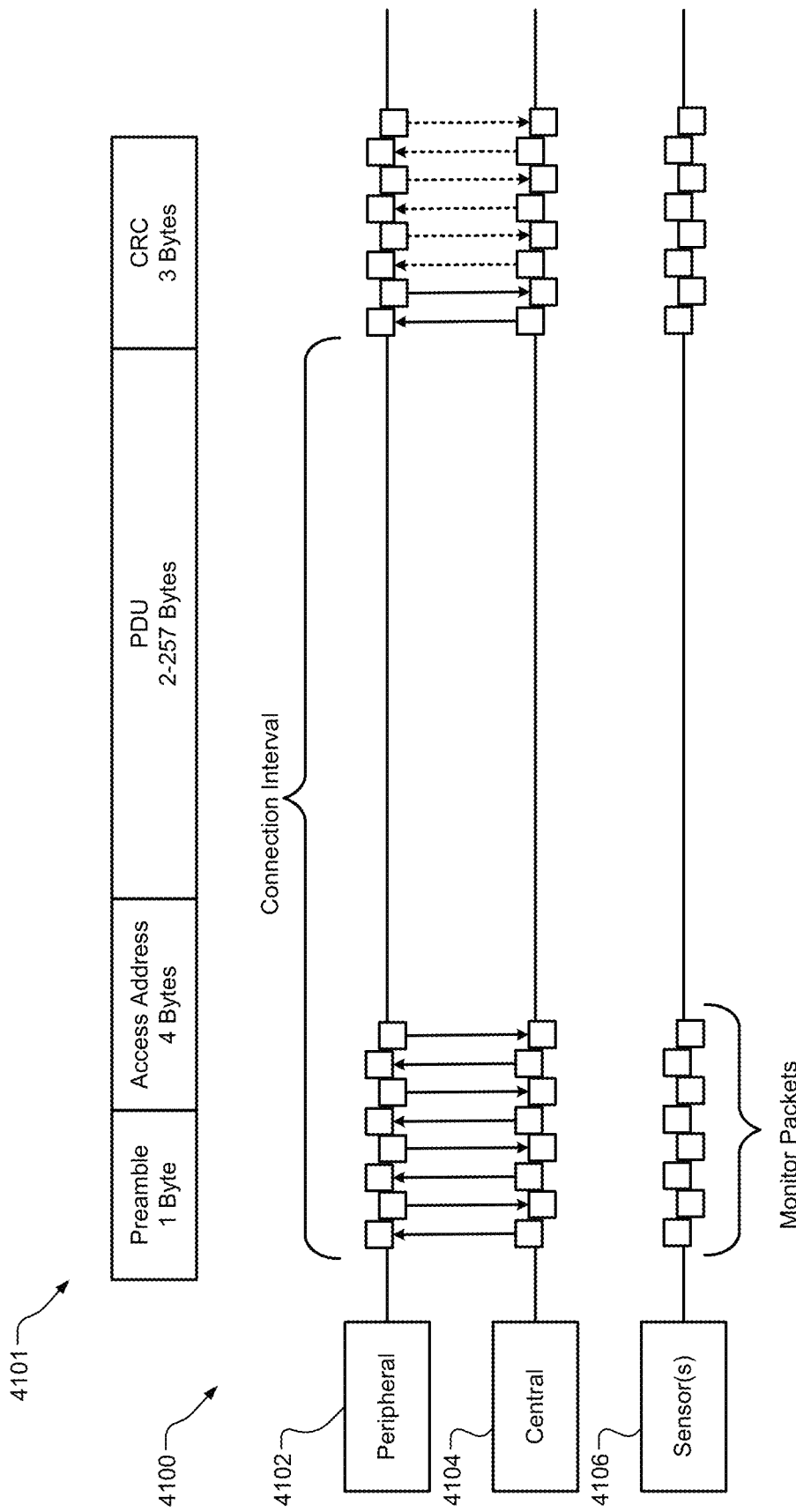
FIG. 40 is a functional block diagram of a system for transmitting BLE packets.

FIG. 40 shows a functional block diagram of a system 4100 for transmitting BLE packets. An example format of the BLE packets 4101 is shown including a preamble, an access address, a protocol data unit (PDU) and cyclic redundancy check (CRC) bit fields. This is an example of packets that may be received by the correlation and protocol module 3940 of FIG. 38 and/or generated by the processing module 3922 and/or protocol module 3924.

Figure 41:
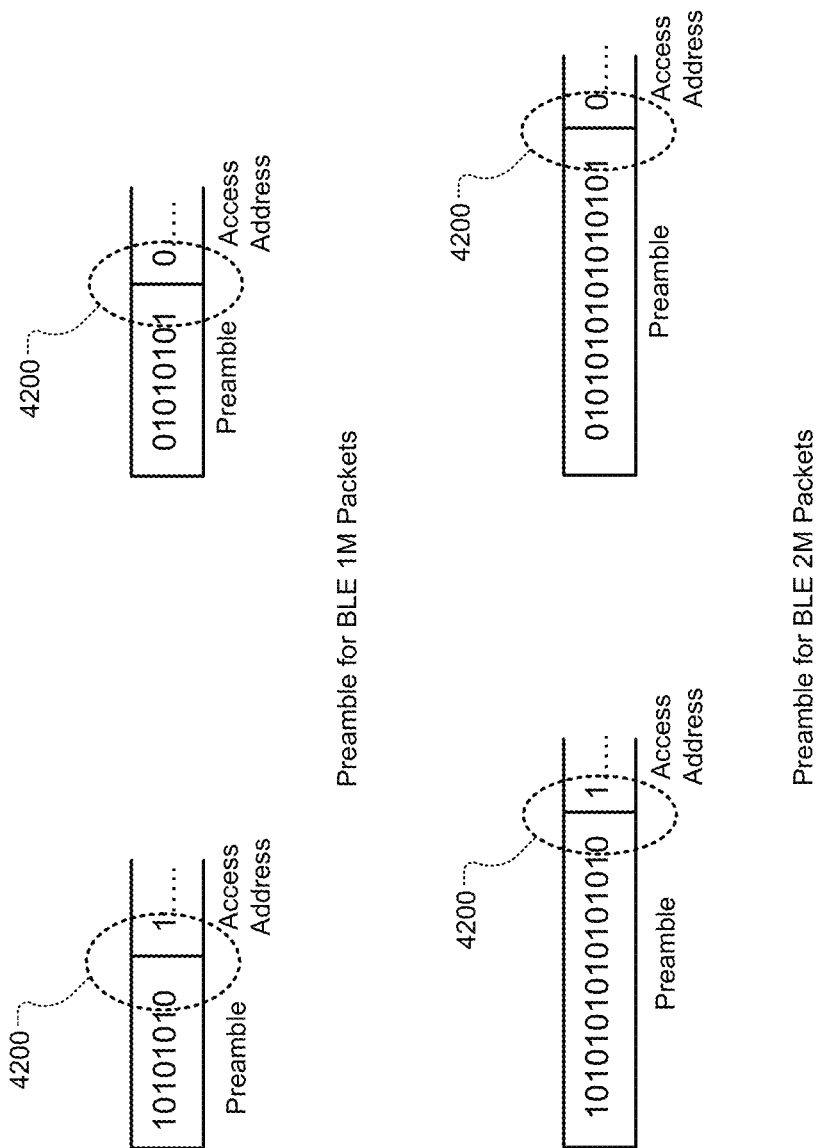
FIG. 41 shows example preambles and access addresses for BLE packets of different types.

The preambles of the packets are AA or 55 such that the last bit of the preamble is different than the first bit of the access address. The access addresses for the peripheral and central devices 4102, 4104 are the same. Sensors 4106 may be used to monitor packets. For each packet and each connection interval the access addresses are the same. The access address follows BLE access address rules. The packets within the same connection interval are within the same RF channel. FIG. 41 shows example preambles and access addresses for BLE 1M packets and BLE 2M packets. The preambles are A's and 5's (AA or 55 at 1 mbit/s, AAAA or 5555 at 2 mbit/s), such that the last bit of the preamble is different than the first bit of the access address. This is illustrated by the bits in the circles 4200.

Access addresses for advertising channel packets may be 10001110100010011011111011010110b (0x8E89BED6). Each link layer connection between any two devices and each periodic advertisement has a different access address. The access addresses may be 32-bit values. Each time a new access address is needed, the link layer may generate a new random value that meets the follow rules. The access address is not an address for an existing link layer connection on the corresponding network device. The access address: is not an address for enabled periodic advertising; does not have six consecutive zeros or ones; is not an advertising channels packet access address; is not a sequence that differs from an advertising channel packets access address by only one bit; and does not include four equal octets. The access address has no more than 24 transitions. The seed for the random number generator is from a physical source of entropy and has at least 20 bits of entropy. If the random number of the access address does not satisfy the above rules, new random numbers are generated until the rules are satisfied. For an implementation that also support BLE coded physical layer (PHY), the access address may also have at least three ones in the least significant 8 bits and have no more than eleven transitions in the least significant 16 bits. In normal BLE packets, the preamble gives away the first bit of the access address and then the access rules sometimes give away the next bit of the access address (e.g., no more than 6 consecutive 0's or 1's). This can cause ranging security issues because an attacker may predict the bits, which is mitigated or eliminated by the implementations disclosed herein.

Figure 42:
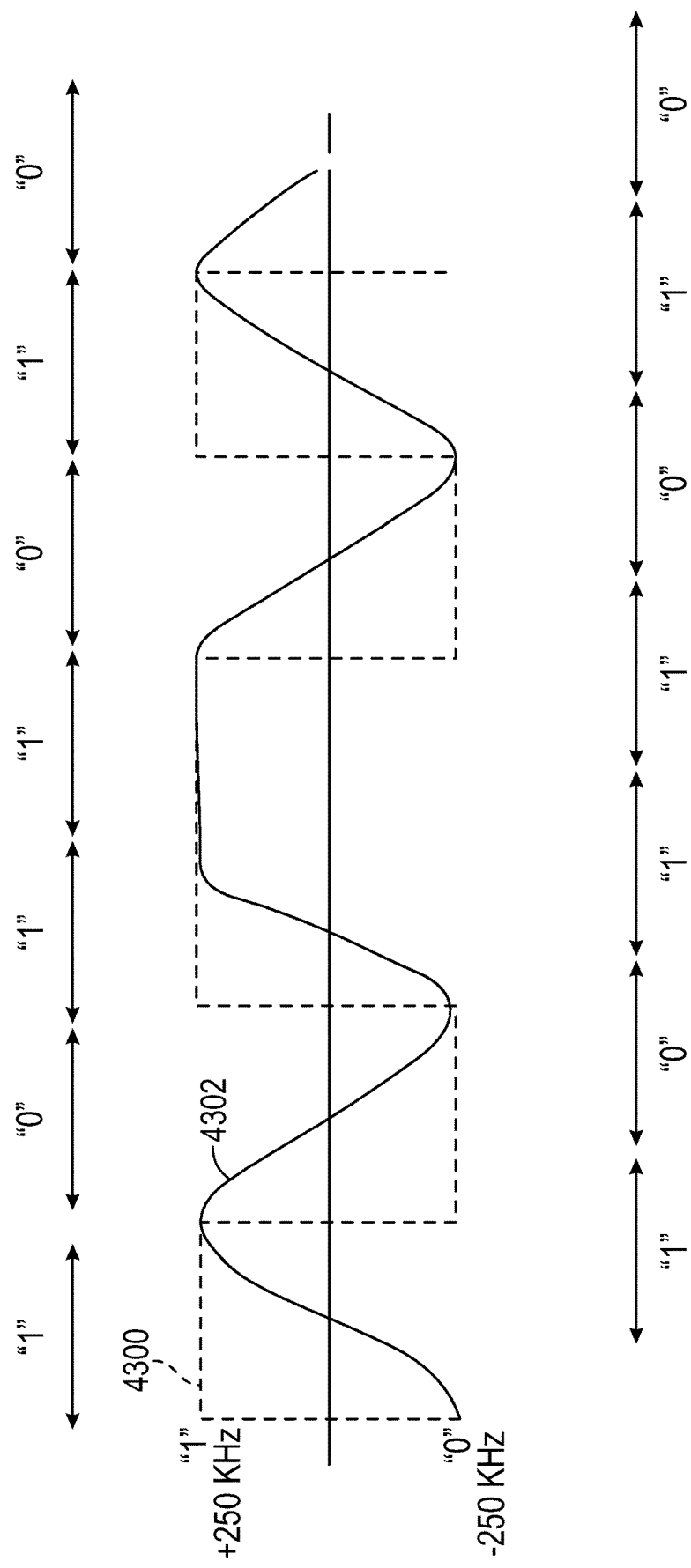
FIG. 42 is an example plot of BLE packet signals illustrating corresponding bits.

FIG. 42 shows an example plot of BLE packet signals illustrating corresponding bits. A first BLE signal 4300 represents a bit stream out of the protocol module 3924 of FIG. 38. Normal BLE packets do not return to a carrier (or midpoint level) when the bits remain at a same value. This is referred to as non-return to zero recording. The corresponding bits for the first plot are shown above the plot. A second BLE signal 4302 represents a bit stream out of the GFSK modulator (or Gaussian filter) 3926. The Gaussian filter adds ½ bit of time lag and gives away a bit of time during transitions. The corresponding bits for the second BLE curve are shown below the second BLE curve. As an example, the carrier frequency may be 2.402 GHz and the BLE packet signals may vary in frequency between 2.402250 GHz and 2.401750 GHz.

Figure 43:
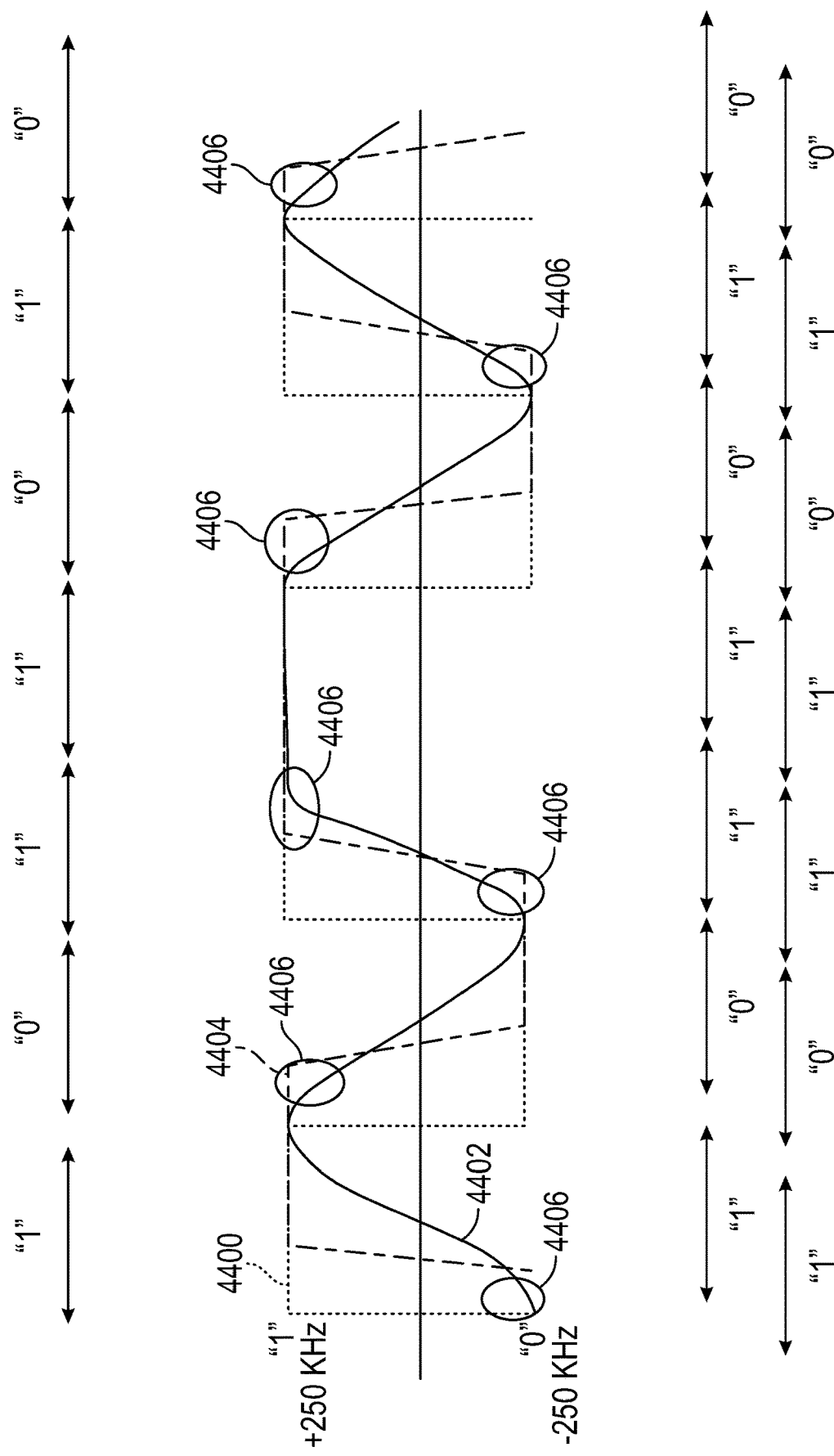
FIG. 43 is another example plot of other BLE packet signals illustrating corresponding bits.

FIG. 43 shows an example plot of BLE packet signals illustrating corresponding bits of a stronger BLE packet signal (e.g., BLE packet signal with larger RSSI) after leading edge sensing and transmission with faster edges. A first BLE signal 4400 represents a bit stream out of the protocol module 3924 of FIG. 38. A second BLE signal 4402 represents a bit stream out of the GFSK modulator (or Gaussian filter) 3926. A third BLE signal 4404 represents the stronger BLE packet signal after leading edge sensing of Gaussian bits and then transmitting with faster edges. The third BLE signal 4404 may be generated by an attacking device. As can be seen the edges are sloped and transition quicker that the transitions of the second BLE curve 4402. This causes the corresponding bits to be earlier than the bits of the second plot (or output of the GFSK modulator 3924). Areas where differences may be detected are designated by ovals 4406. The corresponding bits for the first BLE curve 4400 are shown above the first BLE curve 4400. The corresponding bits for the second BLE curve 4402 are shown below the second BLE curve 4402. The corresponding bits for the third BLE curve 4404 are shown below the bits for the second BLE curve 4402 and shifted to the left relative to the bits of the second BLE curve 4402.

Figure 44:
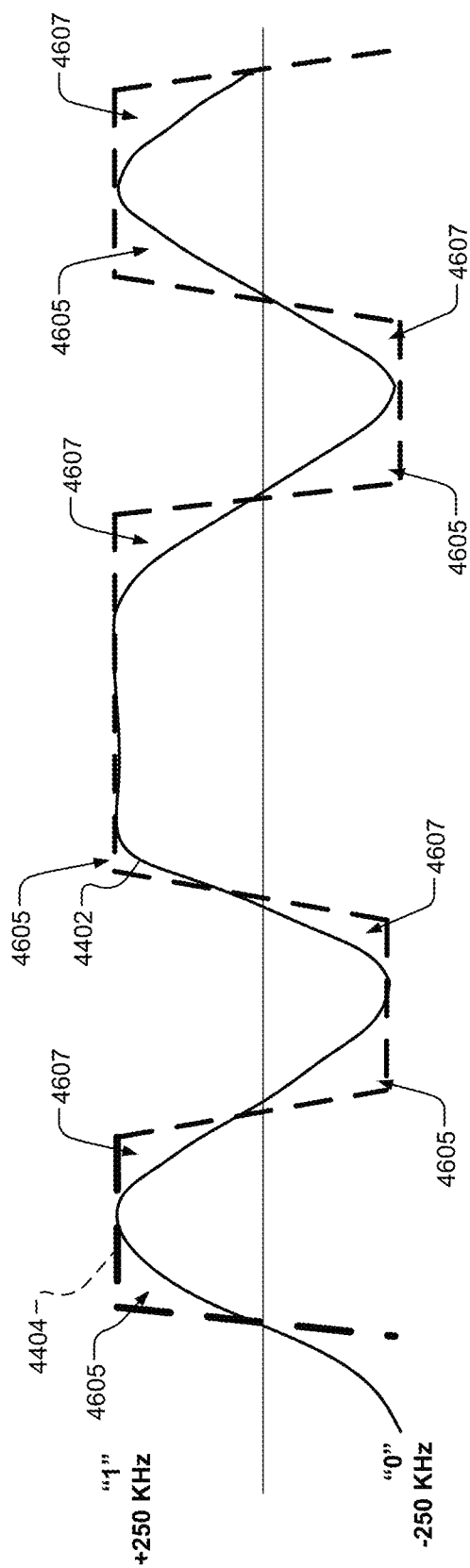
FIG. 44 is an overlapping plot of BLE packet signals of FIG. 44, where one of the BLE packet signals has been shifted relative to the other one of the BLE packet signals.
Figure 45:
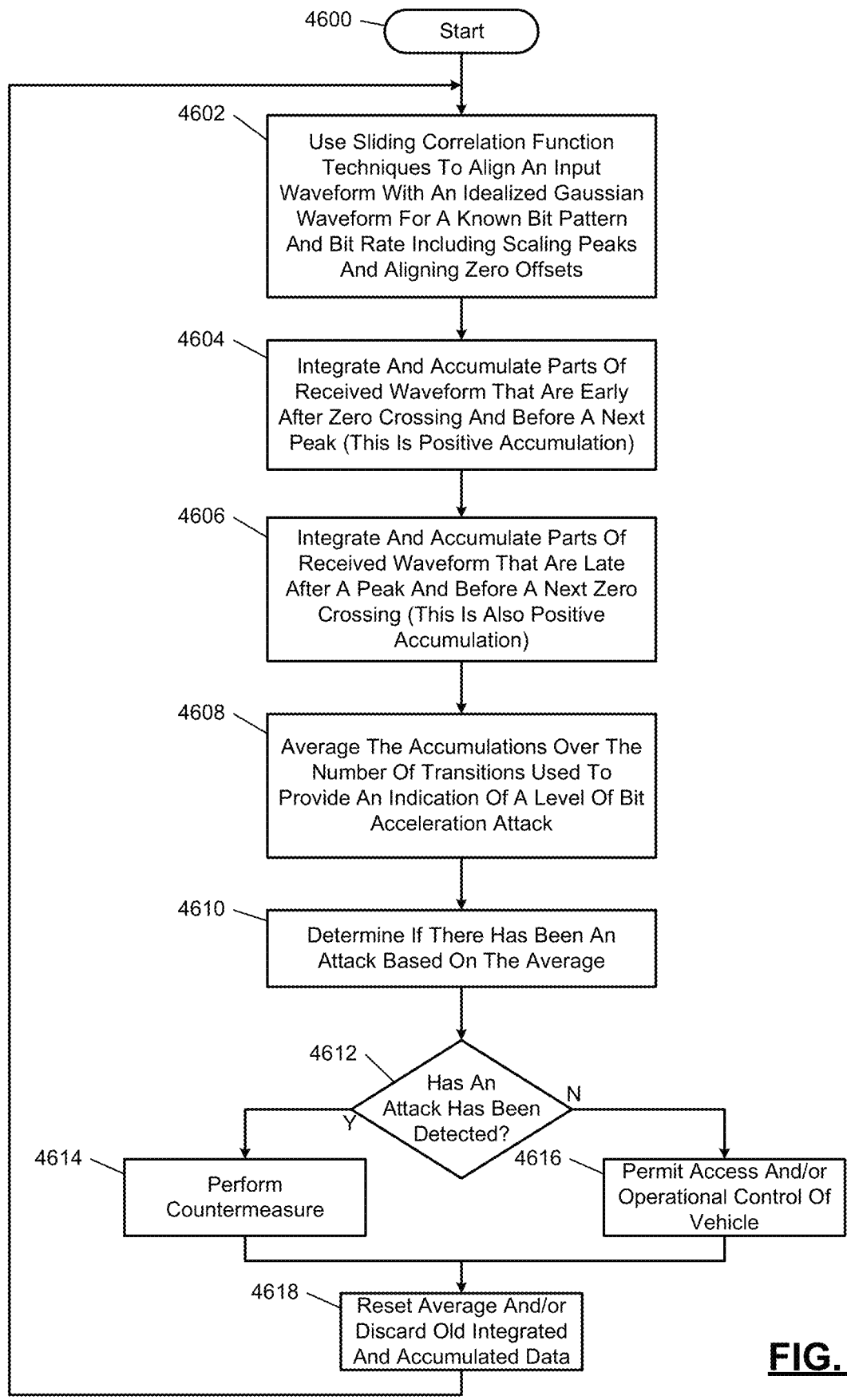
FIG. 45 illustrates an example method of detecting a range extension type relay attack in accordance with an embodiment of the present disclosure.

FIG. 44 shows the second and third BLE curves 4402, 4404 of FIG. 43, where the third BLE curve 4404 has been shifted relative to the second BLE curve 4402. The following operations may be performed to defend against a bit acceleration attack. A bit acceleration attack may refer to when an attacking device accelerates transmission of a BLE signal to account for delays associated with the attacking device receiving, processing and/or modifying and forwarding the BLE signal, such as a BLE signal transmitted from a key fob and/or other portable access device. FIG. 45 shows an example method of detecting a range extension type relay attack. Although the following operations of FIG. 45 are primarily described with respect to the implementations of FIGS. 2-6, 11 and 14, the operations may be easily modified to apply to other implementations of the present disclosure. The operations may be iteratively performed. The following operations may be performed by, for example one or more of the modules 210, 211, 212.

The method may begin at 4600. At 4602, a sliding correlation function is used to align a received input waveform with an idealized Gaussian waveform (or other suitable predetermined waveform) for a known bit pattern and bit rate including scaling peaks and aligning zero offsets of the received input waveform and the predetermined waveform. This may be done by the correlation and protocol module 3920 of FIG. 38. This may be done to identify, for example, a synchronization access word. An example of this is shown in FIG. 44.

At 4604, parts (or portions) 4605 of the received waveform that occur early in time, after a zero crossing, and before a next peak of the predetermined waveform are integrated and accumulated (or summed). This is referred to positive accumulation.

At 4606, parts (or portions) 4607 of the received waveform that occur late in time, after a peak, and before a next zero crossing are integrated and accumulated. This is also referred to as positive accumulation.

At 4608, the resultant accumulation values determined at 4604 and 4606 are averaged over the number of transitions used to provide an indication of a level of bit acceleration attack. The accumulated values may be separately averaged to provide two average values or may be summed and then averaged to provide a single average value.

At 4610, based on the one or more averages and one or more predetermined thresholds, it is determined whether an attack has occurred and/or has likely occurred. At 4612, if an attack has occurred and/or has likely occurred, operation 4614 is performed, otherwise operation 4616 is performed. At 4614, a countermeasure is performed, such as one of the previously mentioned countermeasures including preventing access and/or operation of the corresponding vehicle. One or more alerts may also be generated. As another example countermeasure, data associated with the attack may be stored in memory and/or transmitted to a network device of an owner of the vehicle and/or a central monitoring station. At 4616, access and/or operational control of the vehicle are permitted if an attack has not occurred and/or has likely not occurred. Operational control may include, for example, unlocking or locking doors of the vehicle, remote starting of an engine of the vehicle, interior climate control adjustment of the vehicle, etc. At 4618, the one or more averages may be discarded and/or old integrated and accumulated data may be discarded. If a sliding window is being used to monitor received signals, old portions of the data may be discarded while more recent portions may be maintained for subsequent integration, accumulation and averaging purposes with newly received data.

Figure 46:
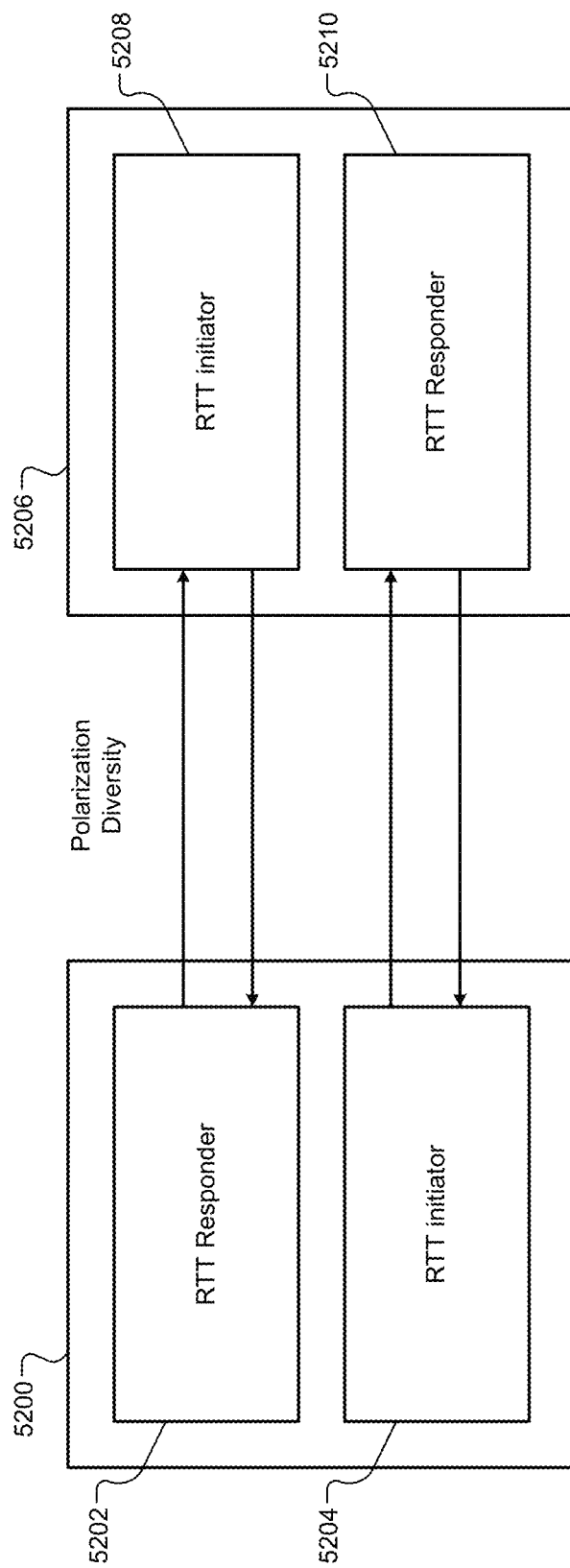
FIG. 46 is a functional block diagram of an example of a vehicle and a portable access device including respective round trip time initiators and round trip time responders in accordance with an embodiment of the present disclosure.

FIG. 46 shows a vehicle 5200, including a round trip time (RTT) responder 5202 and a RTT initiator 5204, and a portable access device 5206 including a RTT initiator 5208 and a RTT responder 5210. As used herein an "initiator" may refer to a network device including a BLE radio, transmitter and/or receiver and initiates a signal or tone exchange. As used herein a "responder" may refer to a network device including a BLE radio, transmitter, and/or receiver and responds to a signal and/or tone received from an initiator. The RTT responders 5202, 5210 and RTT initiators 5204, 5208 may be implemented, for example, by the RF antenna modules 40, RF circuits 223 and/or modules 210, 211, 212 of FIG. 3 and include corresponding transmission and reception circuitry. The vehicle 5200 may include antenna modules with single and circular polarized antennas as described above. The RTT responder 5202 and RTT initiator 5204 may transmit and receive using the antennas. The antennas provide polarization diversity with antennas (e.g., single polarized antennas) used by the RTT initiator 5208 and RTT responder 5210 such that at any moment in time at least one of the stated antennas of the vehicle 5200 has at least one polarization axis that is not cross-polarized and not co-polarized with a polarization axis of at least one of the antennas of the portable access device 5206.

The devices 5202, 5204, 5208, 5210 may each include a control module as described above to perform any of the described operations. The devices 5202, 5204, 5208, 5210 may transmit and receive RF signals on random channels (e.g., 40 BLE channels over 80 MHz of spectrum). The devices 5202, 5208 may communicate with each other including transmitting and receiving signals while the devices 5204, 5210 communicate with each other including transmitting and receiving signals. The communication between the devices 5202, 5208 may simultaneous with the communication between the devices 5204, 5210. Transmission of signals for determining RTTs may be transmitted simultaneously and in a bi-directional manner for security reasons and to detect an attack. The devices 5202, 5204 may share with the portable access device 5206 the frequencies at which to communicate. The frequencies may be indicated in a predetermined order and followed by the devices 5202, 5204, 5208, 5210. If a bandpass filter is used to monitor two channels simultaneously, the filter introduces propagation delay.

A typical band pass filter delay is 0.5 per bandwidth (or 0.5/bandwidth). The channel spacing of a protocol, randomness in channel selection, randomness in transmit direction over time, and simultaneous transmissions, force band pass filters to detect the bits that have group delays, which are large compared to the measurable round trip time delay. This further increases difficulty in an attacking device performing a range extension type relay attack. The vehicle 5200 and the portable access device 5206 may respectively set transmit power levels and transmit channel spacings such that it is impractical, for example for an attacking device, to have a filter wide enough to receive the signals with a short enough delay to relay, but is narrow enough to analyze the signals.

In an embodiment, signals are transmitted to measure direct time-of-flight times and determine if there is a predetermined amount of delay (e.g., 10-500 nano-seconds (ns)), which is often associated with a range extender type attacking device. A range extender type attacking device, when relaying signals between the vehicle 5200 and the portable access device 5206 can delay transmitted signals by the predetermined amount. The stated bi-directional and simultaneous transmitting and receiving makes it difficult for an attacking device to determining the frequency, channel and direction of signals being transmitted at any moment in time. It is also difficult for the attacking device to avoid relaying signals without the predetermined amount of delay.

Figure 47:
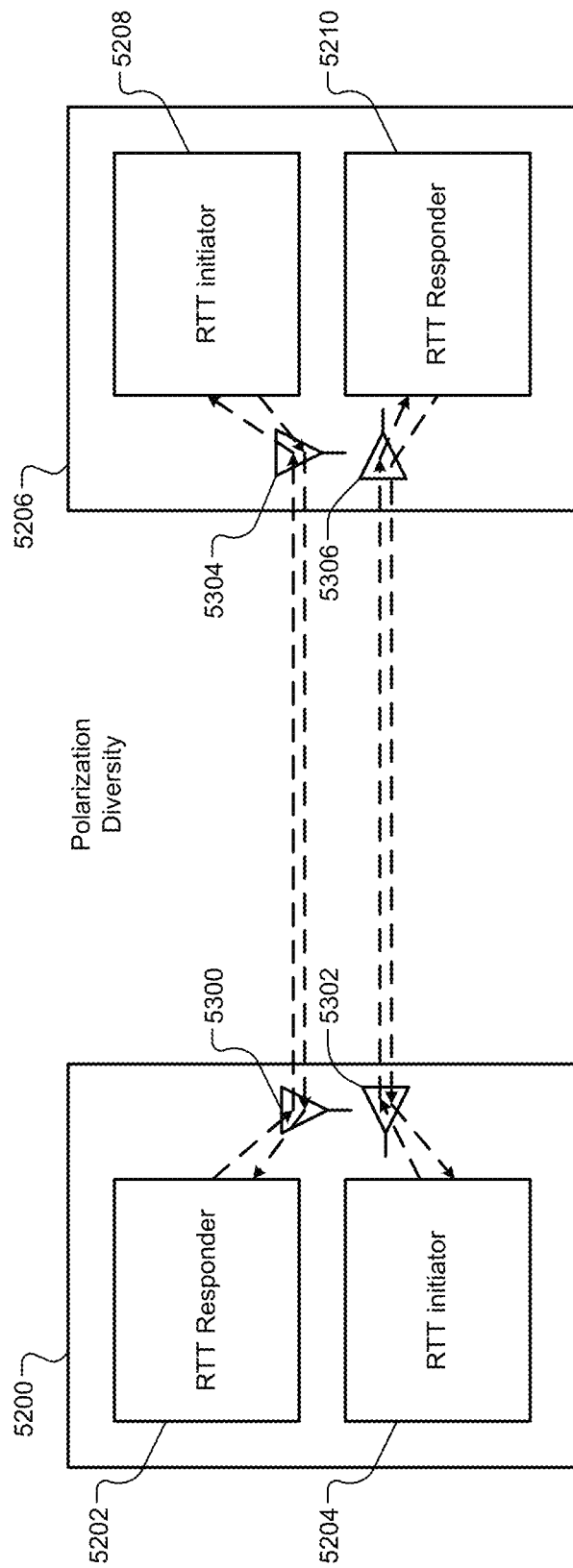
FIG. 47 is a functional block diagram of the vehicle and portable access device of FIG. 46 illustrating radio frequency signal transmission through corresponding antennas.

FIG. 47 shows the vehicle 5200, including the RTT responder 5202 and the RTT initiator 5204, and the portable access device 5206 including the RTT initiator 5208 and the RTT responder 5210. FIG. 47 shows signal paths through corresponding antennas 5300, 5302, 5304, 5306. In an embodiment, the antennas 5300, 5302 have a total of three polarizations and the antennas 5304, 5306 have a total of two polarizations. In another embodiment, the antennas 5300, 5302 have a total of two polarizations and the antennas 5304, 5306 have a total of three polarizations.

Figure 48:
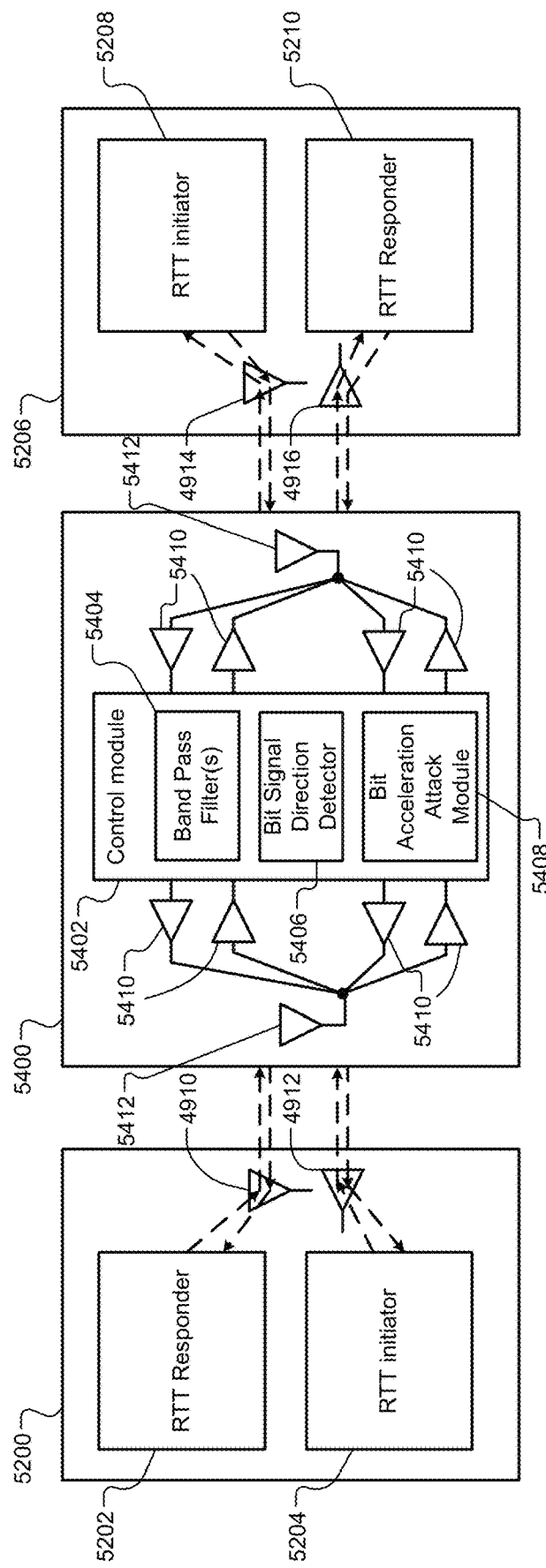
FIG. 48 is a functional block diagram of the vehicle and portable access device of FIG. 46 experiencing an attack by a range extension type relay attacking device.

FIG. 48 shows the vehicle 5200, including the RTT responder 5202 and the RTT initiator 5204, the portable access device 5206 including the RTT initiator 5208 and the RTT responder 5210, and a range extension type relay attacking device 5400. The range extension attacking device

5400 includes a control module 5402 that includes a band pass filter 5404, a bit signal direction detector 5406 and a bit acceleration attack module 5408. The band pass filter 5404 is used to detect incoming bits, but have associated lag time. The bit signal direction detector 5406 determines a direction that the bits are traveling (e.g., from a vehicle to a portable access device or from the portable access device to the vehicle). The bit acceleration attack module 5408 is unable to accelerate the bits without introducing lag time in parts of symbols (or bits) that can be detected using a sliding correlation function aligned with an ideal waveform and averaging symbol (or bit) shapes over multiple symbols (or bits). The stated lag time may be detected by an access module of a vehicle when determining whether an attack is occurring.

As shown the range extension attacking device 5400 includes amplifiers 5410, such as low noise amplifiers (LNA) and power amplifiers, for reception and transmission purposes. The range extension attacking device 5400 may also include mixers for downconversion and upconversion purposes. The amplifiers 5410 are connected to antennas 5412.

In addition to simultaneously performing the stated communication, channels may be pseudo randomly selected and access addresses may also be pseudo randomly selected. This random selection may occur at the vehicle and may be shared ahead of time with the portable access device. Conversely, the selection may occur at the portable access device. Conversely, the selection may occur through secure cryptographic techniques with key material from either or both the devices contributing to the pseudo random selected channel sequence and/or access address sequence. In this case the pseudo random sequences of access address serves as the cryptographically secure sequence of bits that are exchanged for round trip timing measurements. With simultaneous transmit and receive operations being performed on random channels with randomly selected access addresses, where responses are on a same channel as an initiator and the response access address is not the same as the initiator access address, range extension attacking devices have difficulty performing an attack without being detected by access module of the vehicle and/or control modules of one or more portable access devices. The range extension attacking devices must: listen to all of the channels in both directions simultaneously; determine which direction the messages are traveling through the range extension attacking device; and detect the bits early and send the bits at the right amount of time early in both directions to convince the initiators of the vehicle and the one or more portable access devices. The range extension attacking devices must convince the initiators of the vehicle and the one or more portable access devices that the portable access devices are closer than the portable access devices actually are and at the correct distances from the vehicle to permit access and/or operational control of the vehicle. Also, with a Gaussian filter on BLE bits, the attacking device has a small window of less than about 10-100 ns of early bit detection time available to detect the bits and transmit the bit early.

In an embodiment, the RF signals associated with the above described simultaneous communication are monitored by the modules 210, 211, 212 of FIG. 3 and the stated initiators and responders monitor and/or determine RSSI values and antenna polarization statuses (e.g. degrees of polarization between transmitting and receiving antennas) of the signals. One or more of the modules 210, 211, 212, based on the RSSI values and the polarizations, determine the path, frequency, channel, and antenna pairs that are best for communication. The signals associated with the shortest path (or least interference), the best RSSI values, the most polarization, etc. are used to indicate which path, frequency, channel, and antenna pair to use. This information may also be used to determine, for any moment in time, which device transmits and which device receives. Selection of transceiver chips and channels at each device may be randomized. In an embodiment, one device (at vehicle or portable access device) may transmit while the other one of the devices is not transmitting, but rather is receiving. This role may then be switched, such that the first device is receiving while the second device is transmitting and is not receiving.

Although many of the above and below described techniques include monitoring, generating, receiving, transmitting, and/or measuring various parameters at a vehicle access module and based on this information detecting a range extension type relay attack, the techniques may be modified such that some or all of these operations are performed at a control module (or other module) of a portable access device, such as any of the portable accesses device disclosed herein. Similarly, various operations are described as being performed at a portable access device; these operations may be performed at an access module of a vehicle.

Examples of different BLE RF transmit frequencies are 2.410 giga-hertz (GHz), 2.412 GHz, 2.408 GHz, and 2.414 GHz. These and other frequencies may be used by the RTT initiators and responders and/or corresponding transmitters and receivers.

In an embodiment, other transmitters of a vehicle and/or portable access device are used to lightly load one or more channels to force an attacking device to have a narrow low pass filter to detect the RF signals transmitted by the initiators and responders. The one or more channels may include or be nearby channels used by the initiators and responders. The signals transmitted on the one or more channels may be dummy signals.

Figure 49:
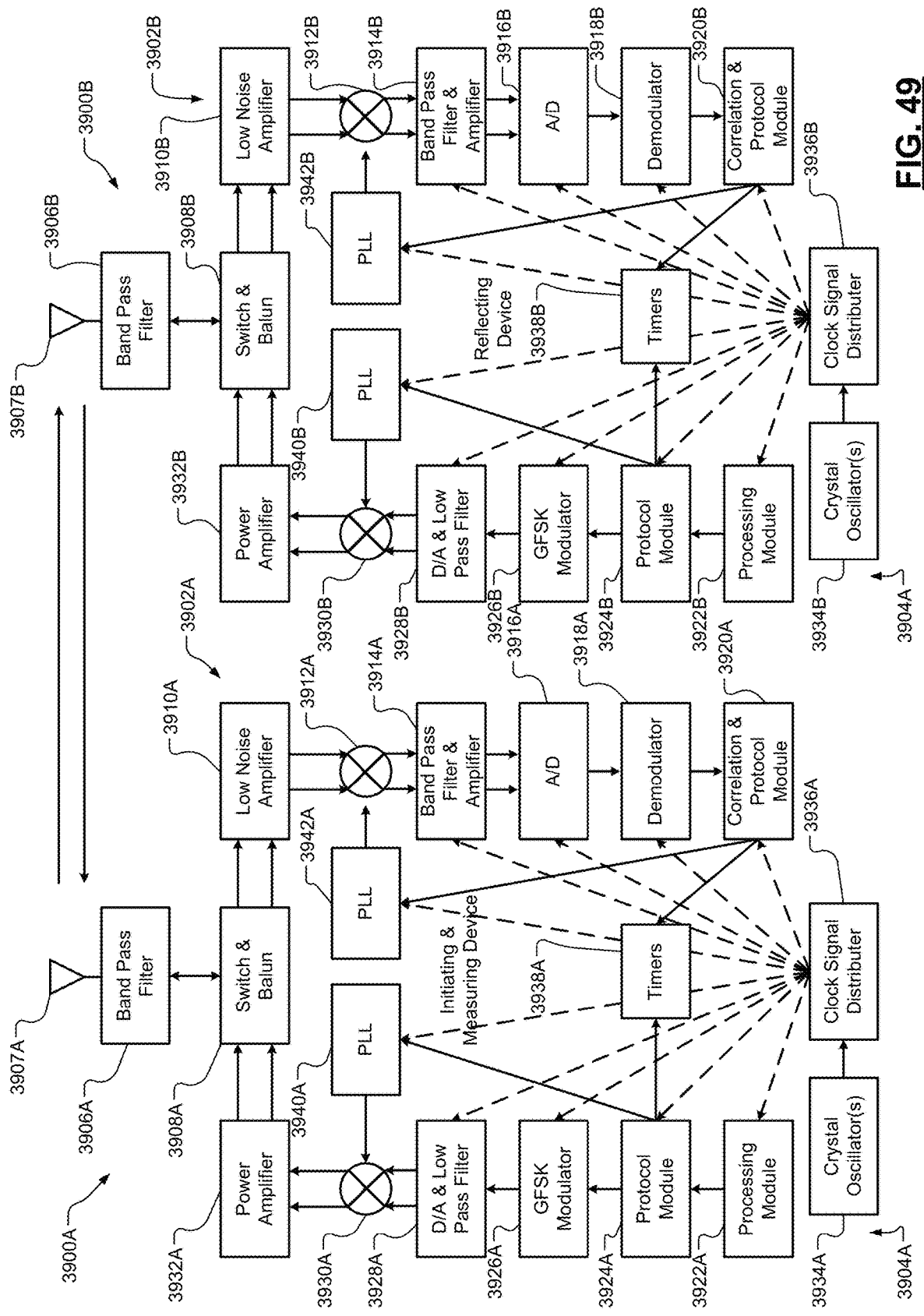
FIG. 49 is a functional block diagram of two example BLE radios in accordance with an embodiment of the present disclosure.

FIG. 49 shows two of the BLE radio 3900 (designated 3900A and 3900B). The first BLE radio 3900A is performing as an initiating and measuring device. The second BLE radio 3900B is performing as a reflection (or responding) device. The initiating and measuring device 3900A may measure a RTT for a packet to be transmitted from the first BLE radio 3900A to the second BLE radio 3900B, time for the second BLE radio to respond, and time for the packet to be transmitted from the second BLE radio 3900B to the first BLE radio 3900A. In another embodiment, the RTT includes the time to transmit the packet from the processing module 3922A of the first BLE radio 3900A to the correlation and protocol module 3920B of the second BLE radio and back from the processing module 3922B or the protocol module 3924B to the demodulator 3918a or the correlation and protocol module 3920A. This may include measuring travel time: from processing module 3922A; through protocol module 3924A, GFSK modulator 3926A, D/A and low pass filter 3928A, upconverter 3920A, power amplifier 3932A, switch and balun 3908A, and band pass filter 3906A; to the BLE radio 3900B; through band pass filter 3906B, switch and balun 3908B, low noise amplifier 3910B, downconverter 3912B, band pass filter and amplifier 3914B, A/D 3916B, and demodulator 3918B, to correlation and protocol module 3920B. The time to travel from the demodulator 3918B or the correlation and protocol module 3920B to the protocol module 3924B or the processing module 3922B may also be determined. The time from the protocol module 3924B or the processing module 3922B, through the GFSK modulator 3926B, the D/A and low pass filter 3928B, the upconverter 3930B, the power amplifier 3932B, the switch and balun 3908B, the band pass filters 3906B and 3906A, the switch and balun 3908A, the low noise amplifier 3910A, the downconverter 3912A, the band pass filter and amplifier 3914A, the A/D 3916A, and the demodulator 3918A or the correlation and protocol module 3920A may also be determined. Although BLE radio 3900A is described as the initiator and BLE radio 3900B is described as the responder, operation roles may be switched, such that the BLE radio 3900B is the initiator and BLE radio 3900A is the responder.

The following operations may be performed to precisely determine a RTT between two BLE radios (e.g., the BLE radios 3900A, 3900B of FIG. 49) of a vehicle and/or between a BLE radio of a vehicle a BLE radio of a portable access device. The operations are performed to prevent an attack and/or to easily detect when an attack is being performed and/or has occurred. The following operations may be performed separately or in any combination. In an embodiment, a large predetermined number of packets are exchanged back and forth between the BLE radios. The initiator may measure and/or have estimates of a RTT for a signal transmitted between the BLE radios. This may include time T1 of when the packet is transmitted from the first BLE radio to the second BLE radio, time $T_2$ for the second BLE radio to respond, time $T_3$ of when the second BLE radio transmits the packet back to the first BLE radio, and time T4 of when the first BLE radio receives the packet from the second BLE radio.

In an embodiment, A/D and D/A clocks of the BLE radios and/or phase lock loops are dithered between packets. In addition to dithering the clocks where possible, a cryptographically random variation may be added, which is known to the BLE radios for when least significant bits (LSBs) generated by a digital timer are transmitted. The cryptographically random variation is used such that an attacking device is unable to predict a precise moment when a transmission will occur.

In an embodiment, each of the packets include a large pre-agreed to cryptographically random multiple bit identifier (PACRMBI) of, for example, 16 to 256 bits. In another embodiment, the packet bit contents from the initiator and the responder are indistinguishable to an attacking device. The attacking device is unable to identify which direction a packet is coming from or if the packet is an initiator or responder packet based upon the bit contents of the packet.

In an embodiment, channels of the BLE radios are cryptographically randomized. In an embodiment, a determination of which one of the BLE radios is the initiator or the responder is cryptographically randomized. In an embodiment, either or both of the BLE radios transmit dummy packets that are indistinguishable to the attacking device from other packets transmitted by the BLE radios. Selection of which if the BLE radios transmits the dummy packets is cryptographically randomized and may be randomly switched. This makes it difficult for the attacking device to determine which are valid packets and in which direction the packets are being transmitted between the BLE radios.

In an embodiment, polarization of the antenna sets being used by the BLE radios is initially cryptographically randomized. A heuristic to select which antenna permutations between the BLE radios provide the best "antenna-channel" across the set of channels is used. This may include: using a heuristic that selects higher receive signal strength; compensating for antenna gain over frequency, monitors over multiple channels; using an antenna combination with a highest average or median power; and/or using a Rayleigh faded estimator or a Kalman filter estimator. This may reduce the cryptographically random antenna patterns and concentrate on the "antenna-channels" that have the most power and least cross-polarization.

In an embodiment, the in-phase and quadrature-phase (IQ) stream at the receiver is up-sampled (or interpolated) prior to sending the IQ stream with an idealized up-sampled IQ stream that matches a PACRMBI into the correlation and protocol module of the corresponding one of the BLE radios. As an alternative to use of PACKRMBI's, the transmitted messages may be encrypted, and when received, bit decoded and then converted into an idealized up-sampled IQ stream. The two up-sampled streams may be sent through the correlation and protocol module 3920, which may monitor for an up-sampled clock edge, where there is enough correlation to match PACRMBI's. The correlation and protocol module 3920 selects a maximum edge of the clock edges that are a match. Other clock recovery methods may be use to interpolate sub-bit timing in round trip timing of bit streams in communication channels. This may be performed in combination with the up-sampling correlation or in combination with normal clock sampling.

In an embodiment, amplifier settings are communicated between the BLE radios. The amplifier settings are sufficient to compensate for any frequency and amplifier gain variations in the propagation delay between the BLE radios.

In another embodiment, measured die temperatures within the BLE radios are communicated (or shared) between the BLE radios to compensate for any temperature based frequency and amplifier gain variations in the propagation delay between the BLE radios.

Another operation that may be performed is to communicate balun variations between the BLE radios. Another operation is to add a short (e.g., 6 us) but cryptographically random length (e.g., 4 to 8 us) continuous wave tone to packet pairs to do simultaneous tone exchange ranging while doing round trip timing measurements.

Figure 50:
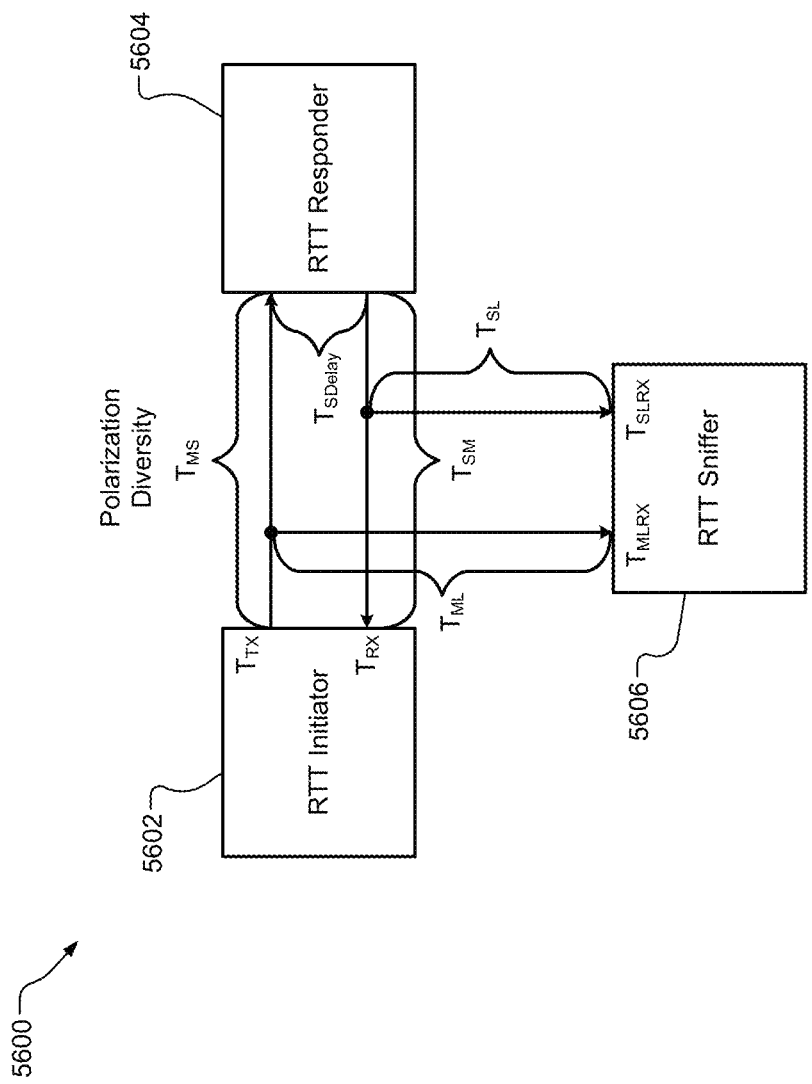
FIG. 50 is a functional block diagram of an example location and distance determination system including a round trip time sniffer in accordance with an embodiment of the present disclosure.

FIG. 50 shows a location and distance determination system 5600 including a RTT initiator 5602, a RTT responder 5604, and a RTT sniffer 5606. The RTT initiator 5602 and the RTT responder 5604 may perform as any of the initiators, responders, BLE radios, RF circuits disclosed herein. The RTT sniffer 5606 may be located along with one of the RTT devices 5602, 5604 at a vehicle and include one of the antenna modules 40 of FIG. 2 while the RTT device in the vehicle includes the other one of the antenna modules 40. The devices 5602, 5604, 5606 may each include a control module as described above to perform any of the described operations. Polarization diversity as described above is provided: between the antennas of the RTT devices 5602, 5604; and between the antennas of one of the RTT devices 5602, 5604 that is in the vehicle and the RTT sniffer 5606. Polarization diversity is especially utilized when performing round trip timing measurements. Each of the RTT devices 5602, 5604 may include single and circular polarized antennas.

The one of the RTT devices 5602, 5604 that is in the vehicle may be referred to as the master device, whereas the other one of the RTT devices 5602, 5604 is referred to as the slave device. When the master device transmits a challenge signal to the slave device, the RTT sniffer 5606 performs as a listener and detects (i) when the challenge signal is transmitted to and/or received at the RTT sniffer 5606, and (ii) when the slave device transmits a response signal to the challenge signal, and/or (iii) when the RTT sniffer 5606 receives the response signal. The RTT sniffer 5606 may then use triangulation based on the transmit and/or receive times of the challenge signal and the transmit and/or receive times of the response signal to determine a location of the slave device. The master device may also measure the round trip timing associated with the challenge signal and the response signal in order to measure direct paths between antennas instead of a bounce path. This prevents nulls of antennas from being aligned and cross-polarization.

The master device and the RTT sniffer 5606 cooperate to estimate the distance to the slave device. The following equations 5-7 may be implemented by the master device to determine the amount of time $T_{MS}$ for the challenge signal to be transmitted from the master device to the slave device, where: $T_{SM}$ is the amount of time for the response signal to be transmitted from the slave device to the master device; $T_{RX}$ is the time when the response signal is received at the master device; $T_{TX}$ is the time when the challenge signal is transmitted from the master device; $T_{SDELAY}$ is the amount of delay time for the slave device to respond with the response signal after receiving the challenge signal; and FixedOffset$_1$ is a first amount of offset time, which may be greater than or equal to 0.

$$T_{MS} + T_{SM} = T_{RX} - T_{TX} - T_{SDELAY} + FixedOffset_1 \quad (5)$$

$$T_{MS} = T_{SM} \quad (6)$$

$$T_{MS} = \frac{T_{RX} - T_{TX} - T_{SDELAY} + FixedOffset_1}{2} \quad (7)$$

The RTT sniffer 5606 knows: when the challenge signal is received at the RTT sniffer 5606; when the response signal is received at the RTT sniffer 5606; and a number of slave clock cycles between when the slave device received the challenge signal and when the slave device transmitted the response signal. The RTT sniffer 5606 (or listener) may determine a difference between the time $T_{SLRX}$ that the RTT sniffer 5606 receives the response signal and time $T_{MLRX}$ when the RTT sniffer 5606 receives the challenge signal using equation 8, where: Tse is the amount of time for the RTT sniffer 5606 to receive the response signal; FixedOffset$_2$ is a second amount of offset time, which may be greater than or equal to 0; $T_{ML}$ is the amount of time for the RTT sniffer 5606 to receive the challenge signal; $T_{SLRX}$ is the time the RTT sniffer 5606 receives the response signal; and $T_{MLRX}$ is the time the RTT sniffer 5606 receives the challenge signal.

$$T_{MS} + T_{SDELAY} + T_{SL} + \text{FixedOffset}_2 - T_{ML} = T_{SLRX} - T_{MLRX} \quad (8)$$

Since the master device and the RTT sniffer 5606 are cooperating, information is shared such that one or more of these devices may estimate the distance to the slave device based on equations 9-11. The sum of $T_{MS}$ and $T_{SL}$ may be substituted for to provide equations 9-11.

$$\frac{T_{RX} - T_{TX} - T_{SDELAY} + FixedOffset_1}{2} + \quad (9)$$
$$T_{SDELAY} + T_{SL} + FixedOffset_2 - T_{ML} = T_{SLRX} - T_{MLRX}$$

$$\frac{T_{RX} - T_{TX} + T_{SDELAY} + FixedOffset_1}{2} + T_{SL} + FixedOffset_2 - T_{ML} = \quad (10)$$
$$T_{SLRX} - T_{MLRX}$$

$$T_{SL} = T_{SLRX} - T_{MLRX} - \quad (11)$$
$$\frac{T_{RX} - T_{TX} + T_{SDELAY} + FixedOffset_1}{2} - T_{SL} - FixedOffset_2 - T_{ML}$$

By measuring the arrival times of the challenge and response signals at the RTT sniffer 5606 and sharing this information between the RTT sniffer 5606 and the master device, the distance between the vehicle and the slave device can be estimated. The distance may be estimated by, for example, the master device using the arrival times and the known time $T_{MS}$ and corresponding known signal transmission rates. The RTT of the challenge signal may be determined based on the measured arrival times. The distance may then be determined based on the RTT and the known signal transmission rates.

Figure 51:
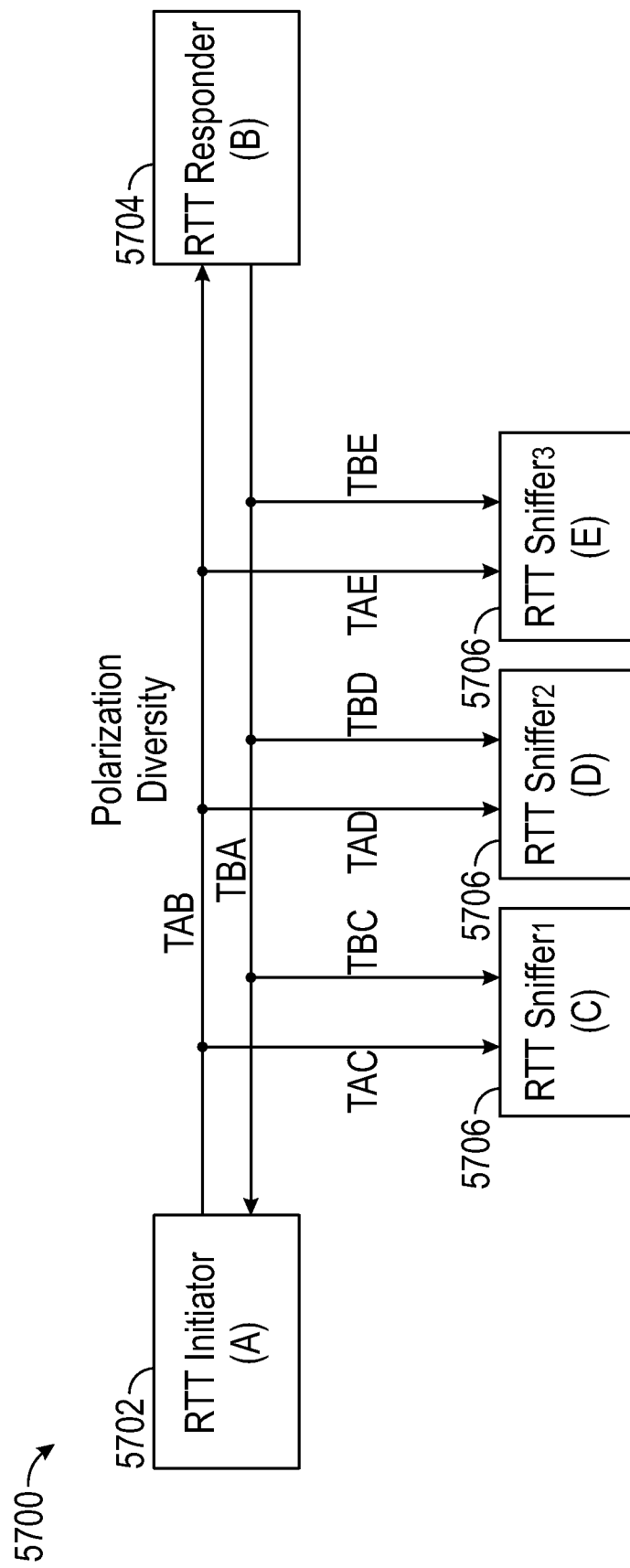
FIG. 51 is a functional block diagram of an example location and distance determination system including multiple round trip time sniffers in accordance with an embodiment of the present disclosure.

FIG. 51 shows another location and distance determination system 5700 including a RTT initiator 5702, a RTT responder 5704, and multiple RTT sniffers 5706. The RTT initiator 5702 and the RTT responder 5704 may perform as any of the initiators, responders, BLE radios, RF circuits disclosed herein. The RTT sniffers 5706 may be located along with one of the RTT devices 5702, 5704 at a vehicle and include an antenna module (similar to the antenna modules 40 of FIG. 2). The devices 5702, 5704, 5706 may each include a control module as described above to perform any of the described operations. The RTT device in the vehicle may also include an antenna module similar to the antenna modules 40 of FIG. 2. Polarization diversity is provided: between the antennas of the RTT devices 5702, 5704; and between the antennas of one of the RTT devices 5702, 5704 that is in the vehicle and the RTT sniffers 5706. Polarization diversity is especially utilized when performing round trip timing measurements in order to measure direct paths between antennas instead of a bounce path. This prevents nulls of antennas from being aligned and cross-polarization.

The one of the RTT devices 5702, 5704 that is in the vehicle may be referred to as the master device, whereas the other one of the RTT devices 5702, 5704 is referred to as the slave device. When the master device transmits a challenge signal to the slave device, the RTT sniffers 5706 perform as listeners and detect when the challenge signal is transmitted and detect when the slave device transmits a response signal to the challenge signal. The RTT devices 5702, 5704 may operate similarly as the RTT devices 5602, 5604 of FIG. 50. Each of the RTT sniffers 5706 may operate similarly as the RTT sniffers 5606.

Time TAB is the amount of time for the challenge signal to be transmitted from the RTT initiator 5702 to the RTT responder 5704. Time TBA is the amount of time for the corresponding response signal to be transmitted from the RTT responder to the RTT initiator. Time TAC is the amount of time for the first RTT sniffer to receive the challenge signal. Time TBC is the amount of time for the first RTT sniffer to receive the response signal. Time TAD is the amount of time for the second RTT sniffer to receive the challenge signal. Time TBD is the amount of time for the second RTT sniffer to receive the response signal. Time TAE is the amount of time for the third RTT sniffer to receive the challenge signal. Time TBE is the amount of time for the third RTT sniffer to receive the response signal. When TAB and TAC are known, TBC can be calculated. When TAB and TAD are known, TBD can be calculated. When TAB and TAE are known, TBE can be calculated.

If there is enough RTT sniffers, time TAB may be calculated. For example if three RTT initiators know the locations of the RTT initiators relative to the master device (or initiator), then the time TAB may be calculated. This may be accomplished using equations 12-17 with the assumption that all reflections are instantaneous, where: TRxAC is the time when the first RTT sniffer receives the challenge signal;

TRxBC is the time when the first RTT sniffer receives the response signal; TRxAD is the time when the second RTT sniffer receives the challenge signal; TRxBD is the time when the second RTT sniffer receives the response signal; TRxAE is the time when the third RTT sniffer receives the challenge signal; TRxBE is the time when the third RTT sniffer receives the response signal; deltaRxAtC is the difference in time between when the first RTT sniffer receives the response signal and when the first RTT sniffer receives the challenge signal; deltaRxAtD is the difference in time between when the second RTT sniffer receives the response signal and when the second RTT sniffer receives the challenge signal; deltaRxAtE is the difference in time between when the third RTT sniffer receives the response signal and when the third RTT sniffer receives the challenge signal. The location of the slave device (or responder) may also be determined using equations 18-25, where: xa is the x coordinate of the master device; ya is the y coordinate of the master device; za is the z coordinate of the master device; xb is the x coordinate of the slave device; yb is the y coordinate of the slave device; zb is the z coordinate of the slave device; xc is the x coordinate of the first RTT sniffer; yc is the y coordinate of the first RTT sniffer; zc is the z coordinate of the first RTT sniffer; xd is the x coordinate of the second RTT sniffer; yd is the y coordinate of the second RTT sniffer; zd is the z coordinate of the second RTT sniffer; xe is the x coordinate of the third RTT sniffer; ye is the y coordinate of the third RTT sniffer; ze is the z coordinate of the third RTT sniffer. The x, y, z coordinates of the master device and the slave device are known and the x, y, z coordinates of the slave device are determined. TBC, TBD, and TBE may be determined in a similar manner, as described above.

$$TAB+TBC-TAC=TRxBC-TRxAC=\text{delta}RxAtC \quad (12)$$

$$TAB+TBD-TAD=TRxBD-TRxAD=\text{delta}RxAtD \quad (13)$$

$$TAB+TBE-TAE=TRxBE-TRxAE=\text{delta}RxAtE \quad (14)$$

$$TBC=\text{delta}RxAtC+TAC-TAB \quad (15)$$

$$TBD=\text{delta}RxAtD+TAD-TAB \quad (16)$$

$$TBE=\text{delta}RxAtE+TAE-TAB \quad (17)$$

Equations 18-21 are trilateration equations.

$$(xb-xa)^2+(yb-ya)^2+(zb-za)^2=TAB^2 \quad (18)$$

$$(xb-xc)^2+(yb-yc)^2+(zb-zc)^2=TBC^2 \quad (19)$$

$$(xb-xd)^2+(yb-yd)^2+(zb-zd)^2=TBD^2 \quad (20)$$

$$(xb-xe)^2+(yb-ye)^2+(zb-ze)^2=TBE^2 \quad (21)$$

By substituting 4 equations with 4 variables provides equations 22-25.

$$(xb-xa)^2+(yb-ya)^2+(zb-za)^2=TAB^2 \quad (22)$$

$$(xb-xc)^2+(yb-yc)^2+(zb-zc)^2=(\text{delta}RxAtC+TAC-TAB)^2 \quad (23)$$

$$(xb-xd)^2+(yb-yd)^2+(zb-zd)^2=(\text{delta}RxAtD+TAD-TAB)^2 \quad (24)$$

$$(xb-xe)^2+(yb-ye)^2+(zb-ze)^2=(\text{delta}RxAtD+TAD-TAB)^2 \quad (25)$$

When three RTT sniffers (e.g., the RTT sniffers 5706 shown) are used, trilateration may be performed using three circles to measure distances and determine the location of the slave device relative to one of the RTT devices 5702, 5704 and/or the corresponding vehicle. This may be performed at the master device and/or at one or more of the RTT sniffers. The information determined at the master device and the RTT sniffers may be shared with each other. The times, distances and/or locations may be determined and thus updated periodically.

In the vehicle, if there is an object (e.g., a head of a vehicle occupant) near and/or between the antenna modules of the master device and one or more of the RTT sniffers, such that the object interferes with the signals transmitted by the master device, then the round trip timing measures may be periodically updated. This may be done to measure the distance between the master device and the RTT sniffer to detect when the corresponding physical environment/system has changed.

Figure 52:
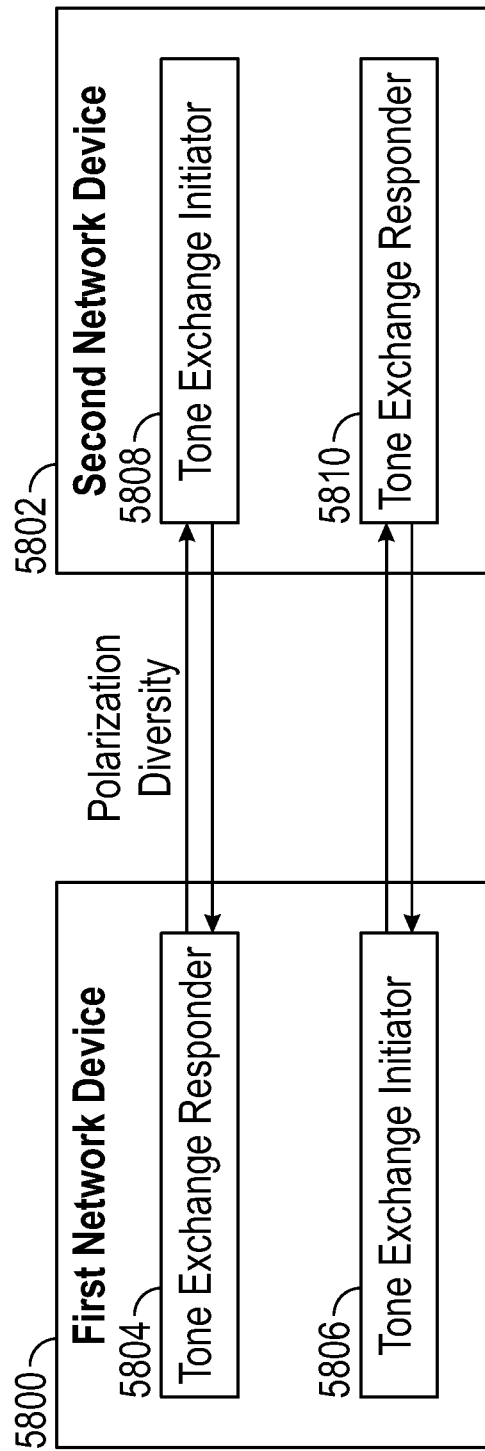
FIG. 52 is a functional block diagram of example network devices configured to perform a tone exchange for distance determination and attack detection in accordance with an embodiment of the present disclosure.

FIG. 52 shows a first network device (or vehicle) 5800 and a second network device (or portable network device) 5802. The first network device 5800 includes a tone exchange responder 5804 and a tone exchange initiator 5806. A tone exchange is also referred to as an unmodulated carrier tone exchange. The second network device 5802 includes a tone exchange initiator 5808 and a tone exchange responder 5810. The devices 5804, 5806, 5808, 5810 may be implemented as any of the other BLE radios, RF circuits, initiators, responders, etc. disclosed herein. At least one of the devices 5804, 5808 and at least one of the devices 5806, 5808 may include or be connected to a single polarized antenna and a circular polarized antenna. The devices 5804, 5806, 5808, 5810 may each include the antenna module 40 of FIG. 2 and/or the antennas shown in FIG. 11.

Tone exchange may be performed between the responder 5804 and the initiator 5808 and between the initiator 5806 and the responder 5810. RTT measurements may be transmitted in the same packets as the tones being exchanged. The devices 5804, 5806, 5808, 5810 may randomly select the channels used for the transmission of the packets. The transmission of packets may occur simultaneously with the reception of packets. For example, the initiator 5808 may transmit a tone to the responder 5804 on a first channel while the initiator 5808 receives a tone from the responder 5804 on a second channel. The initiator 5806 may transmit and/or receive tones while the initiator 5804 is transmitting and/or receiving tones.

The network devices 5800, 5802 may be synchronized ahead of time through, for example, a sequence signal exchanges (or handshake) to synchronize clocks of the network devise 5800, 5802. This synchronization may be performed to allow the network devices to simultaneously transmit signals to each other. As an example, two 1 MHz signals transmitting data at 1 Mbps each may be transmitted. The signals may be 2 MHz apart from each other. This prevents an attacking device from being able to perform an attack, such as a range extension attack or an attack including active manipulating of tones. If the attacker uses a bandpass filter that is 1 MHz wide, the bandpass filter would have a large amount of lag time and thus would not respond quick enough to allow an attack to occur. If the attacker uses a wideband bandpass filter, such as a 4 Mhz bandpass filter, then the corresponding signal eye diagram would have too much noise to make out the signals transmitted by the network devices 5800, 5802. As another example, the signals may be transmitted from the network devices with a symbol transmission rate of less than or equal to a predetermined amount of time (e.g., 1 μs per symbol). This provides quick transmission, which prevents an attack. Also, the simultaneous of dual signals further prevents an attacker from succeeding because the attacker would need to detect and affect both signals. Both signals may be transmitted on different frequencies, by the same network device or by different network devices, as described above.

The devices 5804, 5806, 5808, 5810 may change the frequencies of the tones transmitted, monitor changes in phase due to the changes in frequencies and based on the changes in phases determine distance between the network devices 5800, 5802. This may be referred to as carrier phase-based ranging. As an alternative, if a signal is transmitted and received as a result of the signal being reflected back to the source, a difference in phase between the transmitted signal and the received signal may be used to determine a modulo of distance between the source and the reflector. Similarly, an initiator may determine a modulo of a distance between the initiator and a responder based on a difference in phase between (i) a signal transmitted from the initiator to the responder and (ii) a corresponding response signal transmitted from the responder back to the initiator. A slope of phase difference for an amount of change in frequency corresponds to or is equal to distance with a frequency step size limitation. The smaller the frequency steps, the larger the modulo roll over distance (see "On the Security of Carrier Phase-based Ranging" by Olafsdotter, Ranganathan, and Capkun, which is incorporated herein by reference.

As another example, received signal strength indicator (RSSI) parameter may be monitored to determine if network device is close to vehicle and then perform a series of tone exchanges to measure distance. Based on a door handle touch of a user, tone exchanges may be conducted to make sure there is not an attack. Multiple round trip timing measurements may be performed to determine distance of the network device relative to the vehicle.

The above stated distance determination techniques may be used in combination with other techniques disclosed herein for determining RTT values. The direction of travel of the tones between the devices 5804, 5806, 5808, 5810 may be randomized.

In one embodiment, a control module of the first network device 5800 plots changes in phase versus changes in frequency for each of multiple tones being exchanged to generate multiple linear curves. The control module determines the slopes of the curves, which provide ratios of the changes in phase versus the changes in frequencies. The slopes are then used to determine the distances between the adjacent ones of the curves, which are related to the distance between the first and second network devices 5800, 5802.

Figure 53:
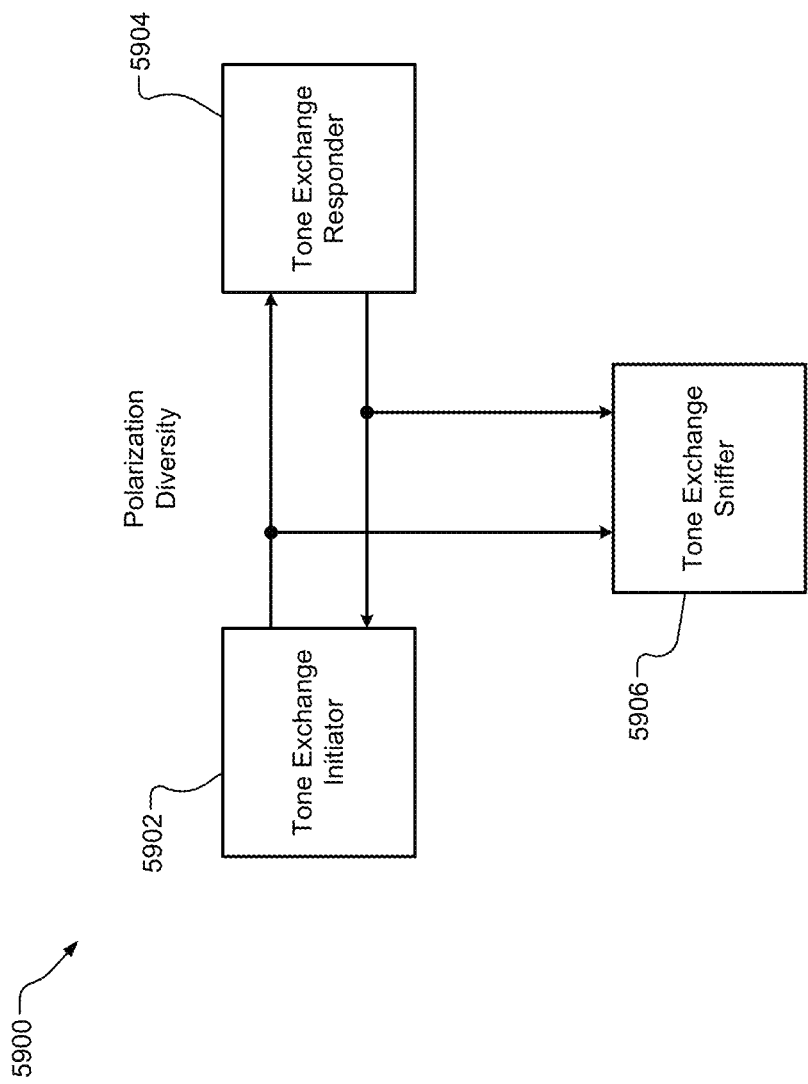
FIG. 53 is a functional block diagram of an example location determination system including a tone exchange sniffer in accordance with an embodiment of the present disclosure.

FIG. 53 shows a location determination system 5900 including a tone exchange initiator 5902, a tone exchange responder 5904, and a tone exchange sniffer 5906. The tone exchange initiator 5902 and the tone exchange responder 5904 may perform as any of the initiators, responders, BLE radios, RF circuits disclosed herein. The tone exchange sniffer 5906 may perform similar to the RTT sniffer 5606 of FIG. 50 and be located along with one of the tone exchange devices 5902, 5904 at a vehicle and include one of the antenna modules 40 of FIG. 2 while the tone exchange device in the vehicle includes the other one of the antenna modules 40. The devices 5902, 5904, 5906 may each include a control module as described above to perform any of the described operations. Polarization diversity is provided: between the antennas of the tone exchange devices 5902, 5904; and between the antennas of one of the tone exchange devices 5902, 5904 that is in the vehicle and the tone exchange sniffer 5906. Polarization diversity is especially utilized when performing round trip timing measurements.

The one of the tone exchange devices 5902, 5904 that is in the vehicle may be referred to as the master device, whereas the other one of the tone exchange devices 5902, 5904 is referred to as the slave device. When the master device transmits tones to the slave device and vice versa, the tone exchange sniffer 5906 performs as a listener and detects (i) when the tones are transmitted to and/or received at the tone exchange sniffer 5906, (ii) when the slave device transmits tones to the master device, and/or (iii) when the tone exchange sniffer 5906 receives tones transmitted by the slave device. The slave device may operate as a reflector and transmit tones received from the master device back to the master device. The master device and/or the sniffer device may prevent at least one of access to or operation control of the vehicle based on the arrival times of the tones, round trip timing measurements, and/or estimated distances between the devices.

Figure 54:
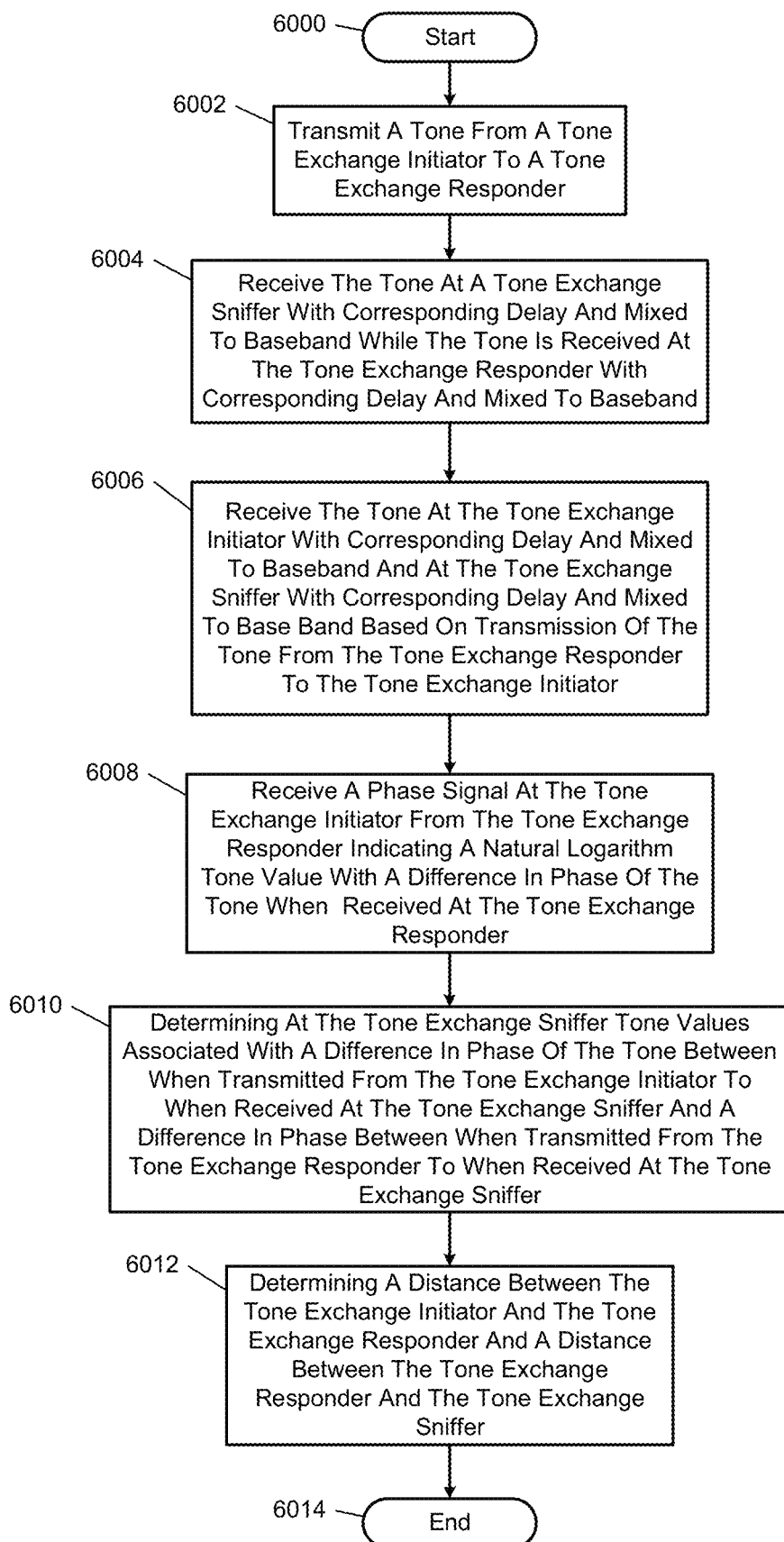
FIG. 54 illustrates a method of determining distances between an initiator and a responder and between a responder and a sniffer in accordance with an embodiment of the present disclosure.

FIG. 54 shows a method of determining distances between an initiator and a responder and between a responder and a sniffer. Although the following operations of FIG. 54 are primarily described with respect to the implementations of FIGS. 50 and 53, the operations may be easily modified to apply to other implementations of the present disclosure, such as the implementations of FIGS. 2-6, 11, 14, 39 and 46-49. The operations may be iteratively performed. Although the method is primarily described with respect to the embodiment of FIG. 53, the method may be applied to other embodiments of the present disclosure.

The method may begin at 6000. At 6002, the tone exchange initiator 5902 transmits a tone signal including a tone to the tone exchange responder 5904. The tone may be represented as $e^{(j\omega t+\phi_A)\cdot \tau_{AB}}$, where A is the tone exchange initiator 5902, B is the tone exchange responder 5904, $\tau_{AB}$ is time to travel from A to B and is directly related to the distance between the tone exchange initiator 5902 and the tone exchange responder 5904, $\omega$ is frequency, $\phi_A$ is the phase of the tone at the tone exchange initiator 5902, t is time.

At 6004, the tone is received at the tone exchange responder 5904 with delay $\phi_B$ and the tone exchange sniffer 5906 with delay $\phi_C$. At the tone exchange responder 5904, the receive tone signal is downconverted to baseband, which may be represented by equation 26.

$$e^{(j(\omega t+\phi_A))}e^{(j\omega \tau_{AB})}e^{(-j(\omega t+\phi_B))}=e^{(j\omega \tau_{AB}+\phi_A-\phi_B)} \quad (26)$$

At the tone exchange sniffer 5906, the receive tone signal is downconverted to baseband, which may be represented by equation 27.

$$e^{(j(\omega t+\phi_A))}e^{(j\omega \tau_{AC})}e^{(-j(\omega t+\phi_C))}=e^{(j\omega \tau_{AC}+\phi_A-\phi_C)} \quad (27)$$

At 6006, the tone exchange initiator 5902 receives the tone from the tone exchange responder 5904, which retransmitted the tone signal as a second tone signal back to the tone exchange initiator 5902. The tone may be represented as $e^{(j\omega t+\phi_A)\cdot \tau_{AB}}$. The received second tone signal may be represented by equation 28. The tone exchange sniffer 5906 also receives the second tone signal, which may be represented by equation 29.

$$e^{(j(\omega t+\phi_B))}e^{(j\omega \tau_{BA})}e^{(-j(\omega t+\phi_A))}=e^{(-j(\omega t+\phi_A))} \quad (28)$$

$$e^{(j(\omega t+\phi_B))}e^{(j\omega \tau_{BC})}e^{(-j(\omega t+\phi_C))}=e^{(j\omega \tau_{BC}+\phi_B-\phi_C)} \quad (29)$$

At 6008, the tone exchange initiator 5902 receives a phase signal from the tone exchange responder 5904 indicating a natural logarithm tone value with a difference in phase of the tone when received at the tone exchange responder 5904. The tone exchange responder 5904 thus sends a measured phase to the tone exchange initiator 5902, where values are multiplied, as represented by equation 30.

$$e^{(j\omega\tau_{AB}+\phi_A-\phi_B)}e^{(j\omega\tau_{BA}+\phi_B-\phi_A)}=e^{(2j\omega\tau_{AB})} \quad (30)$$

At 6010, the tone exchange sniffer 5906, based on the received tone signals, determines tone values associated with: a difference in phase of the tone between when transmitted from the tone exchange initiator to when received at the tone exchange sniffer; and a difference in phase of the tone between when transmitted from the tone exchange responder to when received at the tone exchange sniffer. The tone values may be represented as $e^{(j\omega\tau_{BC}+\theta_B-\theta_C)}$ and $e^{(j\omega\tau_{AC}+\theta_A-\theta_C)}$.

At 6012, the initiator 5902 and/or the sniffer 5906 determines the distances between the initiator 5902 and the responder 5904 and between the initiator 5902 and the sniffer 5906. The distance values may be determined in a similar manner as above when sniffing round trip time, see for example equations 12 and 15 and corresponding description. Instead of round trip time, phase is used. This calculation may include use of equation 31, where the tone values $e^{(j\omega\tau_{BC}+\theta_B-\theta_C)}$ and $e^{(-j\omega\tau_{AC}-\theta_A+\theta_C)}$ are measured or determined at the sniffer 5906, $e^{(j\omega\tau_{Ac})}$ is known apriori, and tone value $e^{(j\omega\tau_{AB}+\theta_A-\theta_B)}$ is determined at the responder 5904.

$$e^{(j\omega\tau_{BC}+\theta_B-\theta_C)}e^{(-j\omega\tau_{AC}-\theta_A+\theta_C)}e^{(j\omega\tau_{AC})}e^{(j\omega\tau_{AB}+\theta_A-\theta_B)}=e^{(j\omega\tau_{BC}+j\omega\tau_{AB})}=e^{j\omega(\tau_{BC}+\tau_{AB})} \quad (31)$$

The initiator 5902 and/or the sniffer 5906 may take the inverse logarithm of the resultant of equation 31 to provide the times $\tau_{BC}$ and $\tau_{AB}$. The distances between the responder 5904 and the sniffer 5906 and between the initiator 5902 and the responder 5904 may than be determined based on these times and the known transmission rates of the tone signals. The method may end at 6014. The initiator 5902 or the sniffer 5906 may prevent at least one of access to or operation control of the vehicle based on the estimated at least one of the distances.

Figure 55:
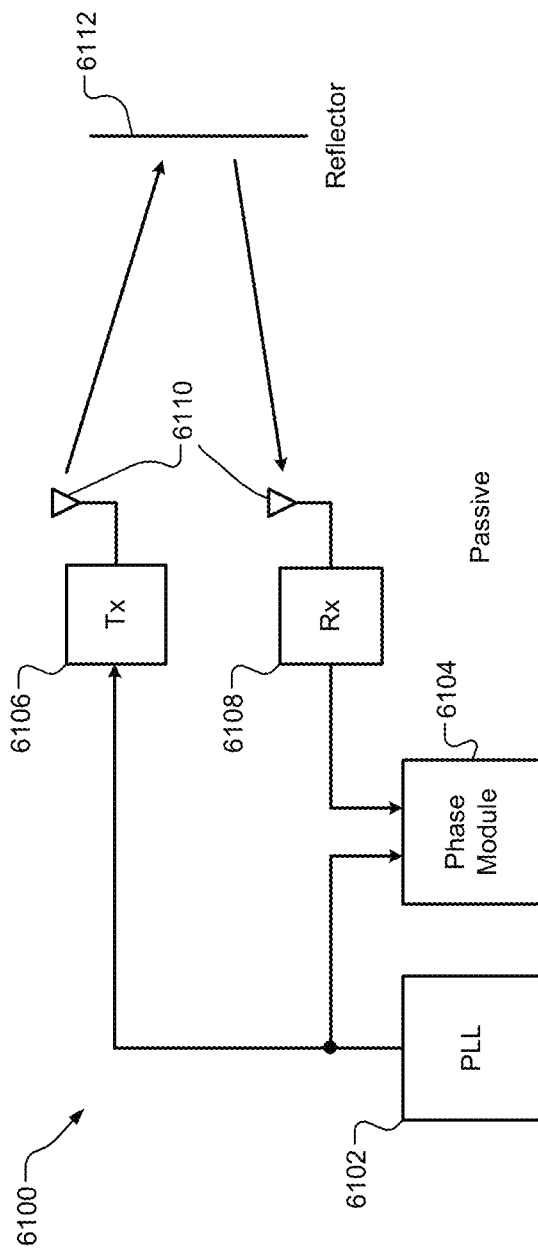
FIG. 55 is a functional block diagram of an example passive tone exchange and phase difference detection system in accordance with an embodiment of the present disclosure.

FIG. 55 shows an example of a passive tone exchange and phase difference detection system 6100. The system 6100 includes a phase lock loop (PLL) 6102, a phase module 6104, a transmitter 6106, a receiver 6108, and antenna modules 6110. The antenna module 6110 may be similar to the antenna modules 40 of FIG. 2. The transmitter 6106 transmits a first tone, which may be an output of the PLL 6102 and is reflected back by a reflector 6112 to the receiver 6108. The output of the PLL and the reflected tone signal are provided to the phase module 6104. The phase module 6104 determines a difference in phase between the output of the PLL and the reflected tone signal. The phase module 6104 or other module disclosed herein determines a distance between the transmitter 6106 and the reflector 6112 based on the difference in phase. The phase module 6104 or other module disclosed herein may prevent access to an interior of and/or operational control of a vehicle based on the determined distance.

Figure 56:
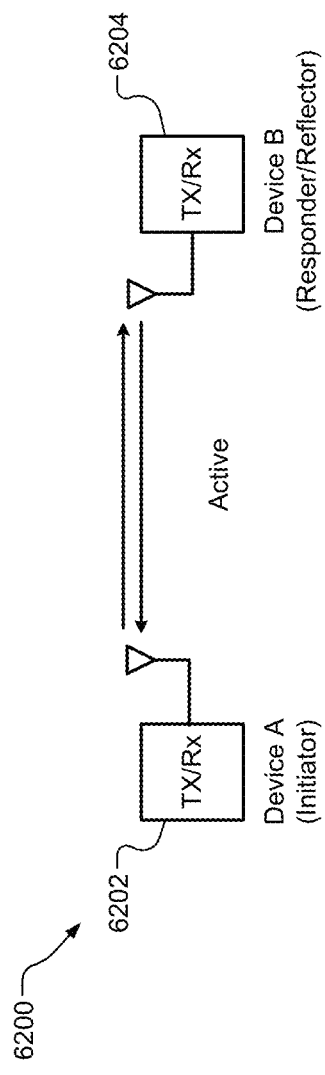
FIG. 56 is a functional block diagram of an example of an active tone exchange and phase difference detection system in accordance with an embodiment of the present disclosure.

FIG. 56 shows an example of an active tone exchange and phase difference detection system 6200. The system 6200 operates similarly as the system 6100 of FIG. 55. The transmitter and receiver 6106, 6108 are represented by box 6202. The reflector 6112 of FIG. 55 may be replaced with responder device 6204 for active exchange of tones. The responder device 6204 may receive a first tone signal with a first one or more tones from the transmitter 6106 and respond with a second tone signal. The second tone signal may include the one or more tones and/or one or more other tones. The second tone signal is transmitted back to the receiver 6108.

FIG. 57 shows an initiator packet 6300 and a response packet 6302 used for RSSI and time-of-flight measurements. The initiator packet 6300 may include multiple fields, such as a preamble, a synchronization access word (e.g., a pseudo-random synchronization access word), a data field including data, a cyclical redundancy check (CRC) field including CRC bits, and a continuous wave (CW) tone field including a CW tone. The response packet 6302 may include a CW tone field, a preamble, a synchronization access word, a data field, and a CRC field.

An initiator device may transmit the initiator packet 6300, which may be received at a responder device. The responder device may then generate the response packet 6302 and transmit the response packet back to the initiator device. This may be done for tone exchange, phase difference determination, round trip timing measurements, etc. Distance between the devices may then be determined. These measurements and calculations may be performed to detect a range extender type relay station attack. In an embodiment, the initiator and the responder pre-negotiate what the synchronization access words are going to be based on a predetermined list. The synchronization access words include access addresses. The initiator may, for example, measure the amount of time to receive (i) the response packet after transmitting the initiator packet, and/or (ii) the synchronization access word. The amount of times and the synchronization access word may be compared with predetermined amounts of times and a predetermined synchronization access word. If the comparisons performed result in matches, then a range extender type relay station attack has not occurred. However, if the synchronization access word received does not match and/or the amounts of time are more than a predetermined amount different than expected, then a range extender type relay station attack may have occurred.

In an embodiment, the initiator and responder exchange a predetermined key, list of synchronization access words, and times when each of the synchronization access words are to be transmitted. The synchronization access words when initially created may be randomly selected. This allows the responder to know the correct key and/or synchronization access word to respond with when receiving an initiator packet. The key may be included in the response packet. In another embodiment, the initiator and response packets do not include the preambles, as shown in FIG. 58. In an embodiment, the CW tones are 4-10 µs in length.

Figure 60:
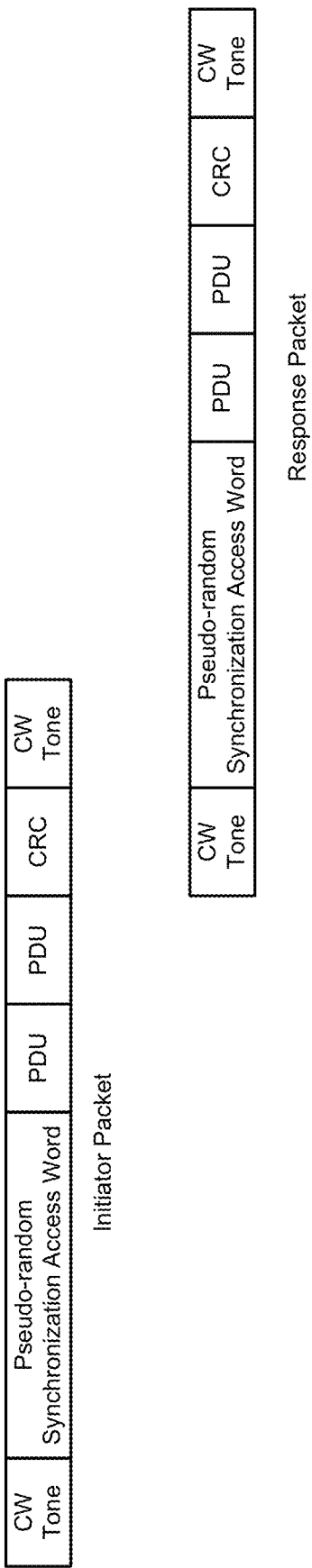
FIG. 60 is a diagram illustrating example initiator and response packets having a same format in accordance with another embodiment of the present disclosure.

In another embodiment, the initiator packet and the response packet have the same format as shown in FIG. 59. Each of the packets includes: as a first field a first CW tone; a synchronization access word; a data field; a CRC field; and as a last field a second CW tone. Another example of initiator and response packets having the same format is shown in FIG. 60, where each packet includes: as a first field a first CW tone; a synchronization word including a PACRMBI; a PDU field including a PDU; a medium access controller (MAC) field; a CRC field, and as a last field a second CW tone. The CW tones of FIGS. 57-60 may be cryptographically random length tones and may be inspected by the initiator when received. When for example CW tones received from a responder are not correct, then a range extender type relay station attack may have occurred. With the embodiments of FIGS. 59-60, synchronization word round trip timing prevents wraps of a CW tone exchange beyond an ambiguous range (e.g., 75 meters) at 2 MHz channel tone steps. The above referred to initiator and responder packets may be transmitted at a same frequency. By having the initiator and responder packets being in the same format, an attacking device is unable to distinguish which packet is the initiator packet and which packet is the responder packet. In one embodiment, the CW tones at the end of the packets are not included.

In an embodiment, the timing, frequencies, lengths, power levels, amplitudes, and content of the CW tones and synchronization access words of the initiator and responder packets are inspected at the initiator and at the responder to determine if correct and/or consistent and identify if an attack has occurred. In an embodiment, a pseudo-random number of packets are exchanged at a first frequency before changing to a next frequency and exchanging another pseudo-random number of packets.

Since an attacking device typically includes filters (e.g., low pass and band pass filters) and mixers (e.g., a downconverter and an upconverter), an attacking device causes delays when relaying a signal. In order for an attack by an attacking device to not be detected, the attacking device needs to retransmit a received signal without detectable delay. This makes it difficult for the attacking device to go undetected. An attacking device can delay a signal 500 ns, which can delay the signal in space 500 feet (ft). In order for an attacking device to advance transmission of a tone or start transmission of a tone at a correct time, the attacking device may need to know ahead of time what is being transmitted. This is unlikely. This is especially true when a heterodyne receiver is used to receive the relayed signal. The heterodyne receiver translates packets/tones into an in-phase (I)—quadrature-phase (Q) domain and captures in the IQ domain. In the IQ domain phase differences are detected. If there is an attack, the delay resulting from the attack can be detected in the IQ domain based on phase differences. If a tone is shortened by an attacking device, such that the corresponding synchronization access word arrives at the correct time, then the timing and length of the CW tone is incorrect and gets detected by the initiator.

In an embodiment, the initiator inspect the received CW tones transmitted from the responder for (i) length relative to a start of a transmitted synchronization access word, (ii) consistent power (or amplitude) before and relative to the synchronization access word, and (iii) consistent tone throughout the synchronization access word. Consistent tone may refer to a consistent frequency, power level, amplitude, etc. In another embodiment, the start and end times of the synchronization access word relative to a beginning of a first CW tone of a transmitted packet may be known within a predetermined amount of time (e.g., ±10 ns range). So if the start and end times are within predetermined ranges of a beginning of a first CW tone of the packet, then there has not been an attack, otherwise an attack may have occurred.

As another example, a PLL of an initiator that transmits a tone may, on a given channel, have 3 different tones which the PLL is able to generate; a center tone, a high tone at a first frequency (e.g., 250 KHz), and a low tone at a second predetermined frequency (e.g., −250 KHz). The transmitted tones may be selected and transmitted according to a predetermined agreed to random sequence and/or pattern of tones. This may be agreed to between the initiator and the responder. The PLLs of the initiator and an attacking device may not be consistent with each other. If there is a frequency difference greater than a predetermined threshold between the initiator transmitted signal and the signal received in response thereto, then the initiator may determine that an attack has occurred.

In an embodiment, the responder is able to measure and respond back in data with what phase delay the responder detects for a received signal. This may be based on when the responder receives a tail end CW tone of a packet from an initiator. The responder may measure a phase delay between (i) the tail end (or ending) CW tone of the packet received from the initiator and (ii) a front end (or first leading CW tone) of a packet being transmitted by the responder in response to the packet received from the initiator. The initiator may calculate the total bi-directional round trip time of the packet from the initiator to the responder and then from the responder back to the initiator.

In addition to detecting delay is a signal, an initiator may also detect when an attacking device amplifies the signal (or tone). The amplifying of a signal/tone can also delay transmission, which may be detected. During the relaying of tones at an attacking device, a tone can get distorted and/or another tone can get transmitted instead of the originally transmitted tone.

The above examples allow for more accurate distance measurements with a fewer number of packets that each have both a synchronization access word and a CW tone. The synchronization access word protects the CW tone and vice versa from being modified by an attacking device without detection. Bidirectional randomization communication protecting both the synchronization access words and the CW tones is performed.

A PLL as disclosed herein of an initiator may be a phase predictable PLL allowing the initiator to predict a phase of signal when a frequency of the signal is changed. This may eliminate a need to check if timing of a CW tone transmitted by the initiator and a CW tone transmitted by a responder are correct. A responder may measure when, for example, a tail end CW tone from an initiator is received, determine the corresponding phase delay of the tail end CW tone relative to generation of a front end CW tone by the responder for a response signal, and transmit this information with the front end CW tone to the initiator. The initiator may then calculate a total round trip time based on the received information.

In an embodiment, an initiator is one of a vehicle or a portable access device and a responder is the other one of the vehicle and the portable access device. The order in which the vehicle and the portable access device transmit and respond is pseudo-randomly changed. Also, a packet and/or tone signal may be sent as a response and then be used as an initiator packet and/or initiator tone signal. In one embodiment, the order in which the vehicle and the portable access device transmit and respond is not changed for short periods of time (e.g., exchange periods less than a predetermined period of time) and are changed for long exchange periods (e.g., exchanged periods greater than for equal to the predetermined period of time). The order may be switched periodically. In these examples, bi-directional data is exchanged using antenna polarization diversity to provide correct timing measurements.

Processing is implemented to provide accurate measurements of start and end points of CW tones and synchronization access words. The correlation and protocol module 3920 may maintain a circular queue of bits and lock in to do a comparison between start and end times and lengths of CW tones and synchronization access words of transmitted (initiator) packets and start and end times and lengths of CW tones and synchronization access words of received (responder) packets. The correlation and protocol module 3920 may interpolate where zero-crossing points are located. Post processing on I and Q data associated with a synchronization access word may be performed for clock recovery to interpolate when the synchronization access word arrived. I and Q data may have different transition/spin rates. Interpolation may be performed to determine where center points of transitions are to obtain precise timing for clock recovery. To dial in the timing, multiple zero-crossing points may be detected and aligned. Also, I and Q data may be oversampled as described further below to best fit/align one or more bits.

Figure 61:
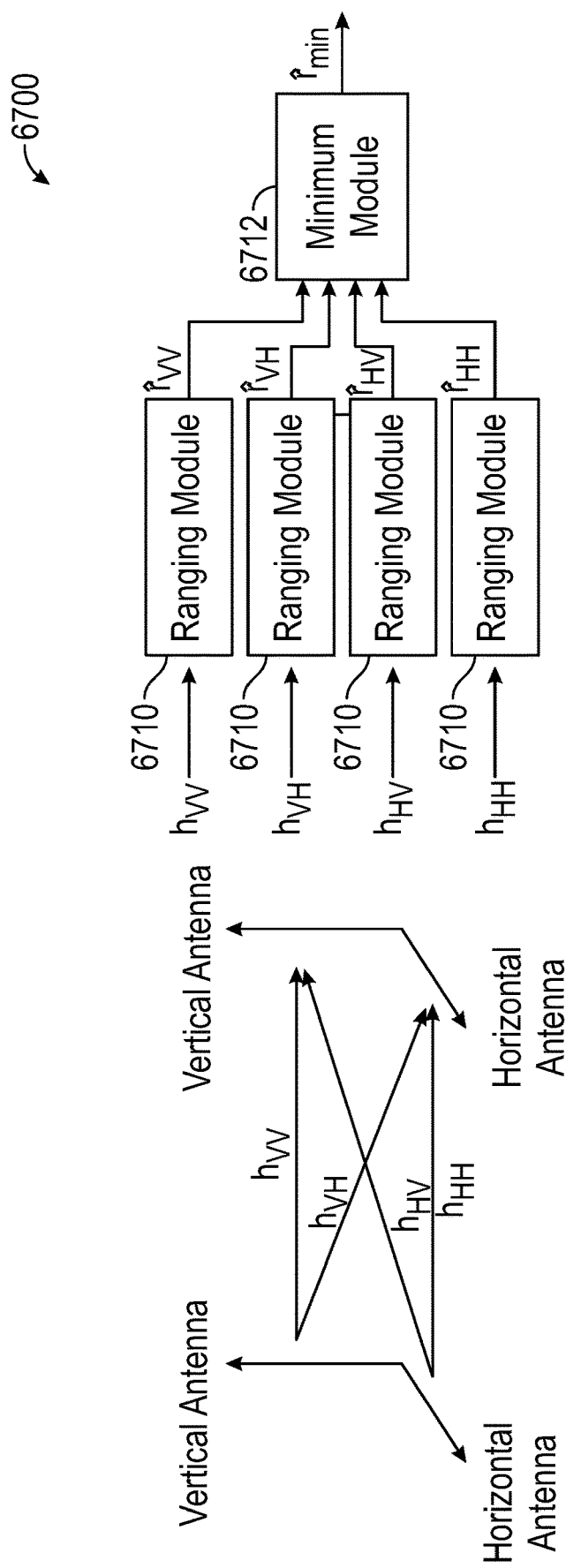
FIG. 61 is a functional block diagram of an antenna path determining system for network devices having respective antenna modules in accordance with another embodiment of the present disclosure.

FIG. 61 shows an antenna path determining system 6700 for network devices having respective antenna modules. The antenna modules exhibit polarization diversity. In this example, two polarization axes for each antenna module are shown. Each antenna module includes a vertically oriented antenna and a horizontally oriented antenna. Possible channel vectors $h_{VV}$, $h_{VH}$, $h_{HV}$ and $h_{HH}$ are shown. Ranging modules 6710 are shown. The ranging modules 6710, based on a respective one of the channel vectors $h_{VV}$, $h_{VH}$, $h_{HV}$ and $h_{HH}$, determines a range (or distance) between the corresponding antennas of the network devices. The ranging modules may executing ranging algorithms to determine ranges $\hat{r}_{VV}$, $\hat{r}_{VH}$, $\hat{r}_{HV}$ and $\hat{r}_{HH}$. The determined ranges $\hat{r}_{VV}$, $\hat{r}_{VH}$, $\hat{r}_{HV}$ and $\hat{r}_{HH}$ are provided to a minimum module 6712 that determines which of the ranges $\hat{r}_{VV}$, $\hat{r}_{VH}$, $\hat{r}_{HV}$ and $\hat{r}_{HH}$ is the shortest. The path that is the shortest may be selected.

Each of the channel vectors may be generated for one or more selected frequencies. When compared, the ranges may be generated for channel vectors of a same frequency or different frequencies. As an example, vectors may be generated for at least some of 80 different tones having a frequency step of 1 MHz between adjacent ones of the tones and being within a 2.4 GHz industrial, scientific and medical (ISM) band. A frequency associated with the shortest range may be selected. Other factors may also be considered when making the selection, such as signal strength, amplitude, voltage, parameter consistency, etc. This path selection may be performed by any of the initiators, responders, modules, network devices, etc. disclosed herein and used for round trip timing measurements. This allows a best antenna path to be selected for bidirectional packet and/or tone signal exchange for determining a round trip time.

Figure 62:
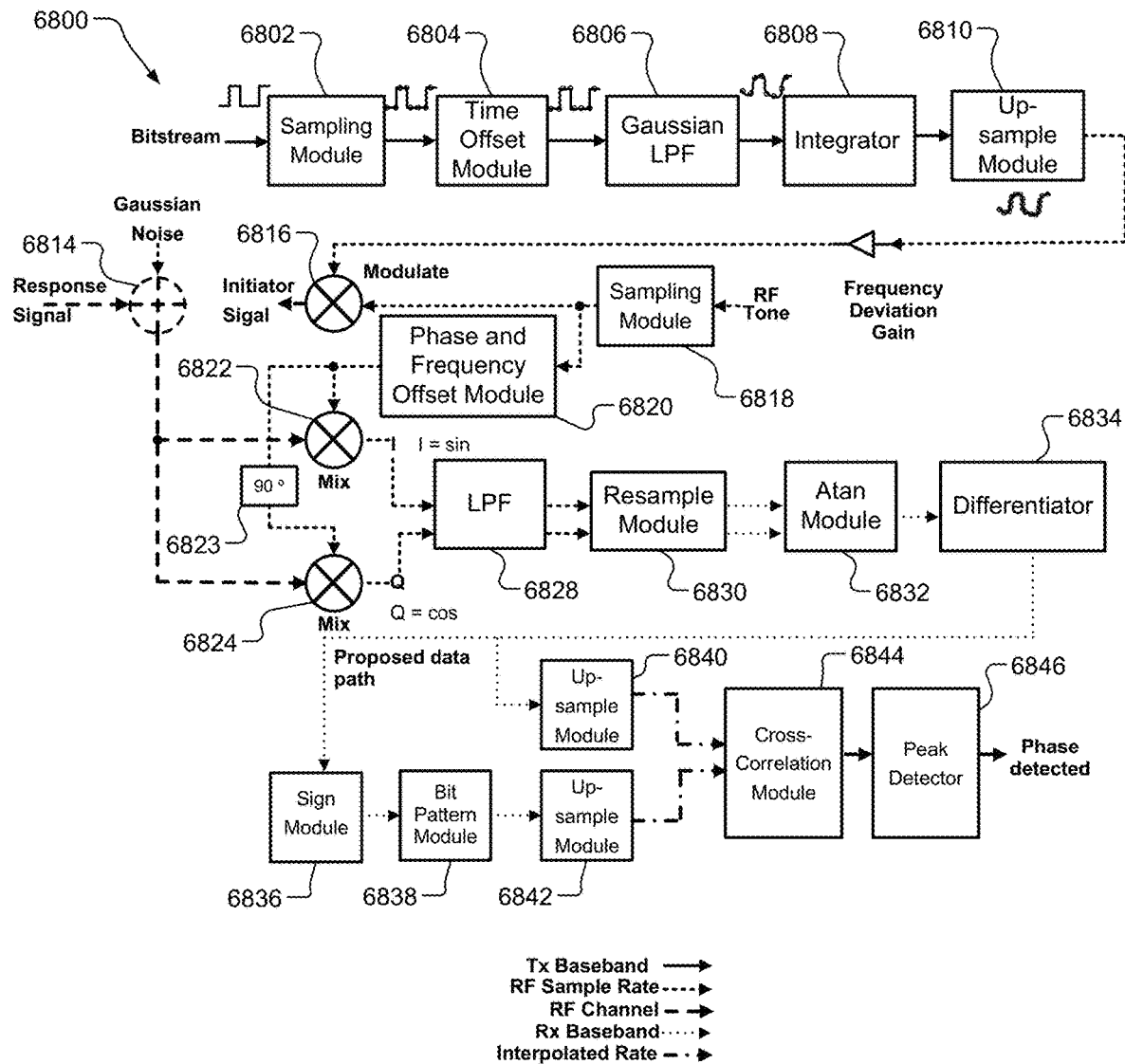
FIG. 62 is an example radio model corresponding to the structure, function and operation of the BLE radio of FIG. 38.

Referring now to FIGS. 38 and 62, which shows an example radio model 6800 that corresponds with structure, functioning and operations of the BLE radio 3900 (and/or modified version of the BLE radio 3900) of FIG. 38 and a RF channel. The radio model 6800 includes a first sampling module 6802, a time offset module 6804, a Gaussian low pass filter 6806, an integrator 6808, a first up-sampler 6810, an amplifier 6812, a summer 6814, a modulator 6816, a second sampling module 6818, a phase and frequency offset module 6820, a first mixer 6822, a phase delay device 6823, a second mixer 6824, a phase delay module 6826, a second low pass filter 6828, a resample module 6830, an arctangent module 6832, a differentiator 6834, a sign determining module 6836, a bit pattern module 6838, a second up-sampler 6840, a third up-sampler 6842, a cross-correlation module 6844 and a peak detector 6846. The devices 6802, 6804, 6806, 6808, 6810, 6812 corresponding to the transmitter portion of the BLE radio. The summer 6814 represents the channel between the BLE radio and another BLE radio and the devices 3907, 3906, 3908, 3932 and 3910. The devices 6816, 6818, 6820, 6822, 6824, 6828, 6830 correspond to the receiver portion of the BLE radio and are associated with an RF sampling rate. The devices 6830, 6832, 6834, 6836, 6838 also correspond to the receiver portion and perform operations on baseband signals. The devices 6840, 6842, 6844 and 6846 also correspond to the receiver portion and are associated with interpolation to determine a phase.

Figure 63:
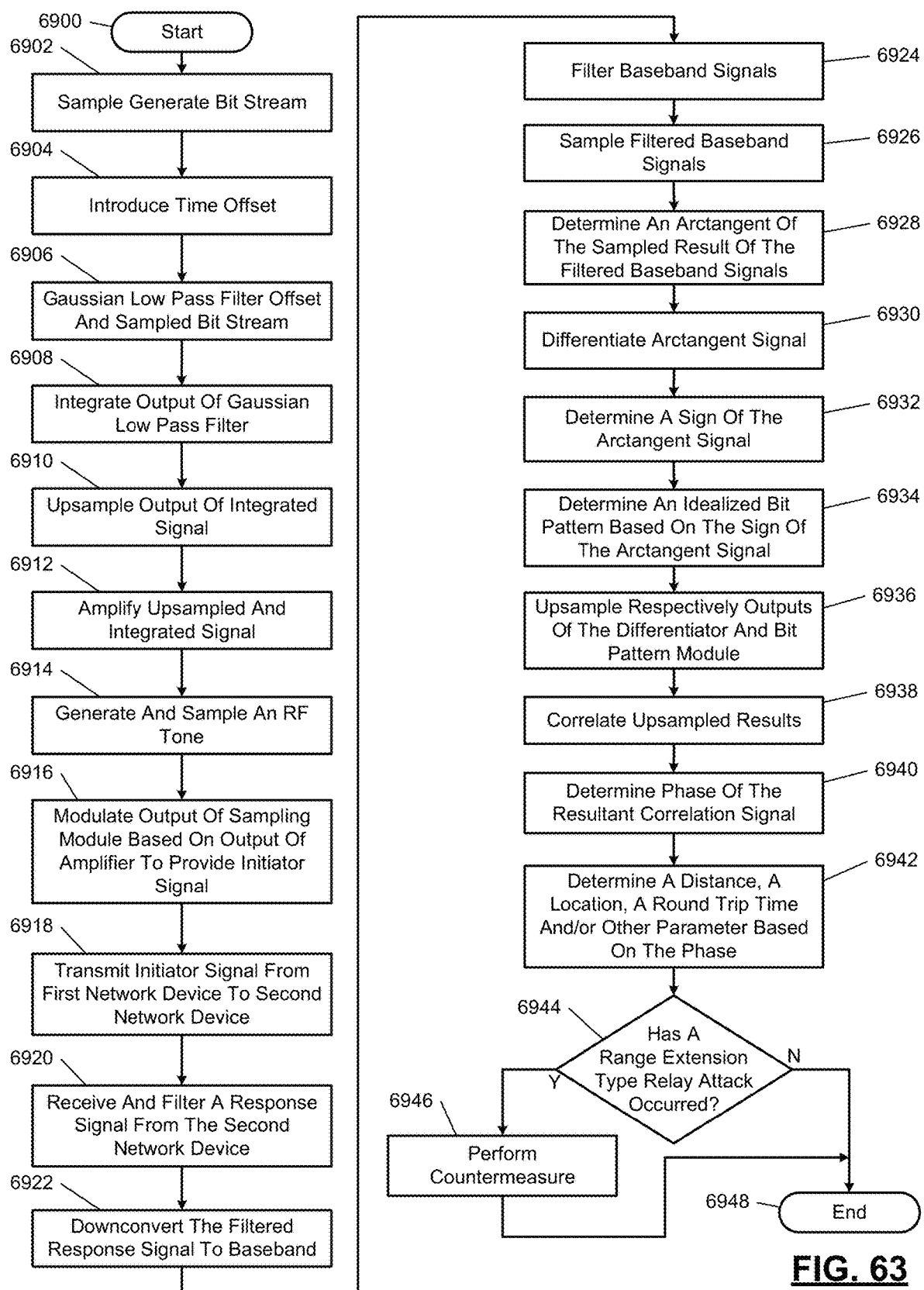
FIG. 63 illustrates a method of exchanging packets between RF antenna modules of BLE radios to detect a range extension type relay attack in accordance with another embodiment of the present disclosure.

The devices of FIGS. 38 and 62 are further described with respect to the method of FIG. 63. Although the following operations of FIG. 63 are primarily described with respect to the implementations of FIGS. 2-6, 11, 14 and 38, the operations may be easily modified to apply to other implementations of the present disclosure. The operations may be iteratively performed.

The method may begin at 6900. At 6902, the sampling module 6802 of a first network device (e.g., a network device implemented in a vehicle as part of an onboard vehicle system or a portable access device) receives a bit stream to be transmitted from the processing module 3922. The sampling module 6802 samples the bit stream.

Figure 64A:
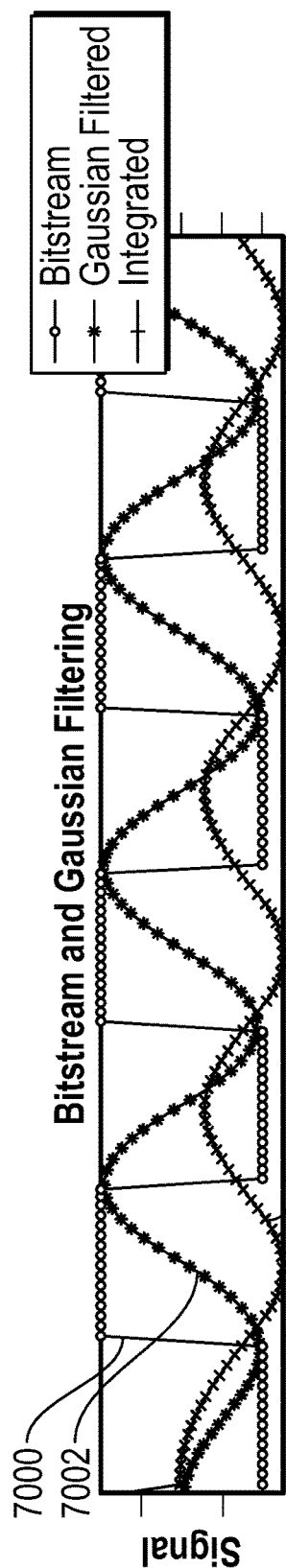
FIG. 64A is an example plot of signals respectively out of a sampling module, a Gaussian LPF, and an integrator of the model of FIG. 62.

At 6904, the time offset module 6804 receives an output of the sampling module 6802 and may introduce a time offset (or delay). The sampling module 6802 and the time offset module 6804 may be implemented by the protocol module 3924. At 6906, the Gaussian low pass filter (LPF) 6806 receives an output of the time offset module 6804. Operation of the Gaussian LPF 6806 may be implemented by the GFSK modulator 3926. At 6908, the integrator 6808 integrates an output of the Gaussian LPF 6806 and may be implemented by the D/A and low pass filter 3928. Example signals 7000, 7002, 7004 respectively out of the sampling module 6802, the Gaussian LPF 6806, and the integrator 6808 are shown in FIG. 64A.

At 6910, the up-sampler 6810 up-samples an output of the integrator 6808 to include additional points per sample. The up-sampler 6810 may be implemented by upconverter 3930. At 6912, the amplifier 6812 provides frequency deviation gain. At 6914, the sampling module 6818 receives an RF tone, which may be provided by the PLL 3940. An output of the sampling module 6818 is provided to both the modulator 6816 and the phase and frequency offset module 6820. At 6916, the modulator 6816 modulates an output of the sampling module 6818 based on an output of the amplifier 6812 to provide an initiator signal. The modulator 6816 may be at least partially implemented by the upconverter 3930.

At 6918, the initiator signal out of the modulator 6816 may be provided to the power amplifier 3932 and transmitted to a second network device. The second network device may be a network device implemented in a vehicle as part of an onboard vehicle system or a portable access device. The initiator signal may be any of the initiator signals, initiated tone signals, master device transmitted signals, and/or the like disclosed herein.

At 6920, the low noise amplifier 3910 receives a response signal in response to the initiator signal. The response signal may include Gaussian noise, which is included in the received response signal, as represented by the summer 6814. At 6922, the mixers 6822, 6824 receive the response signal from the low noise amplifier 3910 and downconvert the response signal to in-phase (I) and quadrature-phase (Q) baseband signals. The quadrature-phase baseband signal may be phase delayed by 90° via the phase delay device 6823. This may be implemented at the downconverters 3912.

Figure 64B:
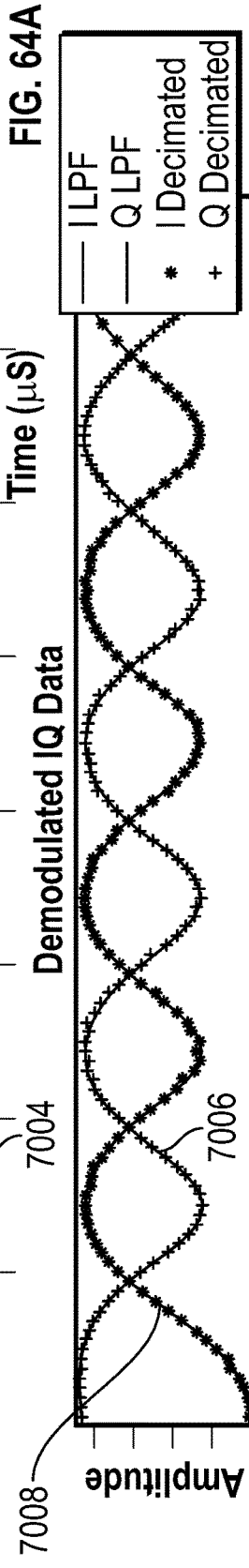
FIG. 64B is an example plot of signals out of a resampling module of the model of FIG. 62.

At 6924, the LPF 6828 filters the baseband signals. The LPF 6828 may include multiple LPFs; one for each downconverted signal. The LPF 6828 may replace and/or be implemented by the bandpass filter and amplifier 3914. At 6926, the resampling module 6830 samples the filtered baseband signals with sample jitter. The resampling module 6830 may be implemented by the A/D converter 3916. Example signals 7006, 7008 out of the resampling module 6830 are shown in FIG. 64B.

Figure 64C:
FIG. 64C is an example plot of a signal out of an arctangent module of the model of FIG. 62.
Figure 64D:
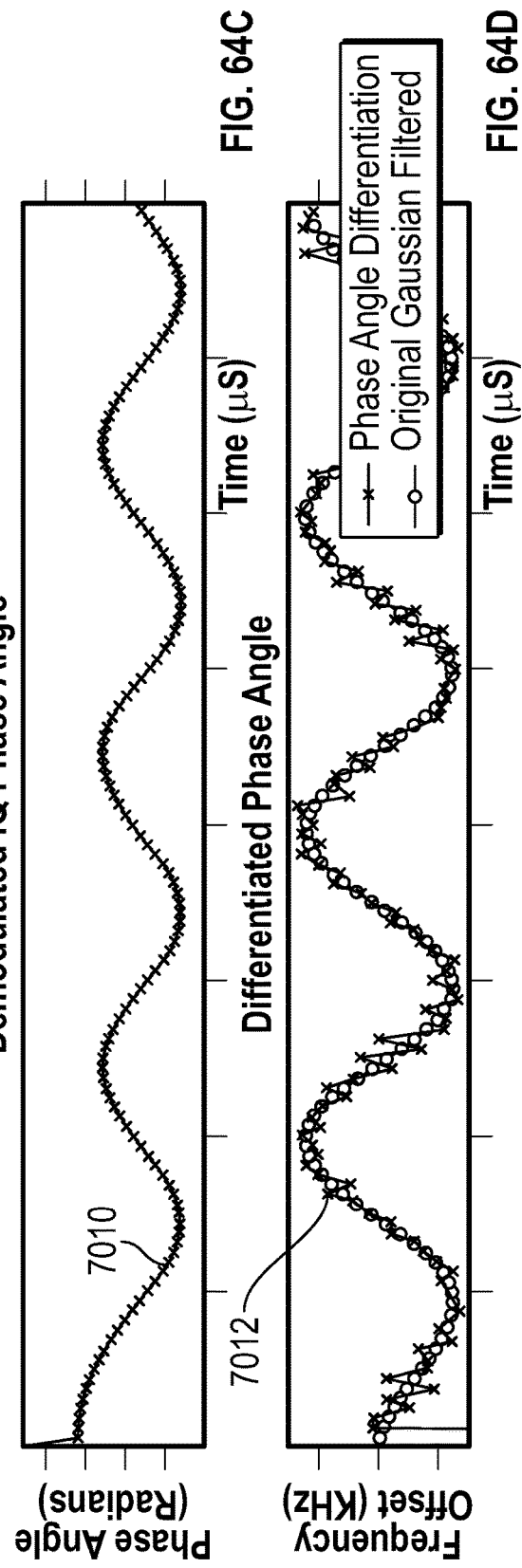
FIG. 64D is an example plot of a signal out of a differentiator shown over the signal out of the Gaussian LPF of the model of FIG. 62.

At 6928, the arctangent module 6832 determines an arctangent of the baseband signals to generate an arctangent signal. An example signal 7010 out of the arctangent module 6832 is shown in FIG. 64C. At 6930, the differentiator 6834 differentiates the arctangent signal out of the arctangent module 6832. An example signal 7012 out of the differentiator 6834 shown over the original Gaussian filtered signal 7002 is shown in FIG. 64D.

At 6932, the sign module 6836 performs a sign function and determines a sign of the output of the differentiator 6834. At 6934, the bit pattern module 6838 determines an idealized (or reference) bit pattern based on the output of the sign module 6836. The idealized bit pattern is obtained to match the bit pattern out of the Gaussian LPF 6806 or other bit patterns with the received bit pattern after the operations of the low pass filter 6828 and the arctangent module 6832 have been applied. This is done such that up-sampled values are similar to noise free resampled data.

At 6936, the up-samplers 6840, 6842 up-sample respectively the outputs of the differentiator 6834 and the bit pattern module 6838. At 6938, outputs of the up-samplers 6840, 6842 are correlated by the cross-correlation module 6844 to generate a correlation signal. The devices 6832, 6834, 6836, 6838, 6840, 6842 may be implemented by the demodulator 3918. At 6940, the peak detector 6846 determines a phase of the resulting correlated signal out of the cross-correlation module 6844. The cross-correlation module 6844 and the peak detector 6846 may be implemented by the correlation and protocol module 3920. In one embodiment, the peak detector 6846 is implemented as a 3 point parabolic peak interpolator on top of the up-sampled cross-correlation module 6844. Two points near (within a predetermined distance of) the detected peak are selected and a 3 point parabolic interpolation of the up-sampled result is obtained.

At 6942, determine a distance, a location, a round trip time, and/or other parameter based on the phase (or 3 point parabolic interpolation of the up-sampled result). The distance may be a distance between the first network device and the second network device. The location may be of the second network device relative to the first network device. The round trip time may be the time for the initiator signal to travel to the second network device and for the first network device to receive the response signal including time for the second network device to generate the response signal after receiving the initiator signal.

At 6944, the processing module 3922 may determine whether a range extension type relay attack has occurred based on the phase, distance, location, roundtrip trip time, and/or other parameter determined at 6942. If a range extension type relay attack has occurred, then operation 6946 may be performed, otherwise the method may end at 6948. At 6946, the processing module 3922 performs a countermeasure, such as any of the countermeasures disclosed herein.

The above-described operations of FIGS. 35, 36, 45, 54 and 63 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

There are variations in transmit timing between (i) the time a waveform that is generated reaches antennas to be transmitted and (ii) the corresponding time measured by a timer. Factors that may contribute to this include clock domain crossing(s), clock period changes, power amplifier propagation delay by a power amplifier gain setting, temperature and process propagation delay. Process, temperature and amplifier gain setting variations can be calibrated out of the timing measurement.

A second BLE device (e.g., the BLE device (or radio) 3900B) that is similar or identical to a first BLE device (e.g., the BLE device (or radio) 3900A of FIG. 38) may be added and implemented in a vehicle to represent a reflecting (or responder) device as shown in FIG. 49. Each of the BLE radios 3900 may be implemented on a separate system-on-chip (SoC). The first BLE radio 3900A may transmit an initiator signal, which may be received by the receiver portion of the second BLE device.

A time T1 may be generated for when a first bit stream is generated and/or provided to the protocol module 3924A of the first BLE radio 3900A to generate an initiator signal, which is to be transmitted from the first BLE radio 3900A as determined by the timers 3938A. A time T2 may be when the correlation and protocol module 3920B of the second BLE radio 3900B receives the first bit stream as determined by the timers 3938B. A first calibration constant CAL1 may be set equal to or determined based on a difference between when the timers 3938A detect generation of the first bit stream and when the corresponding initiator signal is transmitted from the antenna 3907A. A second calibration constant CAL2 may be set equal to or determined based on a difference between when the timers 3938B detect reception of the first bit stream at the correlation and protocol module 3920B. The time of flight for the first bit stream from the protocol module 3924A to the correlation and protocol module 3920B is (T2−CAL2)−(T1−CAL1).

Similarly, a time T3 may be generated for when a second bit stream corresponding to the first bit stream is generated and/or provided to the protocol module 3924B to generate a response signal, which is to be transmitted from the second BLE radio 3900B as determined by the timers 3938B. The response signal is generated in response to the initiator signal. A time T4 may be when the correlation and protocol module 3920A receives the second bit stream as determined by the timers 3938A. A third calibration constant CAL3 may be set equal to or determined based on a difference between when the timers 3938B detect generation of the second bit stream and when the corresponding response signal is transmitted from the antenna 3907B. A fourth calibration constant CAL4 may be set equal to or determined based on a difference between when the timers 3938A detect reception of the second bit stream at the correlation and protocol module 3920A. The time of flight for the second bit stream from the protocol module 3924B to the correlation and protocol module 3920A is (T4−CAL4)−(T3−CAL3). Average time of flight, distance between the first and second BLE radios 3900 may be determined using equations 33-35, where equation 33 is based on equation 32 and accounts for the stated timing variations and thus includes the corresponding calibration values.

$$\text{Average Time of Flight} = \frac{(T_2 - T_1) + (T_4 - T_3)}{2} \quad (32)$$

Gathering like information and adding calibration values:

$$\text{Average Time of Flight} = \quad (33)$$
$$\frac{(T_2 - CAL_2 - T_1 + CAL_1) + (T_4 - CAL_4 - T_3 + CAL_3)}{2}$$

$$\text{distance} = (c)\left(\frac{(T_4 - CAL_4 - T_1 + CAL_1) - (T_3 - CAL_3 - T_2 + CAL_2)}{2}\right) \quad (34)$$

Separating the calibration from time measurements:

$$\text{distance} = (c)\left(\frac{(T_4 - T_1) - (T_3 - T_2) + (CAL_1 - CAL_4 + CAL_2 - CAL_3)}{2}\right) \quad (35)$$

The timers 3938B may launch with a processing agreement and/or perform fine tuning of transmit time at the second BLE radio 3900B to minimize reporting about T2–T3.

The PLLs 3940A, 3942A of the first BLE radio 3900A may be implemented as a single PLL. Similarly, the PLLs 3940B, 3942B of the second radio 3900B may be implemented as a single PLL. Two PLLs allow hardware of the transmit portion and the receive portion to be implemented on a same SoC while allowing capture of a transmit time of an initiator signal using a same BLE circuit that is used to capture a receive time of a response signal.

In accordance with the present teachings, a system for accessing or providing operational control of a vehicle includes a master device comprising a first antenna module comprising a first plurality of antennas with different polarized axes, a transmitter configured to transmit a challenge signal via the first antenna module from the vehicle to a slave device, wherein the slave device is a portable access device, and a first receiver configured to receive a response signal in response to the challenge signal from the slave device. The system further includes a first sniffer device comprising a second antenna module comprising a second plurality of antennas with different polarized axes, and a second receiver configured to receive, via the second antenna module, the challenge signal from the transmitter and the response signal from the slave device. The first sniffer device is configured to measure when the challenge signal and the response signal arrive at the first sniffer device to provide arrival times, and the master device or the first sniffer device is configured to (i) estimate at least one of a distance from the vehicle to the slave device or a location of the slave device relative to the vehicle based on the arrival times, and (ii) prevent at least one of access to or operation control of the vehicle based on the estimated at least one of the distance or the location.

In accordance with the present teachings, the master device or the first sniffer device can be configured to determine a round trip time associated with the transmission of the challenge signal based on the arrival times, and, based on the round trip time, detect a range extension type relay attack performed by an attacking device to obtain at least one of access to or operational control of the vehicle, the response signal is relayed by the attacking device from the slave device to the vehicle and altered by the attacking device, and the master device is configured to perform a countermeasure in response to detecting the range extension type relay attack.

In accordance with the present teachings, at any moment in time, at least one of the first plurality of antennas of the first antenna module is not cross-polarized with at least one of the second plurality of antennas of the second antenna module.

In accordance with the present teachings, at any moment in time, at least one of the first plurality of antennas of the first antenna module is not cross-polarized with an antenna of the slave device.

In accordance with the present teachings, the master device or the first sniffer device is configured to determine a first amount of time for the first sniffer device to receive the challenge signal and a second amount of time for the sniffer device to receive the response signal, and, based on the first amount of time and the second amount of time, estimate the distance.

In accordance with the present teachings, a second sniffer device can include a third antenna module comprising a third plurality of antennas, and a third receiver configured to receive, via the third antenna module, the challenge signal from the transmitter and the response signal from the slave device, and a third sniffer device comprising a fourth antenna module comprising a fourth plurality of antennas, and a fourth receiver configured to receive, via the fourth antenna module, the challenge signal from the transmitter and the response signal from the slave device. The second sniffer device is configured to measure when the challenge signal and the response signal arrive at the second sniffer device to provide arrival times, the third sniffer device is configured to measure when the challenge signal and the response signal arrive at the third sniffer device to provide arrival times, and the master device, the first sniffer device, the second sniffer device, or the third sniffer device is configured to estimate the location based on the arrival times provided by the first sniffer device, the arrival times provided by the second sniffer device, and the arrival times provided by the third sniffer device.

In accordance with the present teachings, the first sniffer device can be configured to determine a first amount of time for the first sniffer device to receive the response signal, the second sniffer device can be configured to determine a second amount of time for the second sniffer device to receive the response signal, the third sniffer device can be configured to determine a third amount of time for the third sniffer device to receive the response signal, and the master device, the first sniffer device, the second sniffer device, or the third sniffer device can be configured to estimate the location based on the first amount of time, the second amount of time and the third amount of time.

In accordance with the present teachings, the master device can be configured to periodically send the challenge signal or other challenge signals to the slave device and receive respective response signals from the slave device, the first sniffer device can be configured to measure when the challenge signals and the response signals arrive at the first sniffer device to provide corresponding arrival times, and the master device or the first sniffer device can be configured to (i) update the at least one of the distance or the location based on the arrival times associated with the challenge signals and the response signals, and (ii) prevent at least one of access to or operation control of the vehicle based on the at least one of the updated distance or the updated location.

In accordance with the present teachings, a method for accessing or providing operational control of a vehicle includes transmitting a challenge signal via a first antenna module from a master device of the vehicle to a slave device, wherein the first antenna module comprises a first plurality of antennas with different polarized axes, receiving at a first receiver a response signal in response to the challenge signal from the slave device, receiving at a first sniffer device, via a second antenna module and a second receiver, the challenge signal from the master device and the response signal from the slave device, wherein the second antenna module comprises a second plurality of antennas with different polarized axes, measuring when the challenge signal and the response signal are received at the first sniffer device to provide arrival times via the first sniffer device, estimating at least one of a distance from the vehicle to the slave device or a location of the slave device relative to the vehicle based on the arrival times, and preventing at least one of access to or operation control of the vehicle based on the estimated at least one of the distance or the location.

In accordance with the present teachings, the method can include determining a round trip time associated with the transmission of the challenge signal based on the arrival times, based on the round trip time, detecting a range extension type relay attack performed by an attacking device to obtain at least one of access to or operational control of the vehicle. The response signal can be relayed via the attacking device from the slave device to the vehicle and altered by the attacking device. The method also includes performing a countermeasure in response to detecting the range extension type relay attack.

In accordance with the present teachings, at any moment in time, at least one of the first plurality of antennas of the first antenna module is not cross-polarized with at least one of the second plurality of antennas of the second antenna module.

In accordance with the present teachings, at any moment in time, at least one of the first plurality of antennas of the first antenna module is not cross-polarized with an antenna of the slave device.

In accordance with the present teachings, the method further includes determining a first amount of time for the first sniffer device to receive the challenge signal and a second amount of time for the sniffer device to receive the response signal, and based on the first amount of time and the second amount of time, estimating the distance.

In accordance with the present teachings, the method further includes receiving at a third receiver of a second sniffer device, via a third antenna module, the challenge signal from the transmitter and the response signal from the slave device, wherein the third antenna module comprises a third plurality of antennas with different polarized axes, receiving at a fourth receiver of a third sniffer device, via a fourth antenna module, the challenge signal from the transmitter and the response signal from the slave device, wherein the fourth antenna module comprises a fourth plurality of antennas with different polarized axes, measuring when the challenge signal and the response signal arrive at the second sniffer device to provide arrival times via the second sniffer device, measuring when the challenge signal and the response signal arrive at the third sniffer device to provide arrival times via the third sniffer device, and estimating the location based on the arrival times provided by the first sniffer device, the arrival times provided by the second sniffer device, and the arrival times provided by the third sniffer device.

In accordance with the present teachings, the method further includes determining a first amount of time for the first sniffer device to receive the response signal, determining a second amount of time for the second sniffer device to receive the response signal, determining a third amount of time for the third sniffer device to receive the response signal, and estimating the location based on the first amount of time, the second amount of time and the third amount of time.

In accordance with the present teachings, the method further includes periodically sending from the master device the challenge signal or other challenge signals to the slave device and receiving respective response signals from the slave device, measuring at the first sniffer device when the challenge signals and the response signals arrive at the first sniffer device to provide corresponding arrival times, updating the at least one of the distance or the location based on the arrival times associated with the challenge signals and the response signals, and preventing at least one of access to or operation control of the vehicle based on the at least one of the updated distance or the updated location.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for accessing or providing operational control of a vehicle, the system comprising:
 a master device comprising
  a first antenna module comprising a first plurality of antennas with different polarized axes,
  a transmitter configured to transmit a challenge signal via the first antenna module from the vehicle to a slave device, wherein the slave device is a portable access device, and
  a first receiver configured to receive a response signal in response to the challenge signal from the slave device; and
 a first sniffer device separate from the master device and the slave device and comprising
  a second antenna module comprising a second plurality of antennas with different polarized axes, and
  a second receiver configured to receive, via the second antenna module, the challenge signal from the transmitter and the response signal from the slave device,
 wherein
  the first sniffer device is configured to measure when the challenge signal and the response signal arrive at the first sniffer device to provide arrival times, and
  the master device or the first sniffer device is configured to (i) estimate at least one of a distance from the vehicle to the slave device or a location of the slave device relative to the vehicle based on the arrival times, and (ii) prevent at least one of access to or operation control of the vehicle based on the estimated at least one of the distance or the location.

2. The system of claim 1, wherein:
 the master device or the first sniffer device is configured to
  determine a round trip time associated with the transmission of the challenge signal based on the arrival times, and
  based on the round trip time, detect a range extension type relay attack performed by an attacking device to obtain at least one of access to or operational control of the vehicle;
 the response signal is relayed by the attacking device from the slave device to the vehicle and altered by the attacking device; and
 the master device is configured to perform a countermeasure in response to detecting the range extension type relay attack.

3. The system of claim 1, wherein, at any moment in time, at least one of the first plurality of antennas of the first antenna module is not cross-polarized with at least one of the second plurality of antennas of the second antenna module.

4. The system of claim 1, wherein, at any moment in time, at least one of the first plurality of antennas of the first antenna module is not cross-polarized with an antenna of the slave device.

5. The system of claim 1, wherein the master device or the first sniffer device is configured to:
   determine a first amount of time for the first sniffer device to receive the challenge signal and a second amount of time for the first sniffer device to receive the response signal; and
   based on the first amount of time and the second amount of time, estimate the distance.

6. The system of claim 1, further comprising:
   a second sniffer device comprising
      a third antenna module comprising a third plurality of antennas, and
      a third receiver configured to receive, via the third antenna module, the challenge signal from the transmitter and the response signal from the slave device; and
   a third sniffer device comprising
      a fourth antenna module comprising a fourth plurality of antennas, and
      a fourth receiver configured to receive, via the fourth antenna module, the challenge signal from the transmitter and the response signal from the slave device,
   wherein
      the second sniffer device is configured to measure when the challenge signal and the response signal arrive at the second sniffer device to provide arrival times,
      the third sniffer device is configured to measure when the challenge signal and the response signal arrive at the third sniffer device to provide arrival times, and
      the master device, the first sniffer device, the second sniffer device, or the third sniffer device is configured to estimate the location based on the arrival times provided by the first sniffer device, the arrival times provided by the second sniffer device, and the arrival times provided by the third sniffer device.

7. The system of claim 6, wherein:
   the first sniffer device is configured to determine a first amount of time for the first sniffer device to receive the response signal;
   the second sniffer device is configured to determine a second amount of time for the second sniffer device to receive the response signal;
   the third sniffer device is configured to determine a third amount of time for the third sniffer device to receive the response signal; and
   the master device, the first sniffer device, the second sniffer device, or the third sniffer device is configured to estimate the location based on the first amount of time, the second amount of time and the third amount of time.

8. The system of claim 1, wherein:
   the master device is configured to periodically send the challenge signal or other challenge signals to the slave device and receive respective response signals from the slave device;
   the first sniffer device is configured to measure when the challenge signals and the response signals arrive at the first sniffer device to provide corresponding arrival times; and
   the master device or the first sniffer device is configured to (i) update the at least one of the distance or the location based on the arrival times associated with the challenge signals and the response signals, and (ii) prevent at least one of access to or operation control of the vehicle based on the at least one of the updated distance or the updated location.

9. A method for accessing or providing operational control of a vehicle, the method comprising:
   transmitting a challenge signal via a first antenna module from a master device of the vehicle to a slave device, wherein the first antenna module comprises a first plurality of antennas with different polarized axes;
   receiving at a first receiver a response signal in response to the challenge signal from the slave device;
   receiving at a first sniffer device, via a second antenna module and a second receiver, the challenge signal from the master device and the response signal from the slave device, wherein the first sniffer device is separate from the master device and the slave device, and wherein the second antenna module comprises a second plurality of antennas with different polarized axes;
   measuring when the challenge signal and the response signal are received at the first sniffer device to provide arrival times via the first sniffer device;
   estimating at least one of a distance from the vehicle to the slave device or a location of the slave device relative to the vehicle based on the arrival times; and
   preventing at least one of access to or operation control of the vehicle based on the estimated at least one of the distance or the location.

10. The method of claim 9, further comprising:
    determining a round trip time associated with the transmission of the challenge signal based on the arrival times;
    based on the round trip time, detecting a range extension type relay attack performed by an attacking device to obtain at least one of access to or operational control of the vehicle,
    wherein the response signal is relayed via the attacking device from the slave device to the vehicle and altered by the attacking device; and
    performing a countermeasure in response to detecting the range extension type relay attack.

11. The method of claim 9, wherein, at any moment in time, at least one of the first plurality of antennas of the first antenna module is not cross-polarized with at least one of the second plurality of antennas of the second antenna module.

12. The method of claim 9, wherein, at any moment in time, at least one of the first plurality of antennas of the first antenna module is not cross-polarized with an antenna of the slave device.

13. The method of claim 9, further comprising:
    determining a first amount of time for the first sniffer device to receive the challenge signal and a second amount of time for the sniffer device to receive the response signal; and
    based on the first amount of time and the second amount of time, estimating the distance.

14. The method of claim 9, further comprising:
    receiving at a third receiver of a second sniffer device, via a third antenna module, the challenge signal from the transmitter and the response signal from the slave device, wherein the third antenna module comprises a third plurality of antennas with different polarized axes;
    receiving at a fourth receiver of a third sniffer device, via a fourth antenna module, the challenge signal from the transmitter and the response signal from the slave device, wherein the fourth antenna module comprises a fourth plurality of antennas with different polarized axes;

measuring when the challenge signal and the response signal arrive at the second sniffer device to provide arrival times via the second sniffer device;

measuring when the challenge signal and the response signal arrive at the third sniffer device to provide arrival times via the third sniffer device; and estimating the location based on the arrival times provided by the first sniffer device, the arrival times provided by the second sniffer device, and the arrival times provided by the third sniffer device.

15. The method of claim 14, further comprising:

determining a first amount of time for the first sniffer device to receive the response signal;

determining a second amount of time for the second sniffer device to receive the response signal;

determining a third amount of time for the third sniffer device to receive the response signal; and estimating the location based on the first amount of time, the second amount of time and the third amount of time.

16. The method of claim 9, wherein:

periodically sending from the master device the challenge signal or other challenge signals to the slave device and receiving respective response signals from the slave device;

measuring at the first sniffer device when the challenge signals and the response signals arrive at the first sniffer device to provide corresponding arrival times;

updating the at least one of the distance or the location based on the arrival times associated with the challenge signals and the response signals; and preventing at least one of access to or operation control of the vehicle based on the at least one of the updated distance or the updated location.

17. A system for accessing or providing operational control of a vehicle, the system comprising:

a master device comprising a first antenna module comprising a first plurality of antennas with different polarized axes, a transmitter configured to transmit a challenge signal via the first antenna module from the vehicle to a slave device, wherein the slave device is a portable access device, and a first receiver configured to receive a response signal in response to the challenge signal from the slave device; and a first sniffer device comprising a second antenna module comprising a second plurality of antennas with different polarized axes, and a second receiver configured to receive, via the second antenna module, the challenge signal from the transmitter and the response signal from the slave device, wherein the first sniffer device, separate from the master device and the slave device, is configured to measure when the challenge signal and the response signal arrive at the first sniffer device to provide arrival times, the master device or the first sniffer device is configured to (i) estimate at least one of a distance from the vehicle to the slave device or a location of the slave device relative to the vehicle based on the arrival times, and (ii) prevent at least one of access to or operation control of the vehicle based on the estimated at least one of the distance or the location, and at any moment in time, at least one of the first plurality of antennas of the first antenna module is not cross-polarized with one or more of (i) the at least one of the second plurality of antennas of the second antenna module, or (ii) an antenna of the slave device.

* * * * *